United States Patent
Deshpande

(10) Patent No.: US 10,230,972 B2
(45) Date of Patent: Mar. 12, 2019

(54) DEVICE FOR SIGNALING A LONG-TERM REFERENCE PICTURE IN A PARAMETER SET

(71) Applicant: SHARP KABUSHIKI KAISHA, Osaka-shi, Osaka (JP)

(72) Inventor: Sachin G. Deshpande, Camas, WA (US)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 772 days.

(21) Appl. No.: 14/410,500

(22) PCT Filed: Jun. 26, 2013

(86) PCT No.: PCT/JP2013/004013
§ 371 (c)(1),
(2) Date: Dec. 22, 2014

(87) PCT Pub. No.: WO2014/006854
PCT Pub. Date: Jan. 9, 2014

(65) Prior Publication Data
US 2015/0304671 A1    Oct. 22, 2015

Related U.S. Application Data

(60) Provisional application No. 61/666,882, filed on Jul. 1, 2012.

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/172* (2014.11);
(Continued)

(58) Field of Classification Search
CPC ....................................................... H04N 19/44
(Continued)

(56) References Cited

U.S. PATENT DOCUMENTS

2013/0058408 A1    3/2013    Wahadaniah et al.

FOREIGN PATENT DOCUMENTS

WO    WO 2013/035313 A1    3/2013

OTHER PUBLICATIONS

Adarsh K. ramasubramonian et al., Signalling of long-term reference pictures in the SPS, Joint Collaborative Team on Video Coding (JCT-VC) of ITU-T SG16 WP3 and ISO/IEC JTC1/SC29/WG11, JCTVC-I0340r2, 9th Meeting: Geneva, Switzerland, May 2012, pp. 1-9.*

(Continued)

*Primary Examiner* — Dave Czekaj
*Assistant Examiner* — Shanika M Brumfield
(74) *Attorney, Agent, or Firm* — Birch, Stewart, Kolasch & Birch, LLP

(57) ABSTRACT

A method for sending a long-term reference picture indicator by an electronic device is described. A long-term reference picture indicator is generated. The long-term reference picture indicator is sent. An absolute Picture Order Count (POC) corresponding to a long-term reference picture is generated. The absolute POC includes a least significant bit (LSB) value. The LSB value of the absolute POC corresponding to a long-term reference picture is sent. A used by current picture flag corresponding to a current picture is generated. The used by current picture flag in at least one parameter set is sent.

2 Claims, 20 Drawing Sheets

(51) Int. Cl.
| | |
|---|---|
| *H04N 19/70* | (2014.01) |
| *H04N 19/172* | (2014.01) |
| *H04N 19/174* | (2014.01) |
| *H04N 19/58* | (2014.01) |
| *H04N 19/423* | (2014.01) |
| *H04N 19/50* | (2014.01) |
| *H04N 19/59* | (2014.01) |

(52) U.S. Cl.
 CPC ......... *H04N 19/174* (2014.11); *H04N 19/423* (2014.11); *H04N 19/50* (2014.11); *H04N 19/58* (2014.11); *H04N 19/70* (2014.11); *H04N 19/59* (2014.11)

(58) Field of Classification Search
 USPC .......................................... 375/240.02–240.2
 See application file for complete search history.

(56) References Cited

OTHER PUBLICATIONS

Vicktor Wahadania and ChongSoon Lim, AHG21: Flexible signalling of long term reference pictures, Joint Collaborative Team on Video Coding (JCT-VC) of ITU-T SG16 WP3 and ISO/IEC JTC1/SC29/WG11, JCTVC-H0468_r1, 8th Meeting: San Jose, CA, USA, Jan. 2012, pp. 1-9.*

"Series H: Audiovisual and Multimedia Systems, Infrastructure of audiovisual services—Coding of moving video", Advanced video coding for generic audiovisual services, Telecommunication Standardization Sector of ITU, International Telecommunication Union, H.264, May 2003, 282 pages.

Bross et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11, JCTVC-H1003, 7th Meeting: Geneva, CH, Nov. 21-30, 2011, 259 pages.

Bross et al., "High Efficiency Video Coding (HEVC) Text Specification Draft 7", Joint Collaborative Team on Video Coding (JCT-VC) of ITU-T SG16 WP3 and ISO/IEC JTC1/SC29/WG11, JCTVC-I1003_d9, 9th Meeting: Geneva, CH, Apr. 27-May 7, 2012, 278 pages.

Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d6, 6th Meeting: Torino, IT, Jul. 14-22, 2011, 228 pages.

Ramasubramonian et al., "AHG13: Signalling of Long-term Reference Pictures in the SPS", Joint Collaborative Team on Video Coding (JCT-VC) of ITU-T SG16 WP3 and ISO/IEC JTC1/SC29/WG11, JCTVC-J0116r1, 10th Meeting: Stockholm, SE, Jul. 11-20, 2012, pp. 1-9.

Ramasubramonian et al., "Signalling of Long-term Reference Pictures in the SPS", Joint Collaborative Team on Video Coding (JCT-VC) of ITU-T SG16 WP3 and ISO/IEC JTC1/SC29/WG11, JCTVC-I0340r2, 9th Meeting: Geneva, Switzerland, Apr. 27-May 7, 2012, pp. 1-9.

Sjöberg et al., "Absolute signaling of reference pictures", Joint Collaborative Team on Video Coding (JCT-VC) of ITU-T SG16 WP3 and ISO/IEC JTC1/SC29/WG11, JCTVC-F493, 6th Meeting: Torino, 2011, pp. 1-15, vol. m20923.

Wahadaniah et al., "AHG21: Flexible Signalling of Long Term Reference Pictures", Joint Collaborative Team on Video Coding (JCT-VC) of ITU-T SG16 WP3 and ISO/IEC JTC1/SC29/WG11, JCTVC-H0468, 8th Meeting: San José, CA, USA, Feb. 1-10, 2012, pp. 1-9.

Wang et al., "On bitstreams starting with CRA pictures", Joint Collaborative Team on Video Coding (JCT-VC) of ITU-T SG16 WP3 and ISO/IEC JTC1/SC29/WG11, JCTVC-H0496r1, 8th Meeting: San José, CA, USA, Feb. 1-10, 2012, pp. 1-6.

* cited by examiner

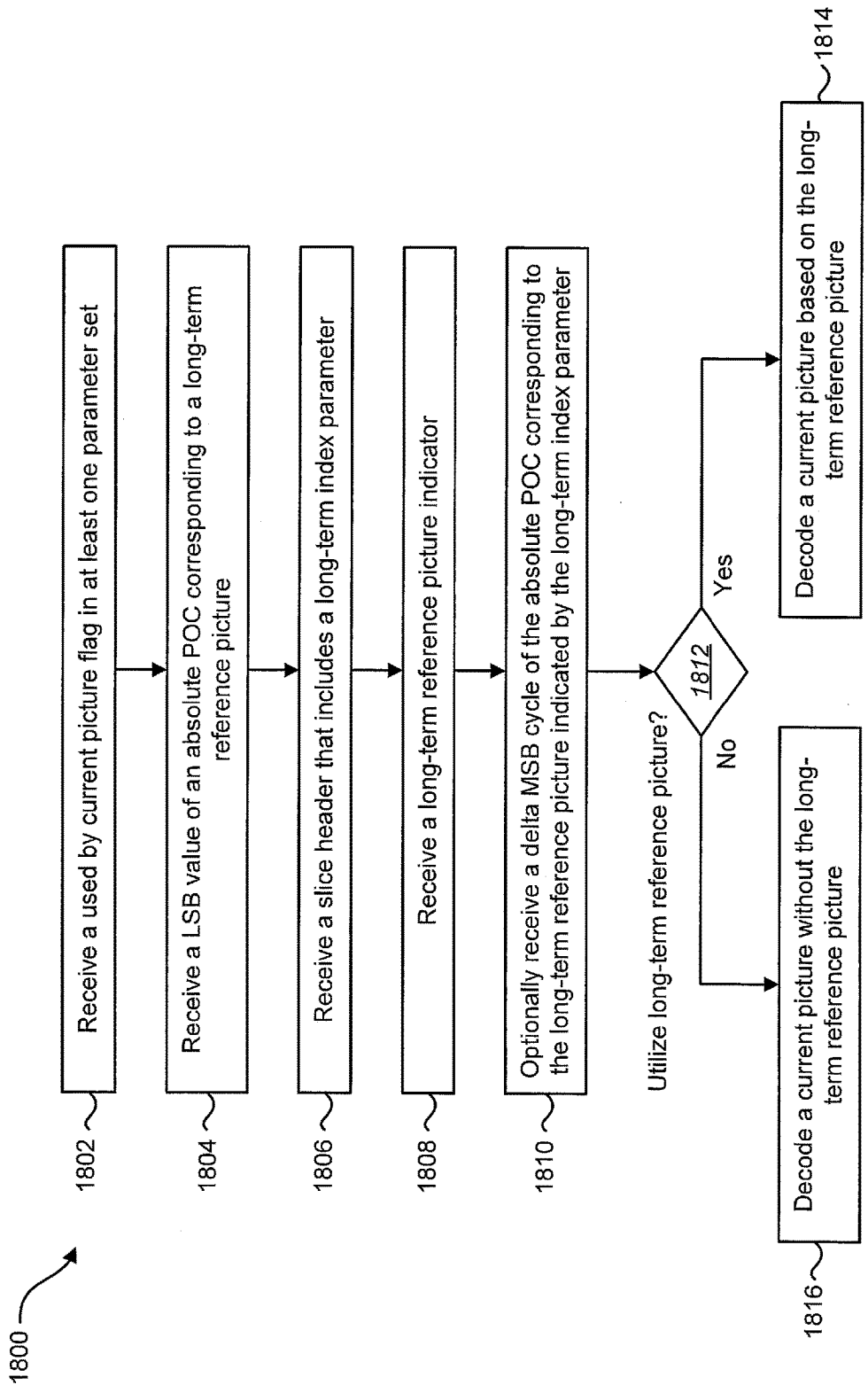

DEVICE FOR SIGNALING A LONG-TERM REFERENCE PICTURE IN A PARAMETER SET

CROSS REFERENCE TO RELATED APPLICATIONS

This application is the National Phase of PCT/JP2013/00401 filed on Jun. 26, 2013, which claims priority under 35 U.S.C. 119(e) to U.S. Provisional Application No. 61/666,882 filed on Jul. 1, 2012, all of which are hereby expressly incorporated by reference into the present application.

TECHNICAL FIELD

The present disclosure relates generally to electronic devices. More specifically, the present disclosure relates to a device for signaling a long-term reference picture in a parameter set.

BACKGROUND ART

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and playback presents several challenges. As can be observed from this discussion, systems and methods that represent digital media more efficiently may be beneficial.

SUMMARY OF INVENTION

Technical Problem

It is desired to provide more efficient techniques for representing digital media.

Solution to Problem

An aspect of the invention provides an electronic device for decoding an electronic device for decoding an encoded image, comprising:
a unit for decoding the long-term reference picture set from the encoded image, wherein the long-term reference picture set comprises:
(a) a long-term reference picture indicator indicating whether to utilize one or more long-term reference pictures for inter prediction;
(b) the number of the long-term reference pictures that are specified in a parameter set;
(c) one or more least significant bit (LSB) values of an absolute Picture Order Count (POC) corresponding to one of the long-term reference pictures;
(d) and one or more used by current picture flags indicating whether to utilize the long-term reference picture associated with the LSB value of the absolute POC for a current picture;
and a unit for determining whether to utilize one of the long-term reference pictures based on the used by current picture flag.

Another aspect of the invention provides an electronic device for encoding an input image, comprising:
a unit for generating a long-term reference picture set, wherein the long-term reference picture set comprises:
(a) a long-term reference picture indicator indicating whether to utilize one or more long-term reference pictures for inter prediction;
(b) the number of the long-term reference pictures that are specified in a parameter set;
(c) one or more least significant bit (LSB) values of an absolute Picture Order Count (POC) corresponding to one of the long-term reference pictures;
(d) and one or more used by current picture flags indicating whether to utilize the long-term reference picture associated with the LSB value of the absolute POC for a current picture;
and a unit for encoding the long-term reference picture set.

Another aspect of the invention provides a method for decoding an encoded image by an electronic device, comprising:
decoding the long-term reference picture set from the encoded image, wherein the long-term reference picture set comprises:
(a) a long-term reference picture indicator indicating whether to utilize one or more long-term reference pictures for inter prediction;
(b) the number of the long-term reference pictures that are specified in a parameter set;
(c) one or more LSB values of an absolute POC corresponding to one of the long-term reference pictures;
(d) and one or more used by current picture flags indicating whether to utilize the long-term reference picture associated with the LSB value of the absolute POC for a current picture;
and determining whether to utilize one of the long-term reference pictures based on the used by current picture flag.

Another aspect of the invention provides a method for encoding an input image by an electronic device, comprising:
generating a long-term reference picture set, wherein the long-term reference picture set comprises:
(a) a long-term reference picture indicator indicating whether to utilize one or more long-term reference pictures for inter prediction;
(b) the number of the long-term reference pictures that are specified in a parameter set;
(c) one or more least significant bit (LSB) values of an absolute Picture Order Count (POC) corresponding to one of the long-term reference pictures;
(d) and one or more used by current picture flags indicating whether to utilize the long-term reference picture associated with the LSB value of the absolute POC for a current picture;
and encoding the long-term reference picture set.

Advantageous Effects of Invention

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 18 is a flow diagram illustrating one configuration of a method for receiving a long-term reference picture indicator;

DESCRIPTION OF EMBODIMENTS

Figure 1:
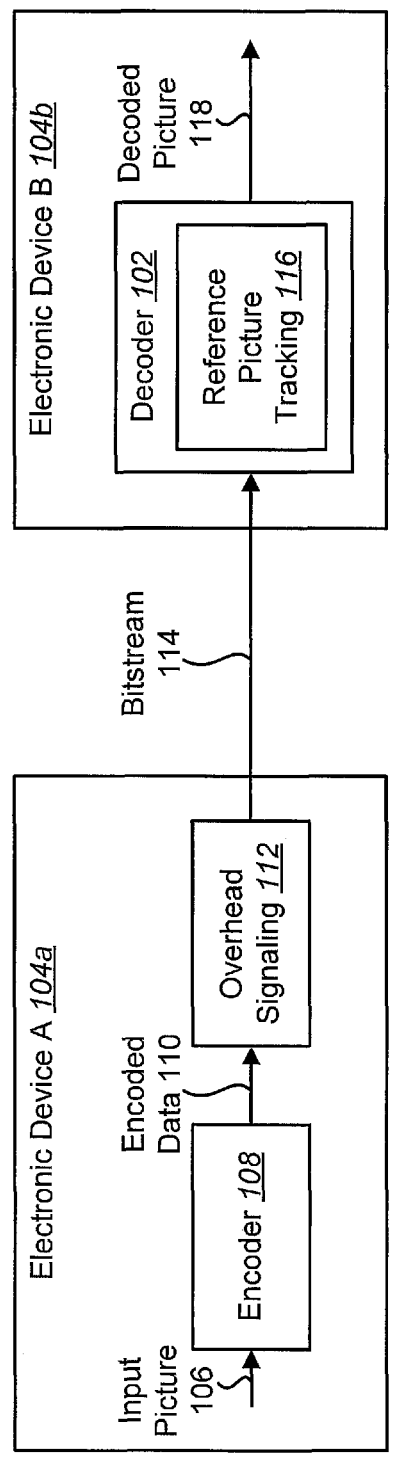
FIG. 1 is a block diagram illustrating an example of one or more electronic devices in which systems and methods for tracking a reference picture based on a designated picture may be implemented.

A method for sending a long-term reference picture indicator by an electronic device is described. A long-term reference picture indicator is generated. The long-term reference picture indicator is sent. An absolute Picture Order Count (POC) corresponding to a long-term reference picture is generated. The absolute POC includes a least significant bit (LSB) value. The LSB value of the absolute POC corresponding to a long-term reference picture is sent. A used by current picture flag corresponding to a current picture is generated. The used by current picture flag in at least one parameter set is sent.

The LSB value of the absolute POC may be sent in a Sequence Parameter Set (SPS), an Adaptation Parameter Set (APS), a Picture Parameter Set (PPS) and/or a Video Parameter Set (VPS). A slice header, including a long-term index parameter that corresponds to the absolute POC and the used by current picture flag in the at least one parameter set, may also be generated. The slice header may be sent.

A delta most significant bit (MSB) cycle of the absolute POC corresponding to the long-term reference picture indicated by the long-term index parameter may be sent, if required. Sending the delta MSB cycle of the absolute POC may be required when one or more POC LSB values from long-term reference pictures are the same. The delta MSB cycle of the absolute POC may be sent in the slice header. The long-term index parameter may be long_term_idx_sps[i].

The long-term reference picture indicator may be sent in a SPS, an APS, a PPS and/or a VPS. The used by current picture flag may be sent in a SPS, an APS, a PPS and/or a VPS. The used by current picture flag may be a used by curr_pic_lt_sps_flag[i] that specifies whether to utilize an i-th long-term reference picture indicated with an absolute POC in decoding the current picture.

The used by current picture flag may not be sent in a slice header. The long-term reference picture indicator may be a long-term reference picture present flag. The LSB value of the absolute POC corresponding to a long-term reference picture may not be received in a slice header.

A method for receiving a long-term reference picture indicator by an electronic device may also be described. A long-term reference picture indicator is received. A used by current picture flag in at least one parameter set is received. A LSB value of an absolute Picture Order Count (POC) corresponding to a long-term reference picture is received. A determination is made as to whether to utilize the long-term reference picture based on the used by current picture flag.

A slice header including a long-term index parameter that corresponds to the absolute POC and the used by current picture flag in the at least one parameter set may be received. A delta MSB cycle of the absolute POC corresponding to the long-term reference picture indicated by the long-term index parameter may be received, if required. A current picture may be decoded based on the long-term reference picture if it is determined to utilize the long-term reference picture. A current picture without the long-term reference picture may be decoded if it is determined not to utilize the long-term reference picture.

An electronic device for encoding a picture is described. The electronic device includes a processor and instructions stored in memory that are in electronic communication with the processor. The instructions are executable to generate a long-term reference picture indicator. The instructions are executable to send the long-term reference picture indicator. The instructions are also executable to generate an absolute Picture Order Count (POC) corresponding to a long-term reference picture. The absolute POC comprises a least significant bit (LSB) value. The instructions are additionally executable to send the LSB value of the absolute POC corresponding to a long-term reference picture. The instructions are further executable to generate a used by current picture flag corresponding to a current picture. The instructions are also executable to send the used by current picture flag in at least one parameter set.

An electronic device for decoding a picture is also described. The electronic device includes a processor and instructions stored in memory that are in electronic communication with the processor. The instructions are executable to receive a long-term reference picture indicator. The instructions are also executable to receive a used by current picture flag in at least one parameter set. The instructions are further executable to receive a LSB value of an absolute Picture Order Count (POC) corresponding to a long-term reference picture. The instructions are additionally executable to determine whether to utilize the long-term reference picture based on the used by current picture flag.

The systems and methods disclosed herein describe several configurations for tracking a reference picture based on a designated picture on an electronic device. For example, the systems and methods disclosed herein describe tracking a decoded reference picture in a decoded picture buffer (DPB) with reduced overhead referencing. For instance, several approaches for long-term reference picture signaling are described. It should be noted that the decoded picture buffer (DPB) may be a buffer holding decoded pictures for reference, output reordering or output delay specified for a hypothetical reference decoder.

On an electronic device, a decoded picture buffer (DPB) may be used to store reconstructed (e.g., decoded) pictures at a decoder. These stored pictures may then be used, for example, in an inter-prediction mechanism. When pictures are decoded out of order, the pictures may be stored in the DPB so they can be displayed later in order.

In the H.264 or advance video coding (AVC) standard, DPB management (e.g., deletion, addition of pictures, reordering of pictures, etc.) is carried out using memory management control operations (MMCO). For the upcoming high efficiency video coding (HEVC) standard, more reliable DPB management approaches are under consideration. One example of a more reliable approach is based on absolute signaling of reference pictures as detailed in "Absolute signaling of reference pictures" from the Joint Collaborative Team on Video Coding (JCT-VC) document JCTVC-F493.

JCTVC-F493 outlines absolute signaling of reference pictures to identify which reference pictures should be kept in the decoded picture buffer (DPB). JCTVC-F493 also proposes absolute signaling of reference pictures that support robust error management of reference pictures using Buffer Descriptions. In particular, JCTVC-F493 outlines two different approaches to identify which reference pictures are to be kept in the DPB based on a picture order count (POC). The picture order count (POC) may be a variable that is associated with each encoded picture and has a value that is increasing with increasing picture position in an output order with wrap-around.

In one example, assume that all pictures have a temporal identifier (temporalID)=0. Further assume that the current POC=5 and that the current DPB contains={3, 2}. Additionally assume that a definition in the Picture Parameter Set (PPS) is: BufferDescription0={deltaPOC=−1, temporalID=0}, {deltaPOC=−2, temporalID=0}. deltaPOC specifies the distance in POC value of reference picture from the current picture, where the current picture may be the picture being decoded. One approach given is to reference a buffer description in the PPS. In this approach, the slice header of a picture with POC=5 contains a reference to BufferDescription0 in the PPS. Assume that an action is to drop a decoded picture with POC=2 from the DPB and to add a decoded picture with POC=4 to the DPB. As a result, the DPB then contains={4, 3}.

In one configuration, the buffer description is defined as two lists denoted POCBD and TemporalIDBD and a variable NumberOfPicturesInBD present for all pictures. This is such that POCBD contains picture order count values of reference pictures and TemporalIDBD contains the corresponding temporal identifier of the reference picture, both lists containing NumberOfPicturesInBD values.

It should be noted that a temporalID may be defined as follows in the Joint Collaborative Team on Video Coding (JCT-VC) document JCTVC-F803: "temporalID specifies a temporal identifier for the NAL unit. The value of temporalID shall be the same for all NAL units of an access unit. When an access unit contains any NAL unit with the nal unit type equal to 5, temporalID shall be equal to 0." It should be noted that NAL may be an abbreviation for "network abstraction layer".

Another approach is to explicitly signal the contents of the DPB using a delta POC with respect to the current POC. In this approach, the slice header of a picture with POC=5 contains {deltaPOC=−1, temporalID=0} and {deltaPOC=−2, temporalID=0}. Assume that an action is to drop a decoded picture with POC=2 from the DPB and to add a decoded picture POC=4 to the DPB. As a result, the new DPB contains={4, 3}.

Some advantages of the approaches given by JCTVC-F493 are as follows. The approaches in JCTVC-F493 provide a simple mechanism. Furthermore, a loss of a picture is easily detected at the decoder. Additionally, dropping of entire layers of pictures with a higher temporal ID may be detected and well supported.

However, some disadvantages of the approaches given in JCTVC-F493 are given hereafter. The bit overhead for signaling a long-term reference picture can become large. Furthermore, a fixed number of bits may be allocated to communicate a POC. As a result, when a maximum value allowed by the number of bits being used is reached, the POC numbering should wrap around to 0. Thus, it may not be possible to guarantee that pictures can be uniquely identified using the POC.

The systems and methods disclosed herein may help to mitigate these disadvantages. In particular, the systems and methods disclosed herein may be beneficial by reducing the overhead associated with absolute long-term picture referencing and may enable pictures to be uniquely identified (e.g., a long-term (reference) picture may not be confused with other short-term or long-term pictures and vice-versa).

The systems and methods disclosed herein may provide one or more additional benefits that are described as follows. One or more configurations of the systems and methods disclosed herein may make full use of the available POC numbering space $$[0, \ldots, MaxPOC-1], \hspace{2cm} [Math.1]$$

where 'MaxPOC'=$2^{log2\_max\_pic\_order\_cnt\_minus4+4}$ and log 2_max_pic_order_cnt_minus4 specifies the value of the variable 'MaxPOC' that is used in the decoding process for picture order count. For example, one prior approach to resolving re-use of $$[0, \ldots, MaxPOC-1] \hspace{2cm} [Math.2]$$

after a POC wrap-around advocates that the POC currently in use are stepped over when assigning an identifier (e.g., a POC number) to a picture. This results in part of the POC space not being used. However, the systems and methods disclosed herein may resolve the stepping over of POC and the associated POC space shrinkage issue.

Another benefit may be that some configurations of the systems and methods disclosed herein for signaling may be self-contained in each picture. Thus, error re-silience may be better compared to a scheme that relies on information propagation from previous pictures (that could get lost or dropped). For example, one configuration of the decoded picture buffer (DPB) description does not rely on information embedded in other pictures to maintain the same DPB as an encoder.

Yet another benefit of some configurations of the systems and methods disclosed herein may be that if a picture is lost, the loss can be detected as soon as a buffer description is available at the decoder (which is at the next received picture). This allows the decoder to take corrective action. Yet another benefit is that if the POC resolution is sufficient, no extra bits are required.

JCTVC-H0496 proposes starting a bitstream with clean random access (CRA) pictures. This functionality has been incorporated in JCTVC-H1003. JCTVC-H1003 outlines signaling long-term reference pictures without using an absolute Picture Order Count (POC).

In some known approaches, signaling long-term reference pictures without using an absolute POC is described. For example, signaling long-term reference pictures without using an absolute POC is described in Benjamin Bros et al., "High efficiency video coding (HEVC) text specification draft 7", JCTVC-I1003, Geneva, May 2012.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating an example of one or more electronic devices 104 in which systems and methods for tracking a reference picture based on a designated picture may be implemented. In this example, electronic device A 104a and electronic device B 104b are illustrated. However, it should be noted that the features and/or functionality described in relation to electronic device A 104a and electronic device B 104b may be combined into a single electronic device in some configurations.

Electronic device A 104a includes an encoder 108 and an overhead signaling module 112. Each of the elements included within electronic device A 104a (e.g., the encoder 108 and the overhead signaling module 112) may be implemented in hardware, software or a combination of both.

Electronic device A 104a may obtain an input picture 106. In some configurations, the input picture 106 may be captured on electronic device A 104a using an image sensor, retrieved from memory and/or received from another electronic device.

The encoder 108 may encode the input picture 106 to produce encoded data 110. For example, the encoder 108 may encode a series of input pictures 106 (e.g., video). In one configuration, the encoder 108 may be a high-efficiency video coding (HEVC) encoder. The encoded data 110 may be digital data (e.g., a bitstream).

The overhead signaling module 112 may generate overhead signaling based on the encoded data 110. For example, the overhead signaling module 112 may add overhead data to the encoded data 110 such as slice header information, sequence parameter set (SPS) information, adaptive parameter set (APS) information, picture parameter set (PPS) information, video parameter set (VPS) information, picture order count (POC), reference picture designation, etc.

In some configurations, the overhead signaling module 112 may produce a wrap indicator that indicates a transition between two sets of pictures. In some configurations, the overhead signaling module 112 may produce a long-term reference picture indicator. The long-term reference picture indicator may be signaled in a parameter set, such as one or more of the sequence parameter set (SPS), the picture parameter set (PPS), the adaptive parameter set (APS) and the video parameter set (VPS). Sending a long-term reference picture indicator will be discussed in greater detail below in connection with FIG. 17. For example, electronic device A 104a may perform the method 1700 described in connection with FIG. 17 in some configurations.

More detail on kinds of overhead signaling that may be produced by electronic device A 104a is given below. In particular, none, one or more of the parameters, indicators or kinds of information described in relation to decoding below may be produced by the overhead signaling module 112, depending on the configuration. It should be noted that the overhead signaling module 112 may be included within the encoder 108 in some configurations. The overhead signaling module 112 may enable picture tracking with reduced overhead referencing.

The encoder 108 (and overhead signaling module 112, for example) may produce a bitstream 114. The bitstream 114 may include encoded picture data based on the input picture 106. In some configurations, the bitstream 114 may also include overhead data, such as slice header information, PPS information, etc. More detail on overhead data is given below. As additional input pictures 106 are encoded, the bitstream 114 may include one or more encoded pictures. For instance, the bitstream 114 may include one or more encoded reference pictures and/or other pictures.

The bitstream 114 may be provided to a decoder 102. In one example, the bitstream 114 may be transmitted to electronic device B 104b using a wired or wireless link. In some cases, this may be done over a network, such as the Internet or a Local Area Network (LAN). As illustrated in FIG. 1, the decoder 102 may be implemented on electronic device B 104b separately from the encoder 108 on electronic device A 104a. However, it should be noted that the encoder 108 and decoder 102 may be implemented on the same electronic device in some configurations. In an implementation where the encoder 108 and decoder 102 are implemented on the same electronic device, for instance, the bitstream 114 may be provided over a bus to the decoder 102 or stored in memory for retrieval by the decoder 102.

The decoder 102 may be implemented in hardware, software or a combination of both. In one configuration, the decoder 102 may be a high-efficiency video coding (HEVC) decoder. The decoder 102 may receive (e.g., obtain) the bitstream 114. The decoder 102 may generate a decoded picture 118 (e.g., one or more decoded pictures 118) based on the bitstream 114. The decoded picture 118 may be displayed, played back, stored in memory and/or transmitted to another device, etc.

The decoder 102 may include a reference picture tracking module 116. The reference picture tracking module 116 may enable the decoder 102 to track a reference picture with reduced overhead referencing. For example, the reference picture tracking module 116 may track a reference picture in a decoded picture buffer (DPB) using less overhead than is needed with prior approaches, such as approaches given in JCTVC-F493. Additionally of alternatively, the reference picture tracking module 116 may receive one or more of a long-term reference picture indicator and a used by current picture flag. For example, electronic device B 104b may perform the method 1800 described in connection with FIG. 18 below. In some configurations, the reference picture tracking module 116 may utilize an absolute POC to track one or more long-term reference pictures. More detail regarding receiving a long-term reference picture indicator is given below.

In prior approaches, for example, non-reduced overhead referencing may be used to specify the relationship between a current picture and a long-term reference picture. In prior approaches, for instance, the relationship between a current picture and a long-term reference picture may be specified by increasing the POC numbering space and thereby avoiding the POC wraparound issue. However, increasing the POC numbering space can only be achieved at the expense of an increased bit-requirement for POC. This example is one of several possible mechanisms that can be used to avoid the POC wrap around issue in prior approaches. However, this particular example demonstrates the larger overhead aspect for long-term pictures in prior approaches.

JCTVC-F493, for example, used a longterm_poc[i] field in a buffer description that specified an absolute POC and a longterm_temporal_id[i] field in the buffer description that specified a temporal ID for a long-term picture. This was later removed in JCTVC-F803, which did not include a mechanism for long-term pictures. In subsequent discussions, an approach of stepping over (long-term picture) POCs was given.

Problems may arise with the prior approaches. First, a large amount of overhead data may be needed to specify the relationship between a long-term reference picture and another picture. For instance, a large number of overhead bits may need to be allocated to adequately represent an integer number difference in POC between the long-term reference picture and another picture. Second, if a limited number of bits is specified to represent this difference, the difference may be ambiguously indicated when numbers are reused (because of number set cycling, for example).

The reference picture tracking module 116 may use one or more approaches or methods that are described in greater detail below in order to reduce referencing overhead. Some examples include using a cycle parameter and decrementing the cycle parameter based on wrap indicators or transitions between sets of pictures. Additionally or alternatively, the reference picture tracking module 116 may receive one or more of a long-term reference picture indicator and a used by current picture flag. The reference picture tracking module 116 may determine whether to utilize a long-term reference picture for decoding a current picture based on the used by current picture flag. In some configurations, the reference picture tracking module 116 may track a long-term reference picture based on an absolute POC.

It should be noted that a "reference picture" described herein may instead be a reference picture collection (e.g., group of frames) in some configurations. Accordingly, a "decoded reference picture" described herein may instead be a "decoded reference picture collection" in some configurations. For example, a reference picture collection may be applied in place of a single reference picture as described in conjunction with the systems and methods disclosed herein. The reference picture collection may include one or more reference pictures. Two or more reference pictures in the reference picture collection may correspond to the same time instant or different (e.g., similar) time instances. For example, in a 3-dimensional (3D) coding scenario, a bitstream 114 contains multiple pictures, where some pictures may refer to a left view and some pictures may refer to a right view. Thus, the reference picture collection may identify both the left and right pictures that correspond to a specific display time.

In another example, such as a scalable coding scenario, a bitstream may include pictures of different resolutions. In this example, the reference picture collection may include (e.g., identify) different resolution versions of the same picture.

Figure 2:
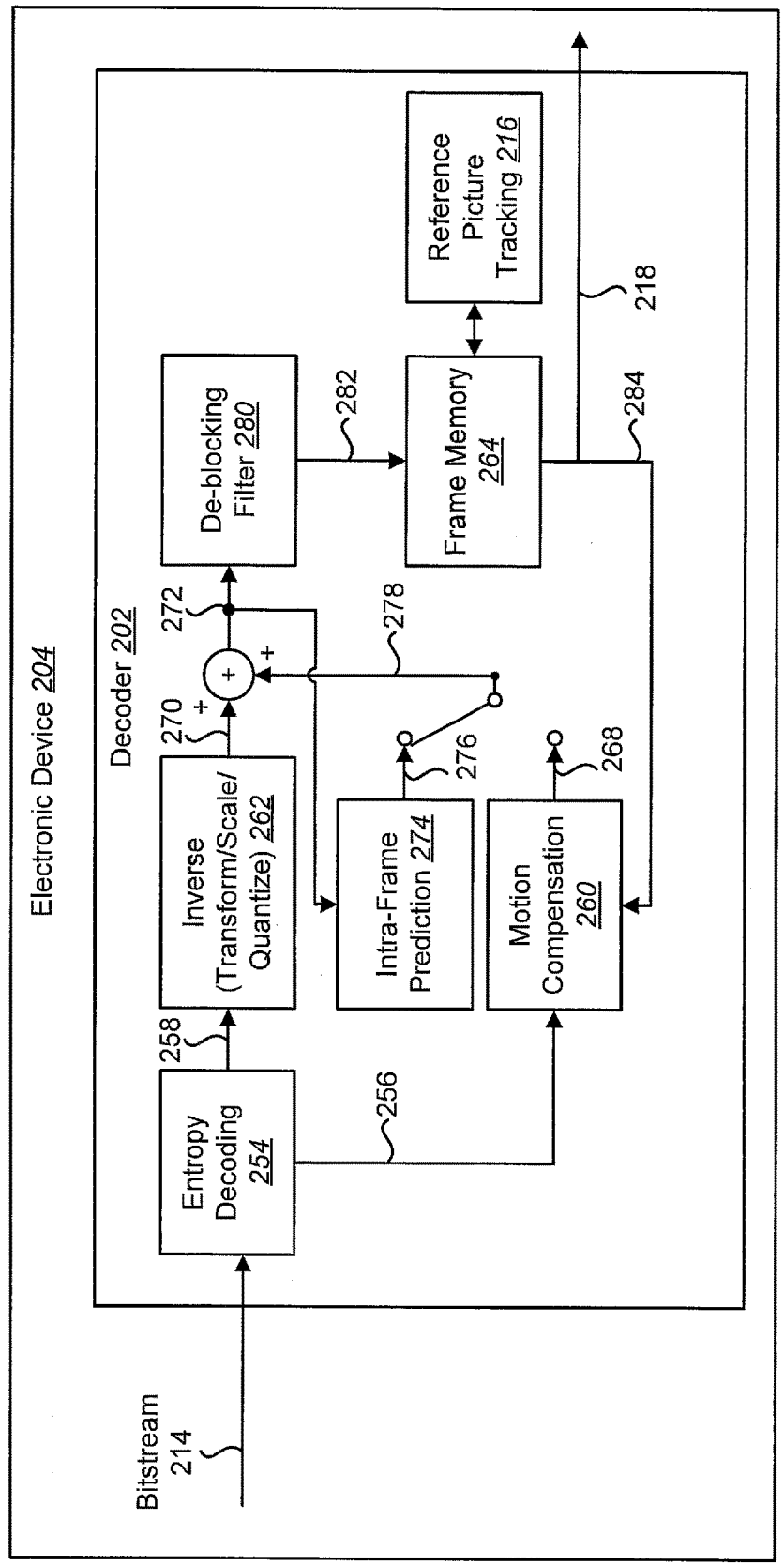
FIG. 2 is a block diagram illustrating one configuration of a decoder.

FIG. 2 is a block diagram illustrating one configuration of a decoder 202. The decoder 202 may be included in an electronic device 204. For example, the decoder 202 may be a high-efficiency video coding (HEVC) decoder. The decoder 202 and/or one or more of the elements illustrated as included in the decoder 202 may be implemented in hardware, software or a combination of both. The decoder 202 may receive a bitstream 214 (e.g., one or more encoded pictures included in the bitstream 214) for decoding. In some configurations, the received bitstream 214 may include received overhead information, such as a received slice header, received PPS, received buffer description information, etc. The encoded pictures included in the bitstream 214 may include one or more encoded reference pictures and/or one or more other encoded pictures.

Received symbols (in the one or more encoded pictures included in the bitstream 214) may be entropy decoded by an entropy decoding module 254, thereby producing a motion information signal 256 and quantized, scaled and/or transformed coefficients 258.

The motion information signal 256 may be combined with a portion of a reference frame signal 284 from a frame memory 264 at a motion compensation module 260, which may produce an inter-frame prediction signal 268. The quantized, descaled and/or transformed coefficients 258 may be inverse quantized, scaled and inverse transformed by an inverse module 262, thereby producing a decoded residual signal 270. The decoded residual signal 270 may be added to a prediction signal 278 to produce a combined signal 272. The prediction signal 278 may be a signal selected from either the inter-frame prediction signal 268 or an intra-frame prediction signal 276 produced by an intra-frame prediction module 274. In some configurations, this signal selection may be based on (e.g., controlled by) the bitstream 214.

The intra-frame prediction signal 276 may be predicted from previously decoded information from the combined signal 272 (in the current frame, for example). The combined signal 272 may also be filtered by a de-blocking filter 280. The resulting filtered signal 282 may be written to frame memory 264. The resulting filtered signal 282 may include a decoded picture.

The frame memory 264 may include a decoded picture buffer (DPB) as described herein. The DPB may include one or more decoded pictures that may be maintained as short or long-term reference frames. The frame memory 264 may also include overhead information corresponding to the decoded pictures. For example, the frame memory 264 may include slice headers, picture parameter set (PPS) information, cycle parameters, buffer description information, etc. One or more of these pieces of information may be signaled from an encoder (e.g., encoder 108, overhead signaling module 112). The frame memory 264 may provide a decoded picture 218.

The decoder 202 may include a reference picture tracking module 216. The reference picture tracking module 216 may track one or more reference pictures in the frame memory 264 with reduced referencing overhead. In one example, the reference picture tracking module 216 may track long-term reference pictures using a cycle parameter and modifying (e.g., decrementing) the cycle parameter based on received wrap indicators. In another example, an update of all reference picture cycle parameters may be carried out with respect to the picture being decoded. This update procedure may be executed once for the current picture (e.g., the picture being decoded). The transition between cycles may be kept track of implicitly with the help of the POC. At times the cycle parameter may be increased (when the transition is from picture set 'n' to picture set 'n–1' as may occur in out-of-order picture decoding, for example). Greater detail on one or more approaches to tracking a reference picture based on a designated picture is given below.

Additionally or alternatively, the reference picture tracking module 216 may track long-term reference pictures using a long-term reference picture indicator. The long-term reference picture indicator may be part of a parameter set obtained by the decoder 202, such as the sequence parameter set (SPS), the picture parameter set (PPS) and/or the adaptive parameter set (APS). Receiving and a tracking a long-term reference picture indicator will be discussed in greater detail below in connection with FIG. 18.

The reference picture tracking module 216 may receive a used by current picture flag. The used by current picture flag may be received in one or more parameter sets (e.g., SPS, PPS, APS). The reference picture tracking module 216 may determine whether to utilize the long-term reference picture for decoding a current picture based on the used by current picture flag. In some configurations, the reference picture tracking module 216 may track a long-term reference picture based on an absolute POC. In some configurations, the electronic device 204 may perform the method 1800 described in connection with FIG. 18.

Some configurations of the systems and methods disclosed herein may use a modified buffer description. Examples of the modified buffer description are given hereafter. The buffer description may be modified to include "POC", "poc_cycle" and "temporalID" for long-term reference pictures. It should be noted that "poc_cycle" may be one example of the cycle parameter described herein. The (modified) buffer descriptions, (modified) syntaxes and/or parameters given in accordance with the systems and methods disclosed herein may enable reduced overhead referencing.

Table 1 below gives one example comparing the buffer description within the PPS in a prior approach and one proposed approach in accordance with the systems and methods disclosed herein. The prior approach is detailed in the "candidate working draft text of ad-hoc group 21" document (AHG21) that was created to further the work in JCTVC-F493. It should be noted that AHG21 (JCTVC-F803) separately groups and specifies "negative pictures" (e.g., those that have negative deltaPOC values) and "positive pictures" (e.g., those pictures that have positive deltaPOC values).

TABLE 1

| AHG21 Buffer Description | Proposed Buffer Description |
|---|---|
| deltaPOC$_0$, temporalID$_0$ | deltaPOC$_0$, temporalID$_0$ |
| deltaPOC$_1$, temporalID$_1$ | deltaPOC$_1$, temporalID$_1$ |
| deltaPOC$_2$, temporalID$_2$ | deltaPOC$_2$, temporalID$_2$ |
| deltaPOC$_3$, temporalID$_3$ | (POC$_0$, poc_cycles$_0$, temporalID$_3$) |
| deltaPOC$_4$, temporalID$_4$ | (POC$_1$, poc_cycles$_1$, temporalID$_4$) |

In Table 1 illustrated above, $$(POC_0, poc\_cycles_0, temporalID_3) \quad [\text{Math.3}]$$

and $$(POC_1, poc\_cycles_1, temporalID_4) \quad [\text{Math.4}]$$

represent long-term (reference) pictures. It should be noted that the buffer description may include two lists POCBD and TemporalIDBD for short-term reference pictures (corresponding to POC and TemporalID fields, respectively). Furthermore, the buffer description may include three lists: POCBD, POC_CYCLE_BD and TemporalIDBD for long-term reference pictures (corresponding to POC, poc_cycle and TemporalID fields, respectively).

In some configurations, multiple buffer descriptions are defined in the picture parameter set. Each buffer description, with index i, contains lists for reference pictures: POCBD_pps[i], POC_CYCLE_pps[i], DeltaPOCBD_pps[i] and TemporalIDBD_pps[i] and a variable NumberOfPicturesInBD_pps[i]. The i-th list of POCBD_pps[i] contains picture order count values of reference pictures. The i-th list of POC_CYCLE_pps[i] contains poc_cycle values of reference pictures. The i-th list of TemporalIDBD_pps[i] contains the corresponding temporal identifier of the reference picture. Furthermore, the i-th list of TemporalIDBD_pps[i] contains Num-berOfPicturesInBD_pps[i] entries. The collection of lists are referred to as POC_pps, POC_CYCLE_pps, DeltaPOCBD_pps and TemporalIDBD_pps. For deltaPOC referencing, a single list DeltaPOCBD_pps[i] contains the deltaPOC values of reference pictures. It should be noted that in the candidate working draft text of ad-hoc group 21, DeltaPOCBD_pps may be referred to as DeltaPOCBD. The sum of the entries in the list POCBD_pps[i] and the list DeltaPOCBD_pps[i] is given by the value NumberOfPicturesInBD_pps[i]. Moreover, the number of entries in POCBD_pps[i] and POC_CYCLE_pps[i] are the same.

It should be noted that the syntax given in AHG21 does not adequately support fixed long-term referencing. Listing (1) below illustrates one example of a bitstream syntax modification required to a candidate working draft text of ad-hoc group 21 (AHG21). The changes due to the prior approach are given in bold text in Listing (1).

Listing (1)

```
/* Picture parameter set raw byte sequence payload (RBSP) syntax
*/
pic_parameter_set_rbsp( ) {
  ...
  bits_for_temporal_id_in_buffer_descriptions
  positive_pictures_in_buffer_descriptions_flag
  number_of_bds
  if( number_of_bds > 0 ) {
    for(i = 0; i < number_of_bds; i++){
      number_of_negative_pictures_pps[i]
      for( j = 0; j < number_of_negative_pictures_pps[i]; j++ ) {
        negative_delta_poc_minus_one_pps[i][j]
```

-continued

Listing (1)

```
        if( bits_for_temporal_id_in_buffer_descriptions > 0 )
            temporal_id_negative_pps[i][j]
        }
    if( positive_pictures_in_buffer_descriptions_flag ){
        number_of_positive_pictures_pps[i]
        for( j = 0; j < number_of_positive_pictures_pps[i]; j++ ) {
            delta_poc_minus_one_pps[i][j]
            if( bits_for_temporal_id_in_buffer_descriptions > 0 )
                temporal_id_positive_pps[i][j]
        }
    }
    number_of_longterm_pictures_pps[i]
    for( j = 0; j < number_of_longterm_pictures_pps[i]; j++ ) {
        poc_pps[i][j]
        poc_cycle_pps[i][j]
        if( bits_for_temporal_id_in_buffer_descriptions > 0 )
            temporal_id_poc_pps[i][j]
        }
    }
}
...
}
``` positive_pictures_in_buffer_descriptions_flag specifies if there are any buffer description pictures with positive deltaPOC. bits_for_temporal_id_in_buffer_descriptions specifies the number of bits used for temporal_id_negative_pps[i][j], temporal_id_positive_pps[i][j], temporal_id_poc_pps[i][j], temporal_id_negative[i] and temporal_id_positive[i]. number_of_bds specifies the number of buffer descriptions in a picture parameter set. number_of_negative_pictures_pps[i] specifies the number of entries in the list DeltaPOCBD_pps[i] with negative values. number_of_negative_pictures_pps[i] defines the value of OffsetBD[i] as OffsetBD[i]=number_of_negative_pictures_pps[i]. The value of number_of_negative_pictures_pps[i] shall be in the range of 0 to max_num_ref_frames, inclusive. negative_delta_poc_minus_one_pps[i][j] specifies an absolute distance in POC value. max_num_ref_frames specifies the maximum number of reference frames, complementary reference field pairs, and non-paired reference fields that may be used by the decoding process for inter prediction of any picture in the sequence. Here, a reference field denotes a portion of a reference frame. For example, in an application using interlaced video, a reference frame may consist of two reference fields. The first reference field may include a first subset of the data in the reference frame and the second reference field may include a second subset of the data in the reference frame, where the first subset and second subset correspond to different data.

negative_delta_poc_minus_one_pps[i][j] defines the value of the variable DeltaPOCBD_pps[i][j] as DeltaPOCBD_pps[i][j]=−(negative_delta_poc_minus_one_pps[i][j]+1) if j equals 0. Also, negative_delta_poc_minus_one_pps[i][j] defines the value of the variable DeltaPOCBD_pps[i][j] as DeltaPOCBD_pps[i][j]=DeltaPOCBD_pps[i][j−1]−(negative_delta_poc_minus_one_pps[i][j]+1) if j>0. DeltaPOCBD_pps[i][j] shall be in the range of −1 to −MaxPOC/2.

temporal_id_negative_pps[i][j] specifies a temporal identifier and shall be represented by bits_for_temporal_id_in_buffer_descriptions bits. temporal_id_negative_pps[i][j] is added to the list TemporalIDBD_pps[i]. In one configuration of the above, the addition operation is an appending operation. In another configuration, the appending operation is an operation that replaces items in the list in a predefined order. temporal_id_negative_pps[i][j] shall be in the range of 0 to max_temporal_layers_minus1, inclusive. max_temporal_layers_minus1+1 specifies the maximum number of temporal layers present in a sequence.

number_of_positive_pictures_in_bd_pps[i] specifies the number of entries in the list DeltaPOCBD_pps[i] that have a positive value. The value of the number_of_positive_pictures_in_bd_pps[i] shall be in the range of 0 to max_num_ref_frames-OffsetBD[i], inclusive. When the number_of_positive_pictures_in_bd_pps[i] syntax element is not present, the value of number_of_positive_pictures_in_bd_pps[i] shall be inferred to be equal to 0.

delta_poc_minus_one_pps[i][j] specifies an absolute distance in POC value. delta_poc_minus_one_pps[i][j] defines the value of the variable DeltaPOCBD_pps[i][j+OffsetBD[i]] as DeltaPOCBD_pps[i][j+OffsetBD[i]]=delta_poc_minus_one_pps[i][j]+1 if j is equal to 0 and as DeltaPOCBD_pps[i] [j+OffsetBD[i]]=DeltaPOCBD_pps[i][j−1+OffsetBD[i]]+delta_poc_minus_one_pps[i][j]+1 if j>0. DeltaPOCBD_pps[i][j+OffsetBD[i]] shall be in the range of 1 to MaxPOC/2-1.

temporal_id_positive_pps[i][j] specifies a temporal identifier and shall be represented by bits_for_temporal_id_in_buffer_descriptions bits. temporal_id_positive_pps[i][j] defines the value of the variable TemporalIDBD_pps[i][j] as TemporalIDBD_pps[i][j+OffsetBD[i]]=temporal_id_positive_pps[i][j]. temporal_id_positive_pps[i][j] shall be in the range of 0 to max_temporal_layers_minus1, inclusive.

Examples of descriptions of the parameters in Listing (1) are given as follows. number_of_longterm_pictures_pps[i] specifies the number of entries in the list POCBD_pps[i] and POC_CYCLE_BD_pps[i]. The value of number_of_longterm_pictures_pps[i] shall be in the range of 0 to max_num_ref_frames, inclusive. max_num_ref_frames specifies the maximum number of short-term and long-term reference frames. poc_pps[i][j] specifies POC value and defines the value to be added to the list POCBD_pps[i]. In one configuration of the above, the addition operation is an appending operation. In another configuration, the appending (or addition) operation is an operation that replaces items in the list in a predefined order. poc_pps[i][j] shall be in the range of 0 to MaxPOC-1.

poc_cycle_pps[i][j] specifies poc_cycle (e.g., the cycle parameter) value and defines the value to be added to the list POC_CYCLE_BD_pps[i]. In one configuration of the above, the addition operation is an appending operation. In another configuration, the appending (or addition) operation is an operation that replaces items in the list in a predefined order. poc_cycle_pps[i][j] (e.g., the cycle parameter) may be less than or equal to zero in some configurations. In such a case, a signed integer may be used to represent the cycle parameter. In other configurations, an unsigned integer may be used to represent the cycle parameter.

temporal_id_poc_pps[i][j] specifies a temporal identifier and shall be present if bits_for_temporal_id_in_buffer_descriptions >0. temporal_id_poc_pps[i][j] defines the value of the entries in the list TemporalIDBD_pps[i]. temporal_id_poc_pps[i][j] is added to the list TemporalIDBD_pps[i]. In one configuration of the above, the addition operation is an appending operation. In another configuration, the appending (or addition) operation is an operation that replaces items in the list in a predefined order. temporal_id_poc_pps[i][j] shall be in the range of 0 to max_temporal_layers_minus1, inclusive. max_temporal_layers_minus1+1 specifies the maximum number of temporal layers present in a sequence. It should be noted that the variable NumberOfPictures-InBD_pps[i] may be calculated as number_of_negative_pictures_pps[i]+number_of_positive_pictures_pps[i]+number_of_longterm_pictures_pps[i].

The negative and positive deltaPOC values for the reference picture transmitted in the i-th picture parameter set buffer description are added to the list DeltaPOCBD_pps[i]. In one configuration of the above, the addition operation is an appending operation. In another configuration, the appending (or addition) operation is an operation that replaces items in the list in a predefined order.

Listing (2) below illustrates an alternative example configuration where multiple buffer descriptions may be created within a PPS with different cycle parameters (e.g., poc_cycles) using the following syntax. The changes due to the prior approach are given in bold text in Listing (2).

---

Listing (2)

```
/* Picture parameter set RBSP syntax
*/
pic_parameter_set_rbsp( ) {
   ...
   bits_for_temporal_id_in_buffer_descriptions
   positive_pictures_in_buffer_descriptions_flag
   number_of_bds
   if( number_of_bds > 0 ) {
      for(i = 0; i < number_of_bds; i++){
         number_of_negative_pictures_pps[i]
         for( j = 0; j < number_of_negative_pictures_pps[i]; j++ ) {
            negative_delta_poc_minus_one_pps[i][j]
            if( bits_for_temporal_id_in_buffer_descriptions > 0 )
               temporal_id_negative_pps[i][j]
         }
         if( positive_pictures_in_buffer_descriptions_flag ){
            number_of_positive_pictures_pps[i]
            for( j = 0; j < number_of_positive_pictures_pps[i];
               j++ ) {
               delta_poc_minus_one_pps[i][j]
               if( bits_for_temporal_id_in_buffer_descriptions > 0 )
                  temporal_id_positive_pps[i][j]
            }
         }
         number_of_longterm_pictures_pps[i]
         for( j = 0; j < number_of_longterm_pictures_pps[i];
            j++ ) {
            poc_pps[i][j]
            poc_cycle_pps[i][j]
            poc_cycle_steps_flag
            if (poc_cycle_steps_flag) {
               poc_cycle_steps
            }
            if( bits_for_temporal_id_in_buffer_descriptions > 0 )
               temporal_id_poc_pps[i][j]
         }
      }
   }
   ...
}
```

---

In Listing (2), examples of descriptions of further parameters are given as follows. When set to 1, poc_cycle_steps_flag specifies that additional buffer descriptions shall be generated for the signaled buffer description model that are identical to the signaled buffer description model except for the poc_cycle_count. poc_cycle_steps_flag shall be 0 by default. Furthermore, poc_cycle_steps specifies the number of additional buffer descriptions that shall be generated for the signaled buffer description model. The additional buffer descriptions shall be identical to the signaled buffer description except that the poc_cycle count shall be decreased. In one configuration, the additional buffer descriptions generated have poc_cycle_pps[i][j] values of $-1,-2,-3,\ldots,-(\text{poc\_cycle\_steps})$.

In some configurations, resolution switching may be enabled within a bitstream. In these configurations, the resolution of the reference pictures may be different from the resolution of the current picture. Thus, it may be beneficial to know which mechanism may be used to scale the reference pictures to the right resolution. One way of signaling the mechanism is to signal it explicitly along with the buffer description. For example, an encoder 108 (e.g., overhead signaling module 112) may signal a scaling parameter 's' to the decoder 102. Thus, an alternative buffer description may be shown in Table 2.

TABLE 2

| Alternative Buffer Description |
|---|
| $\text{deltaPOC}_0$, $\text{temporalID}_0$ |
| $\text{deltaPOC}_1$, $\text{temporalID}_1$ |
| $\text{deltaPOC}_2$, $\text{temporalID}_2$, $s_0$ |
| ($\text{POC}_0$, $\text{poc\_cycles}_0$, $\text{temporalID}_3$, $s_1$) |
| ($\text{POC}_1$, $\text{poc\_cycles}_1$, $\text{temporalID}_4$, $s_2$) |

In Table (2), the first two entries have the resolution matching that of the current picture. However the remaining three entries have a different resolution and may use the scaling parameter, $$s_0, s_1, s_2, \quad \text{[Math.5]}$$

respectively. The scaling parameter may be signaled selectively. For example, it may be signaled only if the current picture and the reference picture have a different resolution. In another configuration, the scaling parameter may always be signaled. In yet another configuration the scaling parameter may be inferred implicitly (by a decoder), for example, by using a look up table indexed by current picture characteristics (e.g., resolution) and the referenced picture characteristics (e.g., resolution).

In yet another configuration, the scaling parameter may be signaled for any subset of pictures defined in the buffer description. For example, the scaling parameter may be signaled for a subset of reference pictures signaled using positive deltaPOC values, a subset of reference pictures signaled using negative deltaPOC values, a subset of pictures signaled using POC and poc_cycle. In one configuration, a subset may include the entire list. One example is illustrated in Table (3) below, where $$\text{negativeDeltaPOC}_0 \quad \text{[Math.6]}$$

and $$\text{negativeDeltaPOC}_1 \quad \text{[Math.7]}$$

are negative delta POC values, $$\text{positiveDeltaPOC}_2 \quad \text{[Math.8]}$$

is a positive delta POC value and $$s_0 \quad \text{[Math.9]}$$

$$s_1 \quad \text{[Math.10]}$$

$$s_2 \quad \text{[Math.11]}$$

$$s_3 \quad \text{[Math.12]}$$

and $$s_4 \quad \text{[Math.13]}$$

are the scaling parameters for a first entry, second entry, third entry, fourth entry and fifth entry, respectively.

TABLE 3

Alternative Buffer Description negativeDeltaPOC$_0$, temporalID$_0$, s$_0$
negativeDeltaPOC$_1$, temporalID$_1$, s$_1$
positiveDeltaPOC$_2$, temporalID$_2$, s$_2$
(POC$_0$, poc_cycles$_0$, temporalID$_3$, s$_3$)
(POC$_1$, poc_cycles$_1$, temporalID$_4$, s$_4$)

In yet another configuration, the scaling parameter may indicate the one or more resolutions of the reference picture to be kept in the decoded picture buffer. In yet another configuration, the scaling parameter may be used to signal the resolution of the reference picture to be used for a motion compensation process. In yet another configuration, if the resolution of the reference picture and the picture being decoded are not the same, the scaling parameter indicates the motion compensation process to use to generate predictions.

In one configuration, the scaling parameter signals (e.g., indicates) the change in horizontal and/or vertical resolution in pixels. In one configuration, the scaling parameter signals (e.g., indicates) the ratio between the desired and original horizontal and/or vertical resolution. In one configuration, the scaling parameter is a 2-tuple, where the first value identifies scaling for the horizontal resolution and the second value identifies scaling for the vertical resolution.

In some configurations, the transform coefficients of the reference picture may be processed based on the scaling parameter to obtain the desired resolution. This may be beneficial to enable better resolution adaptation by allowing only block sizes larger than a certain threshold while coding the reference picture.

In yet another configuration, the reconstructed pixels of the reference picture may be processed based on the scaling parameter to obtain the desired resolution. It should be noted that these configurations may be applied to all reference picture indexing schemes disclosed herein.

Listing (3) illustrates another example of syntax modification for the PPS from AHG21. In particular, Listing (3) illustrates one example of buffer description syntax used in slice headers as outlined in AHG21. However, modifications to the syntax given in AHG21 in accordance with the systems and methods disclosed herein are denoted in bold text in Listing (3).

Listing (3)

```
/* Buffer description
*/
buffer_description( ) {
  bd_reference_flag
  if(bd_reference_flag == 1) {
    bd_idx
    bd_poc_cycle_update_flag
    if (bd_poc_cycle_update_flag == 1)
      //begin for loop of long-term pictures POCBD_pps[bd_idx],
      POC_CYCLE_BD_pps[bd_idx] and
      TemporalIDBD_pps[bd_idx]override
      for( j = 0; j < number_of_longterm_pictures_pps[bd_idx];
      j++ ) {
        poc_pps_override[j]
        poc_cycle_pps_override[j]
        if( bits_for_temporal_id_in_buffer_descriptions > 0 )
          temporal_id_pps_override[j]
      }
      //end of for loop of long-term pictures POCBD_pps[bd_idx],
      POC_CYCLE_BD_pps[bd_idx] and
      TemporalIDBD_pps[bd_idx]override
  } else {
    number_of_negative_pictures
```

Listing (3)

```
    //begin for loop for negative deltaPOC pictures
    for( i = 0; i < number_of_negative_pictures; i++ ) {
      negative_delta_poc_minus_one[i]
      if( bits_for_temporal_id_in_buffer_descriptions > 0 )
        temporal_id_negative[i] }
    // end of for loop for negative deltaPOC pictures
    if( positive_pictures_in_buffer_descriptions_flag ){
      delta_poc_minus_one[i]
      if( bits_for_temporal_id_in_buffer_descriptions > 0 )
        temporal_id_positive[i] }
    number_of_longterm_pictures
    // begin for loop of explicitly signaled long-term pictures
    for( j = 0; j < number_of_longterm_pictures; j++ ) {
      poc[j]
      poc_cycle[j]
      if( bits_for_temporal_id_in_buffer_descriptions > 0 )
        temporal_id_poc[j]
    }
    //end of for loop of explicitly signaled long-term pictures
    if( number_of_negative_pictures +
    number_of_positive_pictures <
        max_num_ref_frames ) {
      combine_with_reference_flag
      if( combine_with_reference_flag )
        bd_combination_idx
    }
  }
}
```

Examples of descriptions of the parameters in Listing (3) are given as follows. A number_of_negative_pictures specifies the number of negative delta POC entries. number_of_negative_pictures defines the value of Offset as Offset=number_of_negative_pictures. The value of number_of_negative_pictures shall be in the range of 0 to max_num_ref_frames, inclusive.

negative_delta_poc_minus_one[i] specifies an absolute distance in POC value. negative_delta_poc_minus_one[i] defines the value of the variable POCBD[i] as POCBD[i]=(pic_order_cnt+MaxPOC−(negative_delta_poc_minus_one[i]+1)) % MaxPOC if i equals 0 and as POCBD[i]=(POCBD[i−1]+MaxPOC−(negative_delta_poc_minus_one[i]+1)) % MaxPOC if i>0. Here, pic_order_cnt is the POC of the current picture as signaled in the slice header. The value of negative_delta_poc_minus_one[i] shall be in the range of 0 to MaxPOC−1, inclusive. The value of POCBD[i] shall be such that the value of DiffPOC(currPic, refPic) is in the range of −1 to MaxPOC/2. Here, refPic is the reference picture with pic_order_cnt equal to POCBD[i].

DiffPOC(picA, picB) is specified as follows:

Code 1

```
if( POC(picA) > POC(picB) ) {
  if(POC(picA) − POC(picB) < MaxPOC / 2 )
    DiffPOC(picA, picB) = POC(picA) − POC(picB)
  else
    DiffPOC(picA, picB) = POC(picA) − MaxPOC −
      POC(picB)
}
else {
  if(POC(picB) − POC(picA) <= MaxPOC / 2 )
    DiffPOC(picA, picB) = POC(picA) − POC(picB)
  else
    DiffPOC(picA, picB) = POC(picA) + MaxPOC −
      POC(picB)
}
```

The function POC(picX) is specified as follows: POC(picX)=pic_order_cnt of picX. POC_CYCLE_BD[i] is set to the poc_cycle of the i-th negative deltaPOC reference picture. The poc_cycle of the i-th negative deltaPOC reference picture is calculated based on a designated picture.

temporal_id_negative[i] specifies a temporal identifier and shall be represented by bits_for_temporal_id_in_buffer_descriptions bits, where bits_for_temporal_id_in_buffer_descriptions is the syntax element from the picture parameter set used by the current picture. temporal_id_negative[i] defines the value of the variable TemporalIDBD[i] as TemporalIDBD[i]=temporal_id_negative[i]. temporal_id_negative[i] shall be in the range of 0 to max_temporal_layers_minus1, inclusive. The value of TemporalIDBD[i] is restricted such that TemporalIDBD[i] must be equal to the temporal_id signaled in the NAL-header of the reference picture with pic_order_cnt equal to POCBD[i].

number_of_positive_pictures specifies the number of entries in the list DeltaPOCBD_pps[i] with a positive value. The value of number_of_positive_pictures shall be in the range of 0 to max_num_ref_frames-Offset, inclusive. When the number_of_positive_pictures syntax element is not present, the value of number_of_positive_pictures shall be inferred to be equal to 0.

delta_poc_minus_one[i] specifies an absolute distance in POC value. delta_poc_minus_one[i] defines the value of the variable POCBD[i+Offset] as POCBD[i+Offset]=(pic_order_cnt+(delta_poc_minus_one[i]+1)) % MaxPOC if i equals 0 and as POCBD[i+Offset]=(POCBD[i−1+Offset]+(delta_poc_minus_one[i]+1)) % MaxPOC if i>0. Here, pic_order_cnt is the POC of the current picture as signaled in the slice header. The value of delta_poc_minus_one[i] shall be in the range of 0 to MaxPOC-1, inclusive. The value of POCBD[i+Offset] shall be such that the value of DiffPOC (currPic, refPic) is in the range of 1 to MaxPOC/2-1, where refPic is the reference picture with pic_order_cnt equal to POCBD[i+Offset]. POC_CYCLE_BD[i+Offset] is set to the poc_cycle of the i-th positive deltaPOC reference picture. The poc_cycle of the i-th positive deltaPOC reference picture is calculated based on a designated picture.

temporal_id_positive[i] specifies a temporal identifier and shall be represented by bits_for_temporal_id_in_buffer_descriptions bits, where bits_for_temporal_id_in_buffer_descriptions is the syntax element from the picture parameter set used by the current picture. temporal_id_positive[i] defines the value of the variable TemporalIDBD[i+Offset] as TemporalIDBD[i+Offset]=temporal_id_positive[i]. temporal_id_positive[i] shall be in the range of 0 to max_temporal_layers_minus1, inclusive. The value of TemporalIDBD[i] is restricted such that TemporalIDBD[i] must be equal to the temporal_id signaled in the NAL-header of the reference picture with pic_order_cnt equal to POCBD[i].

A bd_poc_cycle_update_flag equal to 1 specifies that the POC_CYCLE_BD_pps[bd_idx][j] of the referenced buffer description should be overridden for the current picture. In some configurations, future frames may also override poc_cycle information. If bd_poc_cycle_update_flag is 0 then the original POC_CYCLE_BD_pps[bd_idx][j] of the referenced buffer description are to be used. poc_cycle_pps_override[j] specifies the values to be used to override the values within the POC_CYCLE_BD_pps[bd_idx][j] for the current picture only. In an alternative configuration, poc_cycle_pps_override[j] specifies an offset. For the current picture only, (POC_CYCLE_BD_pps[bd_idx][j]+poc_cycle_pps_override[j]) may be used instead of POC_CYCLE_BD_pps[bd_idx][j].

poc_pps_override[j] specifies the values to be used to override the values within the POCBD_pps[bd_idx][j] for the current picture only. In an alternative configuration, poc_pps_override[j] specifies an offset. For the current picture only, (POCBD_pps[bd_idx][j]+poc_pps_override[j]) may be used instead of POCBD_pps[bd_idx][j]. temporal_id_pps_override[j] specifies the values to be used to override the values within the TemporalIDBD_pps[bd_idx][j] for the current picture only. In an alternative configuration, temporal_id_pps_override[j] specifies an offset. For the current picture only, (TemporalIDBD_pps[bd_idx][j]+temporal_id_pps_override[j]) may be used instead of TemporalIDBD_pps[bd_idx][j].

number_of_longterm_pictures specifies the number of long-term picture entries in the list POCBD and POC_CYCLE_BD. The value of number_of_longterm_pictures shall be in the range of 0 to max_num_ref_frames, inclusive. max_num_ref_frames specifies the maximum number of short-term and long-term reference frames. poc[j] specifies a POC value to be added to the list POCBD. In one configuration of the above, the addition operation is an appending operation. In another configuration, the appending (or addition) operation is an operation that replaces items in the list in a predefined order. poc[j] shall be in the range of 0 to MaxPOC-1.

poc_cycle[j] (e.g., the cycle parameter) specifies poc_cycle value and defines the value to be added to the list POC_CYCLE_BD. In one configuration of the above, the addition operation is an appending operation. In another configuration, the appending (or addition) operation is an operation that replaces items in the list in a predefined order. poc_cycle[j] may be less than or equal to zero or may occupy a different numerical range.

temporal_id_poc[j] specifies a temporal identifier and shall be represented by bits_for_temporal_id_in_buffer_descriptions bits. temporal_id_poc[j] defines the value to be added to the list TemporalIDBD. In one configuration of the above, the addition operation is an appending operation. In another configuration, the appending (or addition) operation is an operation that replaces items in the list in a predefined order. temporal_id_poc[i][j] shall be in the range of 0 to max_temporal_layers_minus1, inclusive. max_temporal_layers_minus1+1 specifies the maximum number of temporal layers present in a sequence.

In some configurations, number_of_longterm_pictures_pps[bd_idx] may be transmitted before the "for" loop illustrated in Listing (3), thereby avoiding a de-pendency on a slice header with PPS. Alternatively, bd_poc_cycle_update_flag may be replaced with another parameter, num_longterm_poccycle_override_count. For example, relevant code in Listing (3) above may be replaced with "If num_longterm_poccycle_override_count>0 then For (j=0; j<num_longterm_poccycle_override_count; j++) { .... }".

A bd_reference_flag equal to 1 specifies that the buffer description of the current picture shall be created using syntax elements not transmitted in the slice header. In one configuration, the buffer description for the current picture is created using syntax elements in the picture parameter set. A buffer_description_reference_flag equal to 0 specifies that the buffer description of the current picture shall be created by a combination of buffer descriptions transmitted in the slice header and buffer descriptions not transmitted in the slice header. In one configuration, the buffer descriptions not transmitted in the slice header are transmitted in the picture parameter set.

bd_idx identifies a buffer description in a set of available buffer descriptions. In one configuration, bd_idx specifies an index in the lists POCBD_pps, DeltaPOCBD_pps, POC_

CYCLE_BD_pps, and TemporalIDBD_pps that shall be used for the creation of the buffer description of the current picture.

The values corresponding to deltaPOC referenced pictures in (DeltaPOCBD_pps[bd_idx], TemporalIDBD_pps[bd_idx]) are converted to picture order count (e.g., POC), cycle parameter (e.g., poc_cycle) and temporal identifier and added to the picture buffer description lists POCBD, POC_CYCLE_BD and TemporalIDBD. The values in the lists (POCBD_pps[bd_idx], POC_CYCLE_BD_pps[bd_idx], TemporalIDBD_pps[bd_idx]) corresponding to reference pictures are added to the picture buffer description lists POCBD, POC_CYCLE_BD and TemporalIDBD. In one configuration of the above, the addition operation is an appending operation. In another configuration, the appending (or addition) operation is an operation that replaces items in the list in a predefined order.

A combine_with_reference_flag equal to 1 specifies that syntax elements from the active PPS are used to assign values in lists POCBD, POC_CYCLE_BD and TemporalIDBD in combination with explicit signaling. When the combine_with_reference_flag syntax element is not present, the value of combine_with_reference_flag shall be inferred to be equal to 0.

bd_combination_idx specifies an index in the lists DeltaPOCBD_pps and TemporalIDBD_pps that shall be used for creation of the buffer description of the current picture in combination with explicit signaling. bd_combination_idx shall be represented by ceil(log 2(number_of_bds)) bits. The value of bd_combination_idx shall be in the range of 0 to number_of_bds-1, where number_of_bds is the syntax element from the picture parameter set used by the current picture. The current pictures in POCBD, POC_CYCLE_BD and TemporalIDBD lists are then added values from the lists DeltaPOCBD_pps[bd_idx], POCBD_pps[bd_idx], POC_CYCLE_BD_pps[bd_idx] and TemporalIDBD_pps[bd_idx] using a pre-defined mechanism. In one configuration of the above, the addition operation is an appending operation. In another configuration, the appending (or addition) operation is an operation that replaces items in the list in a predefined order.

Some examples of ways in which the systems and methods described herein may be applied are given hereafter. Assume that a picture with POC=0 on is a long-term (reference) picture used by a picture with POC=

$$\text{MaxPOC}-1 \qquad [\text{Math.14}]$$

and a picture with POC=0 from a subsequent picture set. The long-term (reference) picture may be indicated in different ways.

In a first way, there are two buffer descriptions in the PPS, including buffer description A: {POC=0,poc_cycle=0,temporalID} and buffer description B: {POC=0,poc_cycle=-1, temporalID}. The picture with POC=

$$\text{MaxPOC}-1 \qquad [\text{Math.15}]$$

will point to buffer description A. The picture with POC=0 from the subsequent picture set will refer to buffer description B.

In a second alternative way, the picture with POC=

$$\text{MaxPOC}-1 \qquad [\text{Math.16}]$$

will point to buffer description A. The picture with POC=0 from the subsequent picture set will refer to buffer description A. The buffer description A corresponds to {POC=0, poc_cycle=0, temporalID}. For referencing the correct picture, the poc_cycle should be set to -1, since the referenced picture belongs to the previous $$[0, \ldots, \text{MayPOC}-1] \qquad [\text{Math.17}]$$

picture set. Thus, the poc_cycle value for buffer description A that is currently set to 0 may be overridden (e.g., set to a different value) for the current slice only, by transmitting a "4" in the slice header. In some configurations, the first slice in a picture may be used to override the poc_cycle value of a buffer description for the current picture only.

In some configurations, the list of reference pictures signaled at a high level may be modified at a finer level. For example, a list of reference pictures may be signaled in the buffer description transmitted in the PPS (e.g., signaled at high level). However, the buffer description transmitted in the PPS may be modified (e.g., modified at a finer level). For example, the buffer description may be modified by deleting existing entries. Additionally or alternatively, the buffer description information from the PPS may be modified to add new entries or replace an entry. The buffer description information from the PPS may also be modified to add new entries and replace current entries using a predefined mechanism, such as if no empty slots are available. A benefit of allowing modifications is that a higher level of control may be obtained. This may be instead of using the buffer descriptions from the PPS without modification or in addition to or alternatively by replacing only the first 'n' entries.

In some configurations, additional syntax may be defined to replace entries in the slot list. In this case, the index in the list that is replaced and the entry that may replace the current entry at that index will be specified.

Additionally or alternatively, additional syntax may be defined to add entries in the list with replacement if the slot list has no vacancies. In this case, the index in the list that should be replaced may be signaled explicitly (from the encoder 108 or overhead signaling module 112, for example) or inferred implicitly (by the decoder 102, for example) using some information transmitted earlier in the bitstream.

Listing (4) illustrates another example of syntax modification for the PPS from AHG21. In particular, Listing (4) illustrates another example of buffer description syntax used in slice headers as outlined in AHG21. However, modifications to the syntax given in AHG21 in accordance with the systems and methods disclosed herein are denoted in bold text in Listing (4).

Listing (4)

```
/*  Buffer description
*/
buffer_description( ) {
  bd_reference_flag
  if(bd_reference_flag = = 1) {
    bd_idx
    bd_poc_cycle_update_flag
    if (bd_poc_cycle_update_flag == 1)
      for( j = 0; j < number_of_longterm_pictures_pps[bd_idx];
      j++ ) {
        poc_pps_override[j]
        poc_cycle_pps_override[j]
        if( bits_for_temporal_id_in_buffer_descriptions > 0 )
          temporal_id_pps_override[j]
      }
    bd_poc_cycle_delete_count
    if (bd_poc_cycle_delete_count >0 )
      for( j = 0; j < bd_poc_cycle_delete_count; j++ ) {
        bd_pps_delete_idx[j]
      }
```

-continued

Listing (4)

```
bd_poc_cycle_append_count
if (bd_poc_cycle_append_count >0 )
    for( j = 0; j < bd_poc_cycle_append_count; j++ ) {
        poc_pps_append[j]
        poc_cycle_pps_append[j]
        if( bits_for_temporal_id_in_buffer_descriptions > 0 )
            temporal_id_pps_append[j]
    }
} else {
    number_of_negative_pictures
    for( i = 0; i < number_of_negative_pictures; i++ ) {
        ...
    }
    if( positive_pictures_in_buffer_descriptions_flag ){
        ...
    }
    number_of_longterm_pictures
    for( j = 0; j < number_of_longterm_pictures; j++ ) {
        poc[j]
        poc_cycle[j]
        if( bits_for_temporal_id_in_buffer_descriptions > 0 )
            temporal_id_poc[j]
    }
    if( number_of_negative_pictures +
    number_of_positive_pictures <
        max_num_ref_frames ) {
        combine_with_reference_flag
        if( combine_with_reference_flag )
            bd_combination_idx
    }
}
```

Listing (4) contains many elements similar to that of Listing (3). Listing (4) also contains syntax modifications to the slice header to allow for deletions and/or additions of reference pictures.

Examples of descriptions of the parameters in Listing (4) are given as follows. A bd_poc_cycle_delete_count specifies the number of entries to be deleted from the lists: POCBD_pps[bd_idx], temporalIDBD_pps[bd_idx] and POC_CYCLE_BD_pps[bd_idx] for the current picture (only, for example). In some configurations, bd_poc_cycle_delete_count may be greater than or equal to 0.

bd_pps_delete_idx[j] specifies that, for the current picture, the POC_CYCLE_BD_pps[bd_idx][bd_pps_delete_idx[j]] entry, tem-poralIDBD_pps[bd_idx][bd_pps_delete_idx[j]] entry and the POCBD_pps[bd_idx][bd_pps_delete_idx[j]] entry are deleted in the lists. In some configurations, once a picture is deleted, it may no longer be available for reference by subsequent decoded pictures. In other configurations, once all the deletions are completed, the remaining entries in the list POCBD_pps[bd_idx], temporalIDBD_pps[bd_idx] and POC_CYCLE_BD_pps[bd_idx] may be moved towards the initial index (e.g., zero-th index) to occupy the vacated slots. This process may be carried out so no empty slots remain between any two occupied slots. Here, a slot corresponds to an entry in the buffer description. For example, if the list is [Slot0=A] [Slot1=empty] [Slot2=B] [Slot3=C] [Slot4=empty] [Slot 5=D], then after the deletions the entries are moved towards Slot0 until no empty slots remain between any two occupied slots. In this example, the resulting list is [Slot0=A] [Slot1=B] [Slot2=C] [Slot3=D] [Slot4=empty] [Slot 5=empty].

bd_poc_cycle_append_count specifies the number of entries to be appended to lists: POCBD_pps[bd_idx], temporalIDBD_pps[bd_idx] and POC_CYCLE_BD_pps[bd_idx] for the current picture. In some configurations, bd_poc_cycle_append_count may be greater than or equal to 0.

poc_pps_append[j] specifies the POC value to be appended to the list POCBD_pps[bd_idx] for the current picture (only, for example). In some configurations, if any empty slots exist in the list, additions may be performed starting with the empty slot closest to the zero-index and then in increasing order of slot index.

poc_cycle_pps_append[j] specifies the poc_cycle value to be appended to the list POC_CYCLE_BD_pps[bd_idx] for the current picture (only, for example). In some configurations, if any empty slots exist in the list, then the empty slot closest to the zero-index may be filled first. Additionally, slots may be filled in increasing order of slot index. In some configurations, these operations of overriding entries, deleting entries and appending entries to POCBD_pps[bd_idx] and POC_CYCLE_BD_pps[bd_idx] are carried out in a pre-defined order.

temporal_id_pps_append[j] specifies the temporal identifier value to be appended to the list TemporalIDBD_pps[bd_idx] for the current picture (only, for example). In some configurations, if any empty slots exist in the list, additions may be performed starting with the empty slot closest to the zero-index and then in increasing order of slot index.

Some examples of configurations of the systems and methods disclosed herein are given hereafter. In one configuration, the 3-tuple (POC, poc_cycle, temporalID) may be replaced with the 2-tuple (LTSlotIdx, temporalID). LTSlotIndex may be a slot index that points to a location in the long-term DPB. One possible benefit of this approach is to reduce bitrate overhead.

In another configuration, the 3-tuple (POC, poc_cycle, temporalID) may be replaced with (f(POC, poc_cycle), temporalID), where f(POC, poc_cycle) is a function (e.g., look-up table) that maps the two-tuple (POC, poc_cycle) to an index. In yet another configuration, instead of (POC, poc_cycle), an absolute POC value may be used. In one example, this absolute POC value will be different than the longterm_poc[i] field in a buffer description in JCTVC-F493 that specified an absolute POC. In particular, the JCTVC-F493 longterm_poc[i] field could only signal values in the range 0 and MaxPOC. In accordance with the systems and methods disclosed herein, however, the absolute POC value may be signaled (and possibly derived) using a most significant bit (MSB) and least significant bit (LSB) scheme of AVC, thus providing larger bit resolution. Alternatively, the absolute POC value may be signaled using a number space that is larger than MaxPOC.

In another configuration, the absolute POC in accordance with systems and methods disclosed herein may be used for referencing all reference pictures (e.g., short-term pictures and long-term pictures). In another configuration, the absolute POC in accordance with the systems and methods disclosed herein may be used instead of deltaPOC signaling. In some configurations, POC and poc_cycle may be replaced by an absolute POC value as shown in example hereafter (and may not be limited to the examples below):

Code 2

```
/* Picture parameter set raw byte sequence payload (RBSP) syntax
*/
pic_parameter_set_rbsp( ) {
    ...
    number_of_longterm_pictures_pps[i]
```

-continued

Code 2

```
    for( j = 0; j < number_of_longterm_pictures_pps[i];
    j++ ) {
        absolute_poc_pps[i][j]
        if( bits_for_temporal_id_in_buffer_descriptions > 0 )
            temporal_id_poc_pps[i][j]
        }
    }
}
...
}
```

In this example, 'absolute_poc_pps[i][j]' is the absolute picture order count for the j-th long-term picture entry in the i-th buffer description within the PPS.

Code 3

```
/* Buffer description
*/
buffer_description( ) {
    bd_reference_flag
    if(bd_reference_flag = = 1) {
        bd_idx
    ...
    } else {
    ...
        number_of_longterm_pictures
        for( j = 0; j < number_of_longterm_pictures; j++ ) {
            absolute_poc[j]
            if( bits_for_temporal_id_in_buffer_descriptions > 0 )
                temporal_id_poc[j]
        }
    ...
    }
}
```

In this example, 'absolute_poc[j]' is the absolute picture order count for the j-th long-term picture entry in buffer description.

In some configurations, some or all information typically contained in the PPS and/or in buffer descriptions may be additionally or alternatively carried in an Adaptive Slice Parameter Set or Adaptation Parameter Set (APS). This information includes one or more of: number_of_longterm_pictures, poc[j], poc_cycle[j], temporal_id_poc[j], number_of_longterm_pictures_pps[i], poc_pps[i][j], poc_cycle_pps[i][j] and temporal_id_poc_pps[i][j]. For example, The Adaptive Slice Parameter Set or Adaptation Parameter Set (APS) may include one or more of a number of reference pictures (e.g., number_of_longterm_pictures), a picture order count (e.g., poc[j]), a picture order count cycle parameter (e.g., poc_cycle[j]), a temporal identifier picture order count parameter (e.g., temporal_id_poc[j]), a picture parameter set number of reference pictures (e.g., number_of_longterm_pictures_pps[i]), a picture parameter set picture order count (e.g., poc_pps[i][j]), a picture parameter set picture order count cycle parameter (e.g., poc_cycle_pps[i][j]) and a picture parameter set temporal identifier picture order count parameter (e.g., temporal_id_poc_pps[i][j]).

In some configurations, the information poc_cycle[j] may only be signaled (e.g., from an encoder 108 to the decoder 102, 202) if it is different than 0. In this case, an alternate syntax may be defined.

In an yet another configuration, some or all information typically contained in the PPS and/or in the buffer descriptions may additionally or alternatively be carried in a slice header separately from the buffer description information.

For example, the slice header may carry (separately from the buffer description container) one or more of a number of reference pictures (e.g., number_of_longterm_pictures), a picture order count (e.g., poc[j]), a picture order count cycle parameter (e.g., poc_cycle[j]), a temporal identifier picture order count parameter (e.g., temporal_id_poc[j]), a picture parameter set number of reference pictures (e.g., number_of_longterm_pictures_pps[i]), a picture parameter set picture order count (e.g., poc_pps[i][j]), a picture parameter set picture order count cycle parameter (e.g., poc_cycle_pps[i][j]) and a picture parameter set temporal identifier picture order count parameter (e.g., temporal_id_poc_pps[i][j]).

In an alternative configuration, a long-term (reference) picture may be signaled by indexing it as x.y, where x=poc[j] or poc_pps[i][j] and y is a new information subindex that defines an additional namespace/numberspace for subindexing long-term (reference) pictures. In this case, the x and y entries may be sent in PPS and/or buffer descriptions (in a slice header) for each long-term (reference) picture.

In some configurations, all (reference) pictures (e.g., long-term and short-term) are referenced using either delta referencing (using deltaPOC and temporalID, for example) or absolute referencing (using POC, poc_cycle and temporalID, for example). For example, the entire decoded picture buffer (DPB) may include a set of received pictures. A subset of these received pictures may use delta referencing and the remaining received pictures may use absolute referencing. It should be noted that prior approaches do not specify the same absolute referencing as given in accordance with the systems and methods disclosed herein (using POC and poc_cycle, for example). It should be noted that one or more of the configurations of buffer descriptions and syntaxes described may be implemented in combination with one or more of the methods and/or approaches described herein.

Figure 3:
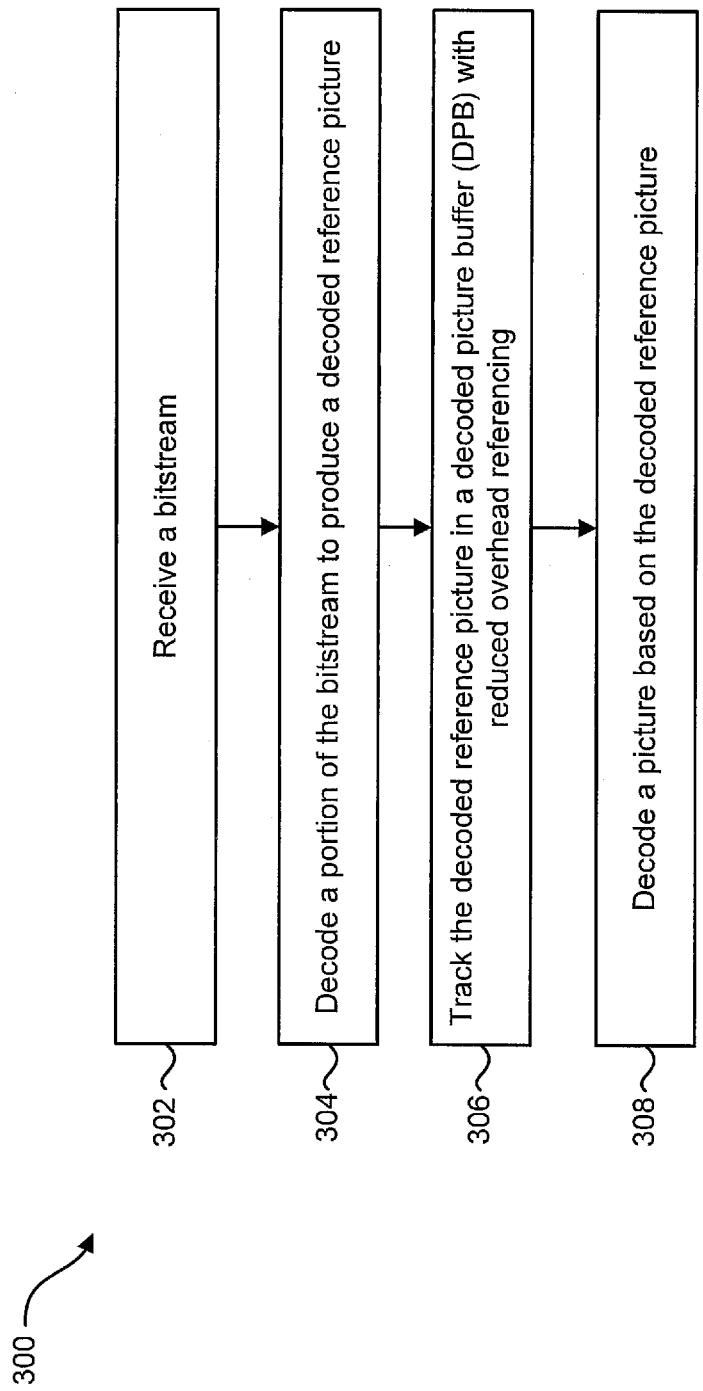
FIG. 3 is a flow diagram illustrating one configuration of a method for tracking a reference picture with reduced overhead referencing based on a designated picture.

FIG. 3 is a flow diagram illustrating one configuration of a method 300 for tracking a reference picture with reduced overhead referencing based on a designated picture. An electronic device 204 (e.g., decoder 202) may receive 302 a bitstream. For example, the decoder 202 may receive 302 a bitstream 214 that includes an encoded reference picture (and other encoded pictures, for instance). In some configurations, the bitstream 214 may also include overhead information (e.g., PPS, buffer description information, parameters, wrap indicators, reference picture designation or identifier, etc.).

The electronic device 204 may decode 304 a portion of the bitstream 214 to produce a decoded reference picture. For example, the decoder 202 may decode 304 a portion of the bitstream 214 to produce a decoded reference picture that is stored in frame memory 264. It should be noted that one or more portions of the bitstream 214 may be decoded 304 to produce one or more decoded reference pictures.

The electronic device 204 may track 306 the decoded reference picture in a decoded picture buffer (DPB) with reduced overhead referencing. For example, the electronic device 204 may associate a cycle parameter with the decoded reference picture and modify (e.g., decrement or increment) the cycle parameter if a wrap indicator is received or if a transition between picture sets is determined. Other approaches may be used for tracking 306 the decoded reference picture. Greater detail is given below. It should be noted that the DPB may include one or more decoded reference pictures.

The electronic device 204 may decode 308 the picture based on one or more decoded reference pictures. For example, a portion of the bitstream 214 (other than the portion decoded 304 to produce the decoded reference picture) may be decoded 308 based on the reference picture. For instance, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 308 the picture. In some configurations or instances, one or more decoded reference pictures may be tracked 306 and used to decode 308 the picture.

Figure 4:
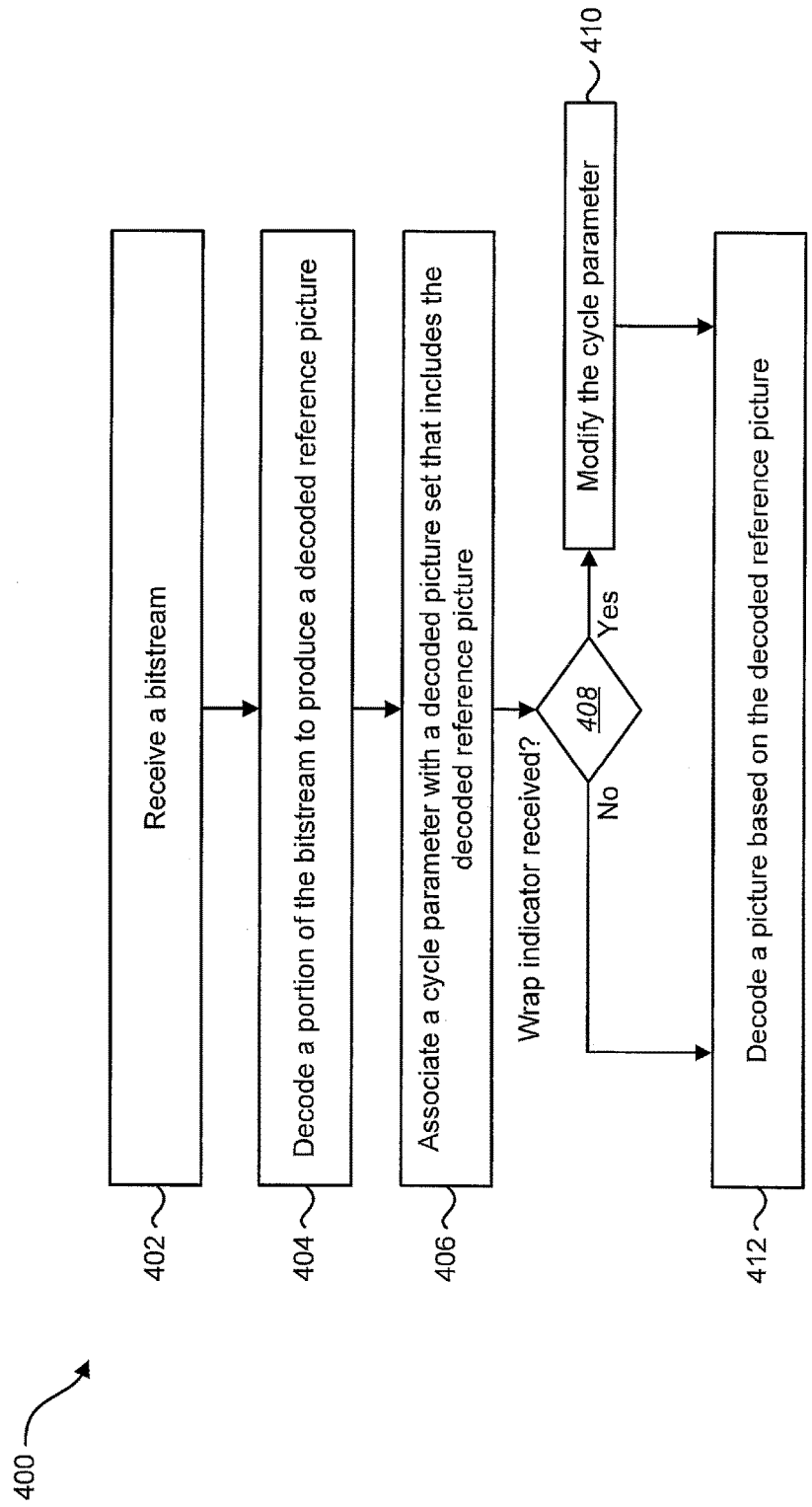
FIG. 4 is a flow diagram illustrating a more specific configuration of a method for tracking a reference picture with reduced overhead referencing based on a designated picture.

FIG. 4 is a flow diagram illustrating a more specific configuration of a method 400 for tracking a reference picture with reduced overhead referencing based on a designated picture. This method 400 may be one approach for tracking which picture is being referenced when POCs are reused. An electronic device 204 (e.g., decoder 202) may receive 402 a bitstream 214. For example, the decoder 202 may receive 402 a bitstream 214 that includes an encoded reference picture (and other encoded pictures, for instance). In some configurations, the bitstream 214 may include overhead information (e.g., PPS, buffer description information, parameters, wrap indicators, reference picture designation or identifier, etc.).

The electronic device 204 may decode 404 a portion of the bitstream 214 to produce a decoded reference picture. For example, the decoder 202 may decode 404 a portion of the bitstream 214 to produce a decoded reference picture that is stored in frame memory 264. It should be noted that one or more portions of the bitstream 214 may be decoded 404 to produce one or more decoded reference pictures.

The electronic device 204 may associate 406 a cycle parameter with a decoded picture set that includes the decoded reference picture. For example, the electronic device 204 may associate 406 a cycle parameter "poc_cycle" with a decoded picture set that includes the decoded reference picture.

The cycle parameter "poc_cycle" may be defined as follows. When a fixed number of bits are used to represent the POC of a picture in a range $$[0, \ldots, \text{MaxPOC}-1],\qquad\text{[Math.18]}$$

$$\text{MaxPOC}\qquad\text{[Math.19]}$$

unique integer values exist. If the number of pictures being encoded exceeds $$\text{MaxPOC},\qquad\text{[Math.20]}$$

a picture numbering mechanism must reuse already assigned POC values. The POC numbering then progresses as follows in one example:

$$\ldots, [0, \ldots, \text{MaxPOC}-1]_{n-2},\qquad\text{[Math.21]}$$

$$[0, \ldots, \text{MaxPOC}-1]_{n-1},\qquad\text{[Math.22]}$$

$$[0, \ldots, \text{MaxPOC}-1]_{n},\qquad\text{[Math.23]}$$

$$[0, \ldots, \text{MaxPOC}-1]_{n+1}, \ldots\qquad\text{[Math.24]}$$

The subscript in this example denotes the number of times the set $$[0, \ldots, \text{MaxPOC}-1]\qquad\text{[Math.25]}$$

has been repeated. This subscript or the number of times the set $$[0, \ldots, \text{MaxPOC}-1]\qquad\text{[Math.26]}$$

has been repeated may be denoted as $$\text{MaxPOCSetIndex}.\qquad\text{[Math.27]}$$

For example, a picture with POC=0 and $$\text{MaxPOCSetIndex}=n\qquad\text{[Math.28]}$$

represents the $$(n*\text{MaxPOC}+1)^{th}\qquad\text{[Math.29]}$$

picture of the sequence (with an assumption that picture set numbering starts with 1, for instance). Additional detail regarding the cycle parameter "poc_cycle" is given in connection with FIG. 5 below.

The electronic device 204 may determine 408 whether a wrap indicator is received. For example, each time an encoder 108 or transmitting electronic device A 104*a* reaches a predetermined maximum number of pictures in a set of pictures, the encoder 108 or transmitting electronic device A 104*a* may send a wrap indicator that is received by the decoder 102 or receiving electronic device B 104*b* to indicate that another set of pictures is being sent (e.g., a POC is resetting or starting another cycle). Greater detail is given in connection with FIG. 11 below.

If the electronic device 204 determines 408 that a wrap indicator was received, the electronic device 204 may modify 410 (e.g., decrement) the cycle parameter. For example, the electronic device 204 decrements cycle parameters for each picture or each set of pictures in the DPB. In another example, the electronic device 204 may increment the cycle parameter.

The electronic device 204 may decode 412 a picture based on the decoded reference picture. For example, a portion of the bitstream 214 (other than the portion decoded 404 to produce the decoded reference picture) may be decoded 412 based on the reference picture. For instance, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 412 the picture. In some configurations or instances, one or more decoded reference pictures may be used to decode 412 the picture.

Figure 5:
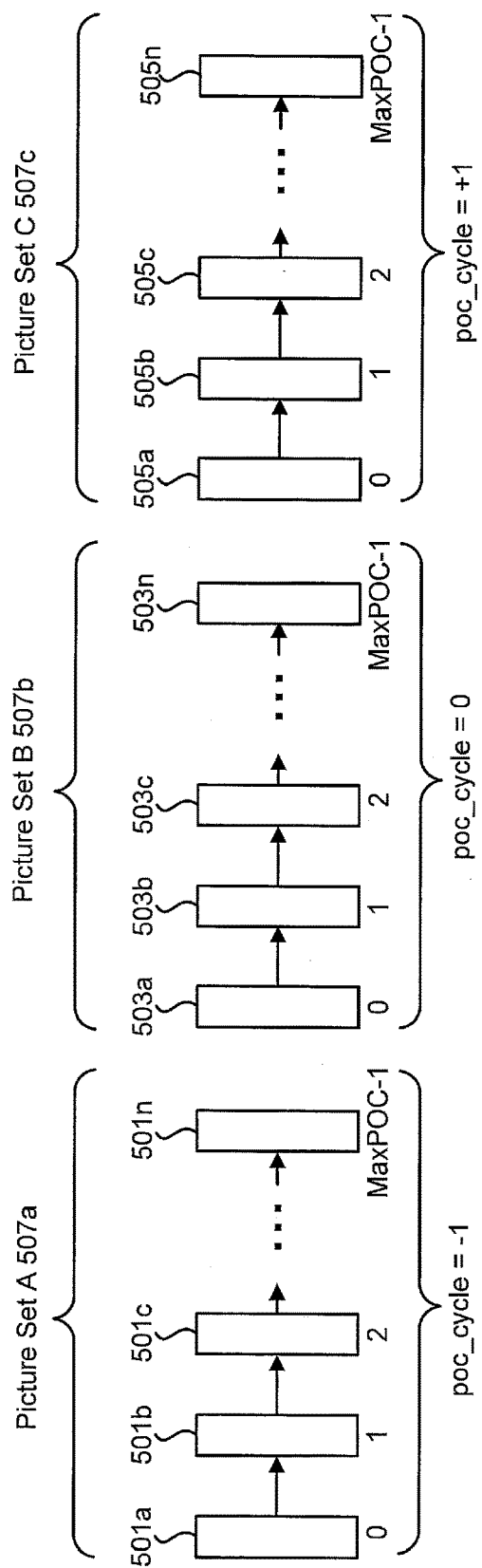
FIG. 5 is a diagram illustrating one example of multiple picture sets referenced by cycle parameters.

FIG. 5 is a diagram illustrating one example of multiple picture sets referenced by cycle parameters. More specifically, FIG. 5 illustrates an example of tracking a reference picture with reduced overhead referencing based on a designated picture using a cycle parameter. In particular, FIG. 5 illustrates a cycle parameter (e.g., poc_cycle=−1) associated with picture set A 507*a*, a cycle parameter (e.g., poc_cycle=0) associated with picture set B 507*b* and a cycle parameter (e.g., poc_cycle=+1) associated with picture set C 507*c*. However, it should be noted that picture set A 507*a* may or may not be the first picture set in a sequence of frames. For example, one or more picture sets may precede picture set A 507*a*. Furthermore, it should be noted that picture set C 507*c* may or may not be the last picture set in a sequence of frames. For example, one or more picture sets may follow picture set C 507*c*.

Each picture set 507*a*-*c* may include one or more pictures 501*a*-*n*, 503*a*-*n*, 505*a*-*n*. In this example, each picture set 507*a*-*c* includes $$\text{MaxPOC}\qquad\text{[Math.30]}$$

pictures 501, 503, 505. In particular, each picture 501, 503, 505 may have a corresponding picture order count (POC), denoted as $$[0,1,2, \ldots, \text{MaxPOC}-1]\qquad\text{[Math.31]}$$

in FIG. 5.

In one example, the poc_cycle of the picture set that contains the current decoded picture may be set to 0 for computing the poc_cycle of other pictures. In some cases, pictures may be decoded out of order. For example, a decoder may see 503b, then 505a and then 503c. In this example, assume that a picture being currently decoded is a picture 503b in picture set B 507b with POC=1. The poc_cycle of another picture, such as a reference picture, may then be calculated based on the poc_cycle of the current decoded picture.

Figure 6:
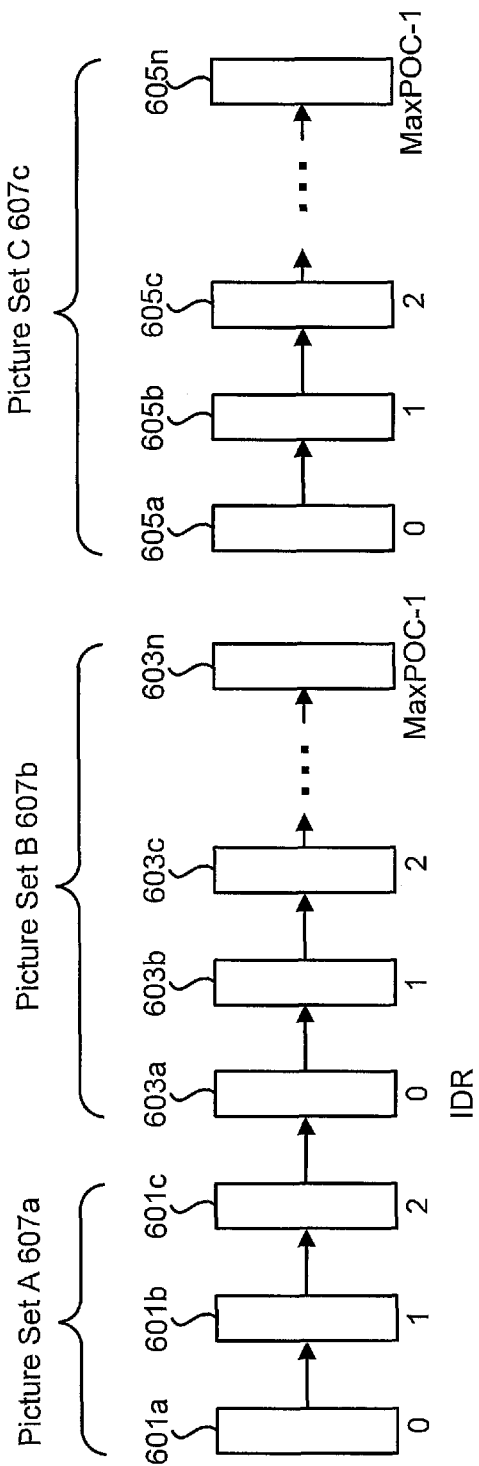
FIG. 6 is a diagram illustrating another example of multiple picture sets.

FIG. 6 is a diagram illustrating another example of multiple picture sets. FIG. 6 contains picture sets 607a-c similar to the picture sets 507a-c described above in connection with FIG. 5. One or more pictures 601a-c, 603a-n, 605a-n may be included in each picture set 607a-c. A picture set 607a-c may include $$\text{MaxPOC} \qquad [\text{Math.32}]$$

pictures. Further, each picture 601a-c, 603a-603n, 605a-605n may have a corresponding picture order count (POC), belonging to the set $$[0,1,2,\ldots,\text{MaxPOC}-1] \qquad [\text{Math.33}]$$

as denoted in FIG. 6.

A picture set 607 may include one or more pictures. For example, pictures 603a-n in picture set B 607b may be grouped as a picture set. Likewise, pictures 605a-n in picture set C 607c may be grouped together into a picture set. A picture set may include pictures that are adjacent to each other when encoded or may consist of random pictures grouped together. In another example, a picture set may make up a poc_cycle consisting of $$[0,1,2,\ldots,\text{MaxPOC}-1] \qquad [\text{Math.34}]$$

pictures.

In some configurations, a picture set 607a may include an instantaneous decoding refresh (IDR) picture 603a (e.g., IDR access unit). The IDR picture 603a may be signaled by the encoder in the bitstream. Additionally or alternatively, the IDR may be identified based on picture type. In some configurations, the IDR picture 603a may indicate to the decoder 202 that no subsequent pictures in the bitstream 214 will require reference to prior pictures in the bitstream 214.

When an IDR picture 603a is decoded by a decoder 202, the POC may be reset back to a predetermined value. For example, after decoding picture set A 607a, an IDR picture 603a is received or signaled. At this point, the POC may be reset back to 0 and a new picture set, picture set B 607b, begins. In other words, the IDR picture 603a may specify the reference picture relative to a designated picture. One benefit of sending an IDR picture 603a may be to introduce a new reference picture. This benefit will be described in greater detail below in connection with FIG. 7.

Figure 7:
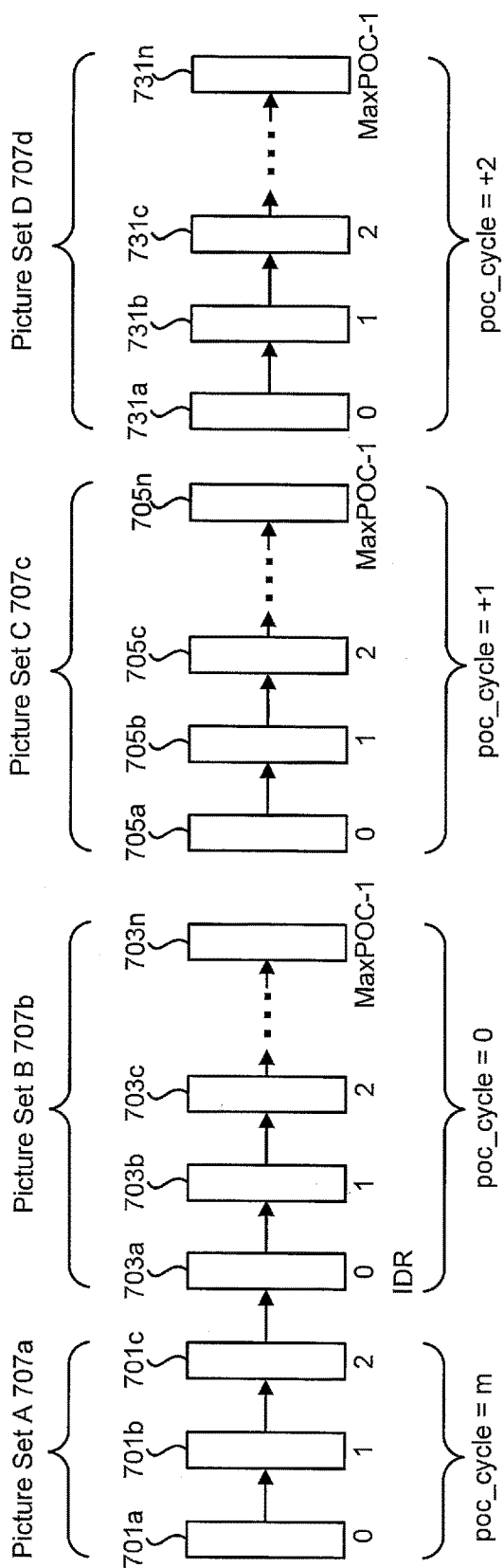
FIG. 7 is a diagram of a more specific example of multiple picture sets referenced by cycle parameters.

FIG. 7 is a diagram of a more specific example of multiple picture sets referenced by cycle parameters. FIG. 7 illustrates picture sets 707a-d and pictures 701, 703, 705 along with their associated POC and poc_cycle similar to components 507a-c, 501, 503, 505, described above in connection with FIG. 5. Additionally, FIG. 7 shows an addition picture set 707d along with associated pictures 731a-n.

FIG. 7 also illustrates a designated picture 703a. In one configuration, the cycle parameter (e.g., poc_cycle) for the designated picture may be set to 0. For example, when the first picture in a picture set (e.g., POC=0) is a designated picture (e.g., IDR picture), then the poc_cycle for the designated picture may be equal to 0. The cycle parameter (e.g., poc_cycle) of later picture sets may be calculated with respect to the picture set with the cycle parameter set to 0 (e.g., poc_cycle=0).

One example of a designated picture is an IDR picture 703a (e.g., IDR access unit) similar to the IDR picture 603a described above in connection with FIG. 6. For convenience, the designated picture 703a will be described as an IDR picture. However, it should be noted that the designated picture 703a may be any picture that is indicated by the encoder with signaling in the bitstream or that may be implicitly determined by the decoder.

In some configurations, an encoder may send a signal in the bitstream that indicates the IDR picture 703a. The value of the POC counter may be determined based on this signal. For example, the signal may indicate (to the decoder) to set the POC to 0 for the IDR picture (if the POC is not 0 for the IDR picture, for example). For instance, the IDR picture 703a may cause a decoder to reset the POC counter to the initial value, 0 for instance. The poc_cycle may also be based on the IDR picture 703a. Similar to the POC, the signal may indicate that the poc_cycle should be reset to the initial value. In another example, the signal may indicate that no modification to the POC or the poc_cycle need occur (if they are at the initial value for the IDR picture 703a).

The IDR picture 703a may be an indication to set or reset the POC and poc_cycle (and/or other cycle parameters, for example), which may be used to track a reference picture relative to the designated picture 703a. For example, the decoder 202 may decode pictures 701a-c in set A 707a. Picture set A 707a may have the cycle parameter poc_cycle=m associated with it. An IDR picture 703a may then be signaled from the bitstream 214. The IDR picture 703a may indicate a new cycle parameter (e.g., poc_cycle=0) and may indicate a POC=0. Picture sets 707b-d may then be decoded and their associated cycle parameter may increment from the initial value (e.g., poc_cycle=0, poc_cycle=+1, poc_cycle=+2, respectively). In this example, later picture sets 707b-d are calculated with respect to the newly set cycle parameter and POC.

As described previously, an IDR picture 703a may indicate to the decoder 202 that no subsequent pictures in the bitstream will require reference to pictures prior pictures in the bitstream 214. However, an IDR picture 703a may just signal a reset of the POC or of the cycle parameters. For example, picture set A may have a cycle parameter of poc_cycle=m where m=+5. When the IDR picture 703a is received, m may be changed to be m=−1. Thus, the IDR picture 703a may make the poc_cycle count of the reference picture relative to a designated picture. In other words, the IDR picture 703a may signal the poc_cycle count to calculate the reference picture relative to a designated picture in the sequence, not just the current picture.

Figure 8:
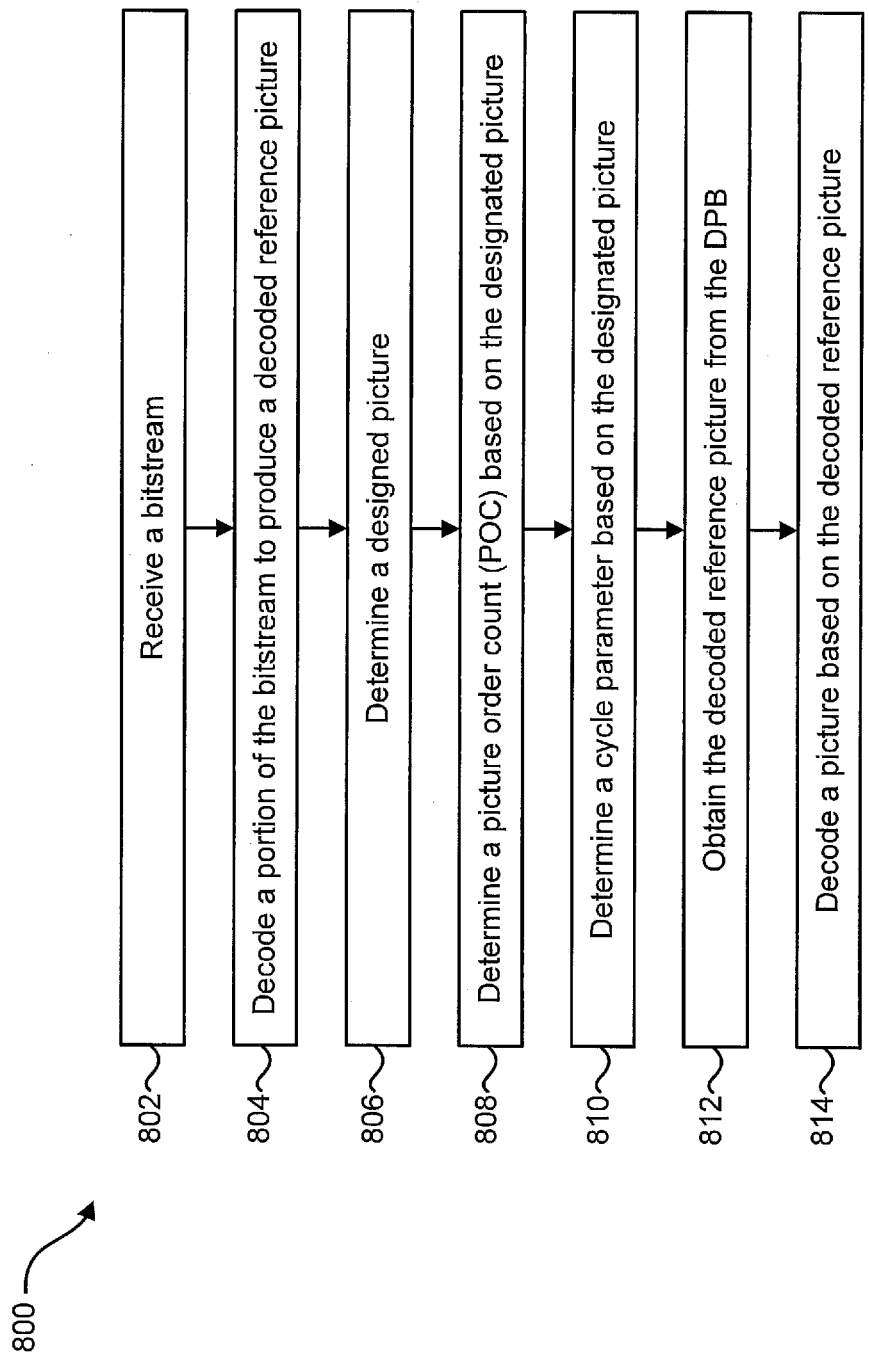
FIG. 8 is a flow diagram illustrating one configuration of a method for tracking a reference picture with reduced overhead referencing based on a designated picture.

FIG. 8 is a flow diagram illustrating one configuration of a method 800 for tracking a reference picture with reduced overhead referencing based on a designated picture. An electronic device 204 (e.g., decoder 202) may receive 802 a bitstream and decode 804 a portion of the bitstream 214 to produce a decoded reference picture. This may occur in a similar manner as described previously in connection to FIG. 3.

The electronic device 204 may track the decoded reference picture in a decoded picture buffer (DPB) with reduced overhead referencing based on a designated picture. This may be accomplished as follows. The electronic device 204 (e.g., decoder 202) may determine 806 a designated picture. In one configuration, the electronic device 204 may make this determination 806 based on explicit signaling received in the bitstream 214. For instance, the bitstream 214 may include an indicator that specifies the designated picture. In one example, the designated picture may be an instantaneous decoding refresh (IDR) picture that is indicated by signaling (e.g., in a picture parameter set (PPS), in a buffer description, etc.) received in the bitstream 214.

The electronic device 204 may determine 808 a picture order count (POC) based on the designated picture. For example, the electronic device 204 may set or reset the POC associated with the designated picture. For instance, the POC associated with the designated picture may be set to 0. Accordingly, the electronic device 204 may reset a POC sequence based on the designated picture. For example, the POCs for other pictures may be numbered based on the POC associated with the designated picture 603a as illustrated in FIG. 6.

The electronic device 204 may determine 810 a cycle parameter (e.g., poc_cycle) based on the designated picture. For example, the cycle parameter associated with a picture set that includes the designated picture may be set or reset to 0. The cycle parameters for other picture sets may be determined (e.g., calculated) based on the picture set including the designated picture (e.g., IDR picture). One example of this is illustrated in and described in connection with FIG. 7.

When the POCs and cycle parameters (e.g., poc cycles) are determined based on the designated picture, the POC and cycle parameter of the decoded reference picture may be updated as necessary. This may enable tracking of the decoded reference picture in the decoded picture buffer (DPB). Thus, the decoded reference picture may be tracked based on the designated picture (e.g., IDR picture).

The electronic device 204 may obtain 812 a decoded reference picture from the DPB. For example, the electronic device 204 may retrieve the decoded reference picture from the DPB according to a POC and cycle parameter (e.g., poc_cycle) that are based on the designated picture.

The electronic device 204 may decode 814 a picture based on the decoded reference picture. This may occur as similarly described above in connection with FIG. 3. It should be noted that a set of one or more decoded reference pictures may be tracked in accordance with the method 800.

Figure 9:
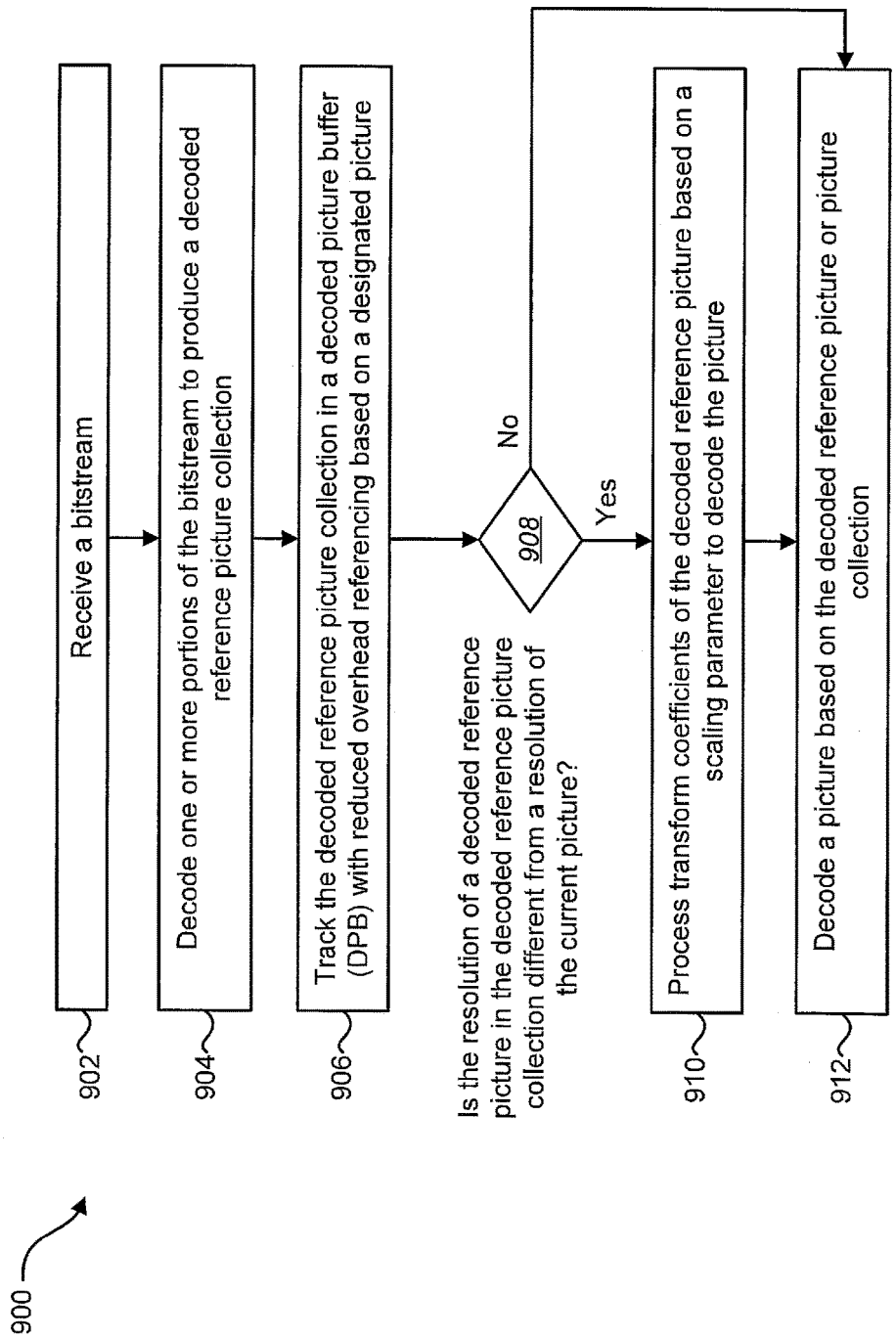
FIG. 9 is a flow diagram illustrating another configuration of a method for tracking a reference picture with reduced overhead referencing based on a designated picture.

FIG. 9 is a flow diagram illustrating another configuration of a method 900 for tracking a reference picture with reduced overhead referencing based on a designated picture. As described preciously, an electronic device 204 may receive 902 a bitstream. The electronic device 204 may also decode 904 one or more portions of the bitstream to produce a reference picture collection. The decoded reference picture collection may include one or more decoded reference pictures.

The electronic device 204 may track 906 the decoded reference picture collection in a decoded picture buffer (DPB) with reduced overhead referencing based on a designated picture. This may be done as described above in connection with FIG. 8. Two or more decoded reference pictures in the decoded reference picture collection may refer to the same or different time instances (e.g., similar time instances) as described above.

The electronic device 204 may optionally determine 908 whether the resolution of a decoded reference picture (for decoding the picture) in the decoded reference picture collection is different from a resolution of the current picture. If the resolution between the two pictures is different, then the electronic device 204 may process 910 the transform coefficients of the decoded reference picture based on a scaling parameter to decode the picture. A more detailed description regarding the scaling parameter and resolution switching is given above in connection with Table (2). It should be noted that the scaling parameter may be determined by receiving the scaling parameter explicitly or by determining the scaling parameter implicitly (using a lookup table, picture resolution characteristics, etc., for example).

Regardless of whether the resolutions are the same or different, the electronic device 204 may decode 912 a picture based on the decoded reference picture collection (e.g., a decoded reference picture in the decoded reference picture collection).

Figure 10:
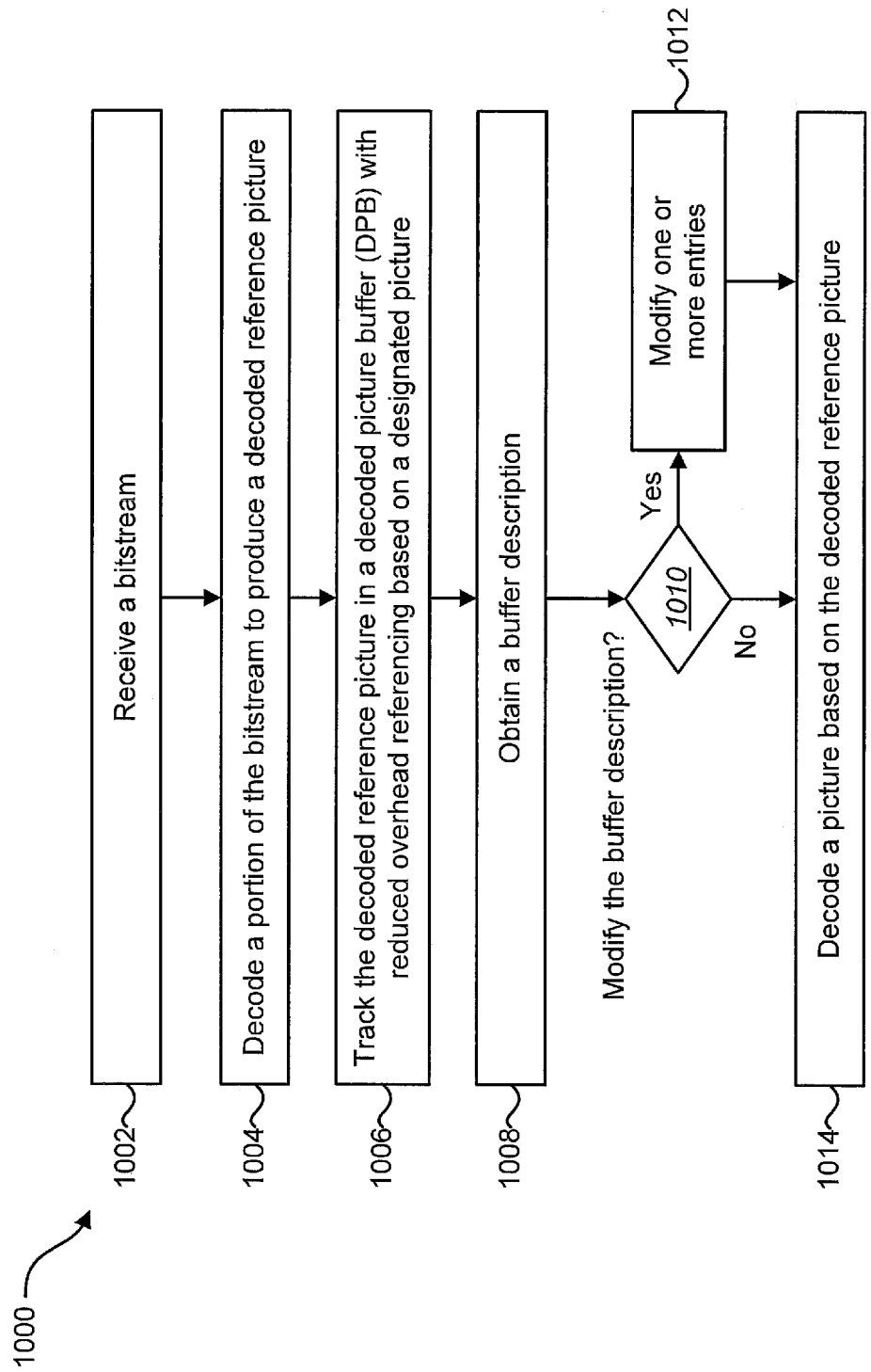
FIG. 10 is a flow diagram illustrating another configuration of a method for tracking a reference picture with reduced overhead referencing based on a designated picture.

FIG. 10 is a flow diagram illustrating another configuration of a method 1000 for tracking a reference picture with reduced overhead referencing based on a designated picture. An electronic device 204 may receive 1002 a bitstream and decode 1004 a portion of the bitstream to produce a decoded reference picture. The electronic device 204 may track 1006 the decoded reference picture in a decoded picture buffer (DPB) with reduced overhead referencing based on a designated picture. This may be done as described above.

The electronic device 204 may also obtain 1008 a buffer description. Some examples of buffer descriptions are described in detail above. For instance, Table (1) and Table (2) above include examples of various buffer descriptions. The buffer descriptions may be received by a decoder as part of the parameter picture set (PPS) from an encoder. An index to the appropriate buffer descriptions may also be received by a decoder as a part of a slice header. Once the buffer description is obtained 1008, the electronic device 204 may determine 1010 whether to modify the buffer description. If the buffer description requires no modification, then the electronic device 204 may decode 1014 a picture based on the decoded reference picture. However, if the buffer description requires modification, then the electronic device 204 may modify 1012 one or more entries. Examples of modifying 1012 may include deleting an entry, adding an entry or replacing an entry. A more detailed description of deleting, adding or replacing entries may be found above in connection with the description of Listing (4). Once a modification 1012 is complete, the electronic device 204 may decode 1014 a picture based on the decoded reference picture.

Figure 11:
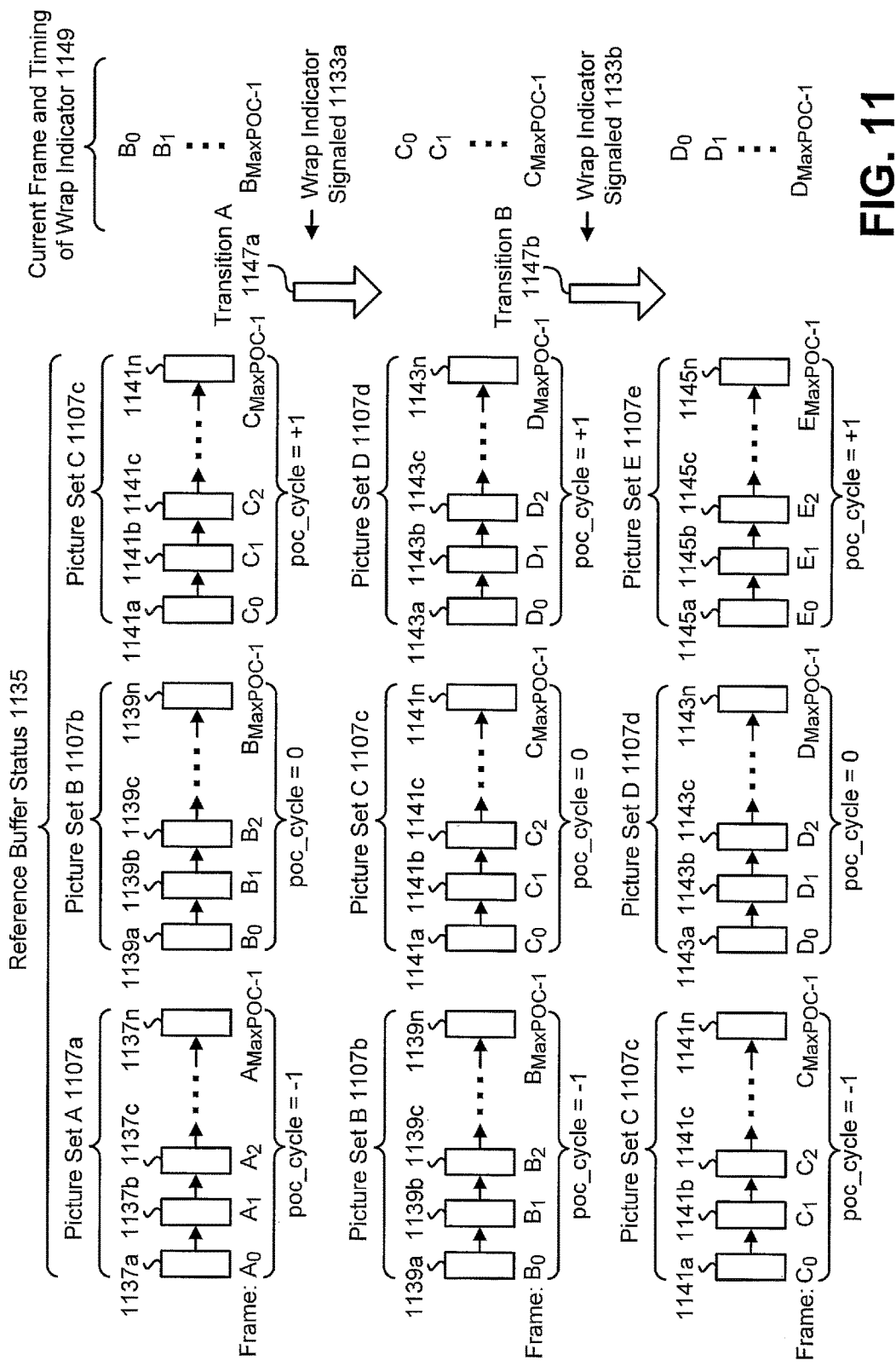
FIG. 11 is a diagram illustrating one example of signaling a wrap indicator in accordance with the systems and methods disclosed herein.

FIG. 11 is a diagram illustrating one example of signaling 1133 a wrap indicator in accordance with the systems and methods disclosed herein. In this example, several pictures 1137a-n, 1139a-n, 1141a-n, 1143a-n, 1145a-n and picture sets 1107a-e are illustrated. In particular, FIG. 11 illustrates a reference buffer status 1135 over time, along with corresponding current frames and the timing of the wrap indicator 1149.

In this example, assume that a picture $B_0$ 1139a in picture set B 1107b with poc_cycle=0 is the current picture or frame at a first time. When transition A 1147a occurs, a wrap indicator is signaled 1133a. At a second time, a picture $C_0$ 1141a in picture set C 1107c is the current picture or frame. Assume that picture $C_0$ 1141a is a reference picture for all subsequent pictures (e.g., in picture set D 1107d and picture set E 1107e). For instance, picture $C_0$ 1141a may be a long-term reference picture to be kept in the DPB for decoding subsequent pictures 1141b-n, 1143a-n, 1145a-n. When transition B 1147b occurs, another wrap indicator is signaled 1133b. As illustrated, the poc_cycle parameters are updated upon the signaling 1133 of the wrap indicators. This procedure may be used to track a reference picture in accordance with the systems and methods disclosed herein.

Furthermore, it should be noted that the POC and poc_cycle may be reset or restarted based on a decoded reference picture as described herein.

As illustrated in FIG. 11, POC numbers 0 through $$\text{MaxPOC}-1 \qquad \text{[Math.35]}$$

repeatedly correspond to the pictures 1137*a-n*, 1139*a-n*, 1141*a-n*, 1143*a-n*, 1145*a-n*.

As described above, each picture set 1107*a-e* (with POC numbers 0 through $$\text{MaxPOC}-1) \qquad \text{[Math.36]}$$

may correspond to a cycle parameter (e.g., poc_cycle).

In one configuration, a wrap indicator may be signaled 1133*a* at the first transition 1147*a* between a current picture set (e.g., picture set B 1107*b*) and a subsequent later picture set (e.g., picture set C 1107*c*). For example, the first time the POC numbering transitions from one $$[0, \ldots, \text{MaxPOC}-1] \qquad \text{[Math.37]}$$

set to the next, the wrap indicator may be signaled 1133. In some configurations, the wrap indicator may be signaled 1133 when POC numbering transitions from one $$[0, \ldots, \text{MaxPOC}-1] \qquad \text{[Math.38]}$$

set to another. Alternatively, the wrap indicator may be signaled 1133 the first time the poc_cycle numbering transitions for the next $$[0, \ldots, \text{MaxPOC}-1] \qquad \text{[Math.39]}$$

picture set. In some configurations, the wrap indicator may be signaled 1133 when poc_cycle numbering transitions for the next $$[0, \ldots, \text{MaxPOC}-1] \qquad \text{[Math.40]}$$

picture set. In some configurations, the wrap indicator signaled may be a protected message denoted "poc_wraparound". As used herein, "signaled" may mean communicated between an encoder and a decoder. In some configurations, "signaled" may also mean communicated between different electronic devices.

A protected message may be a message that must be received by the electronic device 204 in order to maintain a desired functionality such as detection of lost pictures. One mechanism to transmit a message as a protected message is to assign a higher priority to the protected message when compared to other information messages. An intelligent device (e.g., a network congestion control agent) may then examine this priority assignment and drop lower priority messages to meet constraints such as available network bandwidth.

In some configurations, the wrap indicator (e.g., poc_wraparound) message may be signaled in the Picture Parameter Set (PPS), Slice Header, Adaptation Parameter Set (APS) or any suitable location in the bitstream. Additionally or alternatively, the wrap indicator may be signaled out-of-band (e.g., separate from the picture bitstream). Each time the wrap indicator (e.g., poc_wraparound message) is received by the decoder 102, the cycle parameter (e.g., poc_cycle) for every picture (e.g., every picture set) in the DPB may be decremented (by 1, for example).

Listing (5) below illustrates an example of a bitstream syntax modification required to signal the wrap indicator in the picture parameter set:

Listing (5)

```
/* Picture parameter set RBSP syntax
*/
pic_parameter_set_rbsp( ) {
    seq_parameter_set_id
    pic_parameter_set_id
    entropy_coding_mode_flag
    wrap_indicator_flag
    bits_for_temporal_id_in_buffer_descriptions
    positive_pictures_in_buffer_descriptions_flag
    number_of_bds
    if( number_of_bds > 0 ) {
        for(i = 0; i < number_of_bds; i++){
            number_of_negative_pictures_pps[i]
            for(j = 0; j < number_of_negative_pictures_pps[i];
            j++ ) {
                negative_delta_poc_minus_one_pps[i][j]
                if( bits_for_temporal_id_in_buffer_descriptions > 0 )
                    temporal_id_negative_pps[i][j]
            }
            if(positive_pictures_in_buffer_descriptions_flag ){
                number_of_positive_pictures_pps[i]
                for( j = 0; j < number_of_positive_pictures_pps[i]; j++ ) {
                    delta_poc_minus_one_pps[i][j]
                    if( bits_for_temporal_id_in_buffer_descriptions > 0 )
                        temporal_id_positive_pps[i][j]
                }
            }
            number_of_longterm_pictures_pps[i]
            for( j = 0; j < number_of_longterm_pictures_pps[i];
            j++ ) {
                poc_pps[i][j]
                poc_cycle_pps[i][j]
                if( bits_for_temporal_id_in_buffer_descriptions > 0 )
                    temporal_id_poc_pps[i][j]
            }
        }
    }
    num_temporal_layer_switching_point_flags
    for( i = 0; i < num_temporal_layer_switching_point_flags; i++ )
        temporal_layer_switching_point_flag[i]
    num_ref_idx_l0_default_active_minus1
    num_ref_idx_l1_default_active_minus1
    pic_init_qp_minus26    /* relative to 26 */
    constrained_intra_pred_flag
    slice_granularity
    shared_pps_info_enabled_flag
    if( shared_pps_info_enabled_flag )
        if( adaptive_loop_filter_enabled_flag )
            alf_param( )
    if( cu_qp_delta_enabled_flag )
        max_cu_qp_delta_depth
    rbsp_trailing_bits( )
}
```

A 'wrap_indicator_flag' equal to 1 specifies that the POC numbering has transitioned the first time from one $$[0, \ldots, \text{MaxPOC}-1] \qquad \text{[Math.41]}$$

picture set to next. A 'wrap_indicator_flag' equal to 0 specifies otherwise. In some configurations, the 'wrap_indicator_flag' equal to 1 specifies that the POC numbering transitions from one $$[0, \ldots, \text{MaxPOC}-1] \qquad \text{[Math.42]}$$

picture set to another. A 'wrap_indicator_flag' equal to 0 specifies otherwise.

In some configurations, a 'wrap_indicator_flag' equal to 1 specifies that the poc_cycle has transitioned the first time for the next $$[0, \ldots, \text{MaxPOC}-1] \qquad \text{[Math.43]}$$

picture set. A 'wrap_indicator_flag' equal to 0 specifies otherwise.

In some configurations, a 'wrap_indicator_flag' equal to 1 specifies that the poc_cycle has transitioned from one $$[0, \ldots, \text{MaxPOC}-1] \quad \text{[Math.44]}$$

picture set to another. A 'wrap_indicator_flag' equal to 0 specifies otherwise.

In some configurations, the 'wrap_indicator_flag' may use more than one bit to identify additional information, for example, a direction of transition. In another configuration, the 'wrap_indicator_flag' may be signaled as an unsigned integer that is variable length coded using entropy coding. In another configuration, the 'wrap_indicator_flag' is a signed integer that is variable length coded using entropy coding.

seq_parameter_set_id identifies the sequence parameter set that is referred to by the picture parameter set. The value of seq_parameter_set_id shall be in the range of 0 to 31, inclusive.

pic_parameter_set_id identifies the picture parameter set that is referred to in the slice header. The value of pic_parameter_set_id shall be in the range of 0 to 255, inclusive. entropy coding mode flag selects the entropy decoding method to be applied for the syntax elements.

num_temporal_layer_switching_point_flags specifies how many temporal switching point flags are present. If temporal_id_nesting_flag is equal to 1, num_temporal_layer_switching_point_flags shall be equal to 0.

temporal_layer_switching_point_flag[i] specifies if the current access point is a temporal switching point that allows decoding of higher temporal id layers following this access unit. If temporal_id_nesting_flag is equal to 1, temporal_layer_switching_point_flag[i] shall be inferred to be equal to 1. If temporal_id_nesting_flag is equal to 0 and num_temporal_layer_switching_point_flags is less than i, temporal_layer_switching_point_flag[i] shall be inferred to be equal to 0. It should be noted that when starting to decode a higher temporal layer i, the availability of required reference pictures can be guaranteed immediately following an IDR, or a picture with the temporal_id value j lower than i and temporal_switching_flag[j] equal to 1.

num_ref_idx_l0_default_active_minus1 specifies how num_ref_idx_l0_active_minus1 is inferred for P and B slices with num_ref_idx_active_override_flag equal to 0. The value of num_ref_idx_l0_default_active_minus1 shall be in the range of 0 to 31, inclusive.

num_ref_idx_l1_default_active_minus1 specifies how num_ref_idx_l1_active_minus1 is inferred for B slices with the num_ref_idx_active_override_flag equal to 0. The value of num_ref_idx_l1_default_active_minus1 shall be in the range of 0 to 31, inclusive.

pic_init_qp_minus26 specifies the initial value minus 26 of SliceQPY for each slice.

The initial value is modified at the slice layer when a non-zero value of slice_qp_delta is decoded, and is modified further when a non-zero value of cu_qp_delta is decoded at the coding unit layer. The value of pic_init_qp_minus26 shall be in the range of −(26+QpBdOffsetY) to +25, inclusive.

A constrained_intra_pred_flag equal to 0 specifies that intra prediction allows usage of residual data and decoded samples of neighboring macroblocks coded using inter macroblock prediction modes for the prediction of macroblocks coded using intra macroblock prediction modes. A constrained_intra_pred_flag equal to 1 specifies constrained intra prediction, in which case prediction of macroblocks coded using intra macroblock prediction modes only uses residual data and decoded samples from I macroblock types.

slice_granularity indicates the slice granularity within a picture. The value of slice_granularity shall not be larger than Min(Log 2MaxCUSize−4, log 2_diff_max_min_coding_block_size). The variable SliceGranularity is set to the value of (slice_granularity<<1).

shared_pps_info_enabled_flag specifies that the shared information in the picture parameter set RBSP shall be used for the referred slices. If shared_pps_info_enabled_flag is equal to 1, the alf_param( ) in the picture parameter set RBSP shall be applied for the referred slices. Otherwise, the alf_param( ) in slice header(s) shall be applied.

max_cu_qp_delta_depth specifies the maximum allowed depth that is used for specifying QPY values for a coding unit. The value of max_cu_qp_delta_depth shall be in the range of 0 to 15, inclusive.

The variable log 2MinCUDQPSize specifies the minimum coding unit size that can further modify the value of QPY as follows: log 2MinCUDQPSize=Log 2MaxCUSize−max_cu_qp_delta_depth. alf_param( ) is a function that determines the adaptive loop filter parameter syntax. rbsp_trailing_bits( ) is a function that corresponds to a stop bit (equal to 1) followed by zero bits until byte alignment is achieved.

Listing (6) below illustrates an example of a bitstream syntax modification required to signal the wrap indicator in the slice header:

Listing (6)

```
/* Slice header RBSP syntax
*/
slice_header_rbsp( ) {
  lightweight_slice_flag
  if( !lightweight_slice_flag ) {
    slice_type
    pic_parameter_set_id
    if( IdrPicFlag )
      idr_pic_id
    pic_order_cnt
    wrap_indicator_flag
    if(!IdrPicFlag )
      buffer_description( )
    if(slice_type  = =  P  ||  slice_type  = =  B ) {
      num_ref_idx_active_override_flag
      if( num_ref_idx_active_override_flag ) {
        num_ref_idx_l0_active_minus1
        if( slice_type  = =  B )
          num_ref_idx_l1_active_minus1
      }
    }
    ref_pic_list_modification( )
    ref_pic_list_combination( )
    if( IdrPicFlag )
      no_output_of_prior_pics_flag
  }
  if( entropy_coding_mode_flag  &&  slice_type != I)
    cabac_init_idc
  first_slice_in_pic_flag
  if( first_slice_in_pic_flag == 0 )
    slice_address
  if( !lightweight_slice_flag ) {
    slice_qp_delta
    if( sample_adaptive_offset_enabled_flag )
      sao_param( )
    if( deblocking_filter_control_present_flag ) {
      disable_deblocking_filter_idc
      if( disable_deblocking_filter_idc  != 1 ) {
        slice_alpha_c0_offset_div2
        slice_beta_offset_div2
      }
    }
    if( slice_type = = B )
      collocated_from_l0_flag
    if( adaptive_loop_filter_enabled_flag ) {
```

-continued

Listing (6)

```
         if( !shared_pps_info_enabled_flag )
             alf_param( )
             alf_cu_control_param( )
         }
      }
}
```

A lightweight_slice_flag equal to 1 specifies that the value of slice header syntax elements not present shall be inferred to be equal to the value of slice header syntax elements in a proceeding slice. A lightweight_slice_flag equal to 0 specifies that the value of slice header syntax element values are transmitted in the current slice header. slice_type specifies the coding type of the slice P, B or I.

idr_pic_id identifies an instantaneous decoding refresh (IDR) picture. The values of idr_pic_id in all the slices of an IDR picture shall remain unchanged. When two consecutive access units in decoding order are both IDR access units, the value of idr_pic_id in the slices of the first such IDR access unit shall differ from the idr_pic_id in the second such IDR access unit. The value of idr_pic_id shall be in the range of 0 to 65535, inclusive.

pic_order_cnt specifies the picture order count of a coded picture and is used as an identifier in a buffer description application process and reference picture list creation processes. The pic_order_cnt syntax element shall be represented by log 2_max_pic_order_cnt_minus4+4 bits. The value of pic_order_cnt shall be in the range of 0 to Max-POC−1, inclusive.

num_ref_idx_active_override_flag equal to 1 specifies that the syntax element num_ref_idx_l0_active_minus1 is present for P and B slices and that the syntax element num_ref_idx_l1_active_minus1 is present for B slices. num_ref_idx_active_override_flag equal to 0 specifies that the syntax elements num_ref_idx_l0_active_minus1 and num_ref_idx_l1_active_minus1 are not present.

When the current slice is a P or B slice and field_pic_flag is equal to 0 and the value of num_ref_idx_l0_default_active_minus1 in the picture parameter set exceeds 15, num_ref_idx_active_override_flag shall be equal to 1. When the current slice is a B slice and field_pic_flag is equal to 0 and the value of num_ref_idx_l1_default_active_minus1 in the picture parameter set exceeds 15, num_ref_idx_active_override_flag shall be equal to 1. num_ref_idx_l0_active_minus1 specifies the maximum reference index for reference picture list 0 that shall be used to decode the slice.

When the current slice is a P or B slice and num_ref_idx_l0_active_minus1 is not present, num_ref_idx_l0_active_minus1 shall be inferred to be equal to num_ref_idx_l0_default_active_minus1. The range of num_ref_idx_l0_active_minus1 is specified as follows. If field_pic_flag is equal to 0, num_ref_idx_l0_active_minus1 shall be in the range of 0 to 15, inclusive. When MbaffFrameFlag is equal to 1, num_ref_idx_l0_active_minus1 is the maximum index value for the decoding of frame macroblocks and 2*num_ref_idx_l0_active_minus 1+1 is the maximum index value for the decoding of field macroblocks. Otherwise, (when field_pic_flag is equal to 1), num_ref_idx_l0_active_minus1 shall be in the range of 0 to 31, inclusive.

num_ref_idx_l1_active_minus1 specifies the maximum reference index for reference picture list 1 that shall be used to decode the slice. When the current slice is a B slice and num_ref_idx_l1_active_minus1 is not present, num_ref_idx_l1_active_minus1 shall be inferred to be equal to num_ref_idx_l1_default_active_minus1. The range of num_ref_idx_l1_active_minus1 is constrained as specified in the semantics for num_ref_idx_l0_active_minus1 with 10 and list 0 replaced by 11 and list 1, respectively.

no_output_of_prior_pies_flag specifies how the previously-decoded pictures in the decoded picture buffer are treated after decoding of an IDR picture. When the IDR picture is the first IDR picture in the bitstream, the value of no_output_of_prior_pics_flag has no effect on the decoding process. When the IDR picture is not the first IDR picture in the bitstream and the value of PicWidthInMbs, FrameHeightInMbs, or max_dec_frame_buffering derived from the active sequence parameter set is different from the value of PicWidthInMbs, FrameHeightInMbs, or max_dec_frame_ buffering derived from the sequence parameter set active for the preceding picture, no_output_of_prior_pics_flag equal to 1 may (but should not) be inferred by the decoder, regardless of the actual value of no_output_of_prior_pics_flag.

cabac_init_idc specifies the index for determining the initialization table used in the initialization process for context variables. The value of cabac_init_idc shall be in the range of 0 to 2, inclusive.

first_slice_in_pic_flag indicates whether the slice is the first slice of the picture. If first_slice_in_pic_flag is equal to 1, the variables SliceAddress and LCUAddress are both set to 0 and the decoding starts with the first largest coding unit (LCU) in the picture.

slice_address specifies the address in slice granularity resolution in which the slice starts and shall be represented by (Ceil(Log 2(NumLCUsInPicture))+SliceGranularity) bits in the bitstream where NumLCUsInPicture is the number of LCUs in a picture. The variable LCUAddress is set to (slice_address>>SliceGranularity) and represents the LCU part of the slice address in raster scan order. The variable GranularityAddress is set to (slice_address−(LCUAddress<<SliceGranularity)) and represents the sub-LCU part of the slice address expressed in z-scan order. The variable SliceAddress is then set to (LCUAddress<<(log 2_diff_max_min_coding_block_size<<1))+(GranularityAddress<<((log 2 _diff_max_min_coding_block_size<<1)−SliceGranularity) and the slice decoding starts with the largest coding unit possible at the slice starting coordinate.

slice_qp_delta specifies the initial value of the luma quantization parameter QPY to be used for all the macroblocks in the slice until modified by the value of cu_qp_delta in the coding unit layer. The initial QPY quantization parameter for the slice is computed as: SliceQPY=26+pic_init_qp_minus26+slice_qp_delta. The value of slice_qp_delta shall be limited such that SliceQPY is in the range of −QpBdOffsetY to +51, inclusive. "QpBdOffsetY=6*bit_depth_luma_minus8" specifies the value of the luma quantization parameter range offset. "bit_depth_luma_minus8+8" specifies the bit depth of the samples of the luma array. pic_init_qp_minus26 specifies the initial value minus 26 of SliceQPY for each slice.

A collocated_from_l0_flag equal to 1 specifies the picture that contains the co-located partition shall be derived from list 0, otherwise the picture shall be derived from list 1. ref_pic_list_modification( ) is a function that identifies the syntax of reference picture list modification. ref_pic_list_combination( ) is a function that identifies the syntax of reference picture list combination. alf_cu_control_param( ) is a function that identifies the syntax of adaptive loop filter coding unit control parameter. sao_param( ) is a function that identifies the syntax of sample adaptive offset parameter.

A disable_deblocking_filter_idc equal to 1 disables the application of the deblocking filter for certain block edges. A disable_deblocking_filter_idc equal to 0 enables the application of the deblocking filter for certain block edges. The deblocking process is controlled using values of syntax elements slice_alpha_c0_offset_div 2 and slice_beta_offset_div 2.

Listing (7) below illustrates an example of a bitstream syntax modification required to signal the wrap indicator in the Adaptation Parameter Set (APS):

Listing (7)

```
/* Adaptation parameter set RBSP syntax
*/
aps_rbsp( ) {
  aps_id
  wrap_indicator_flag
  aps_sample_adaptive_offset_flag
  aps_adaptive_loop_filter_flag
  if( aps_sample_adaptive_offset_flag ||
  aps_adaptive_loop_filter_flag ) {
    aps_cabac_use_flag
    if( aps_cabac_use_flag ) {
      aps_cabac_init_idc
      aps_cabac_init_qp_minus26
    }
  }
  if( aps_adaptive_loop_filter_flag ) {
    alf_data_byte_count /* to enable skipping past data
    without parsing it */
    /*    byte_align( )  this byte align happens between the non-CABAC
    and CABAC parts of the alf_param( ).   Once there is an
    all CABAC alf_param( ), enable this byte_align( ) */
    alf_param( )
    byte_align( )
  }
  if( aps_sample_adaptive_offset_flag ) {
    sao_data_byte_count /* to enable skipping past data
    without parsing it */
  byte_align ( )
  sao_param( )
```

Listing (7)

```
/*    byte_align( ) this final byte align unnecessary as being taken
care of by rbsp_trailing_bits( ) */
  rbsp_trailing_bits( )
  }
}
``` aps_id_identifies the adaptation parameter set that is referred to in the slice header.

An aps_sample_adaptive_offset_flag equal to 1 specifies that the SAO is on for slices referred to the current APS. When equal to 0, it specifies that the SAO is off for slices referred to the current APS. If there is no active APS, the aps_sample_adaptive_offset_flag value is inferred to be 0.

An aps_adaptive_loop_filter_flag equal to 1 specifies that the ALF is on for slices referred to the current APS. When equal to 0, it specifies that the ALF is off for slices referred to the current APS. If there is no active APS, the aps_adaptive_loop_filter_flag value is inferred to be 0.

An aps_cabac_use_flag equal to 1 specifies that the CABAC decoding process shall be used for sao_param( ) when present and used for alf_param( ) when present. When equal to 0, it specifies that the CAVLC decoding process shall be used for sao_param( ) when present and used for alf_param( ) when present.

aps_cabac_init_idc specifies the index for determining the initialization table used in the initialization process for context variables of SAO and ALF. The value of cabac_init_idc shall be in the range of 0 to 2, inclusive. aps_cabac_init_qp_minus26 specifies a quantization parameter minus 26, where the quantization parameter is used in the initialization process for context variables of SAO and ALF. alf_data_byte_count specifies a number of bytes. sao_data_byte_point specifies a number of bytes. byte_align( ) inserts 0 to 7 bits until alignment is reached.

In some configurations, the picture parameter set may include multiple buffer descriptions that correspond to long-term pictures only. Listing (8) below illustrates an example of a bitstream syntax modification for signaling multiple buffer descriptions corresponding to long-term pictures only.

Listing (8)

```
/* Picture parameter set RBSP syntax
*/
pic_parameter_set_rbsp( ) {
  ...
  bits_for_temporal_id_in_buffer_descriptions
  positive_pictures_in_buffer_descriptions_flag
  number_of_bds
  if( number_of_bds > 0 ) {
    for(i = 0; i < number_of_bds; i++){
      longterm_pictures_only_flag_pps[i]
      if (longterm_pictures_only_flag_pps[i]==0) {
        number_of_negative_pictures_pps[i]
        for( j = 0; j < number_of_negative_pictures_pps[i]; j++ ) {
          negative_delta_poc_minus_one_pps[i][j]
          if( bits_for_temporal_id_in_buffer_descriptions > 0 )
            temporal_id_negative_pps[i][j]
        }
        if( positive_pictures_in_buffer_descriptions_flag ){
          number_of_positive_pictures_pps[i]
          for( j = 0; j < number_of_positive_pictures_pps[i]; j++ ) {
            delta_poc_minus_one_pps[i][j]
            if( bits_for_temporal_id_in_buffer_descriptions > 0 )
              temporal_id_positive_pps[i][j]
          }
        }
      }
      number_of_longterm_pictures_pps[i]
```

Listing (8)

```
        for( j = 0; j < number_of_longterm_pictures_pps[i]; j++ ) {
            poc_pps[i][j]
            poc_cycle_pps[i][j]
            poc_cycle_steps_flag
            if (poc_cycle_steps_flag) {
                poc_cycle_steps
            }
            if( bits_for_temporal_id_in_buffer_descriptions > 0 )
                temporal_id_poc_pps[i][j]
        }
    }
  }
     ...
}
```

A 'longterm_pictures_only_flag_pps[i]' equal to 1 indicates that the i-th buffer description contains only long-term picture references. A 'longterm_pictures_only_flag_pps[i]' equal to 0 identifies that the i-th buffer description contains both deltaPOC and long-term picture references.

In some configurations, a buffer description may refer to a picture that is not available for reference. A picture that is not available for reference refers to a picture that has not been decoded prior to the current picture. Additionally, a picture that is not available for reference refers to a picture that has been decoded prior to the current picture but is identified as no longer available for reference. One example of a procedure for identifying that a picture is no longer available for reference is through the use of an IDR frame. An IDR frame denotes that the IDR frame and all pictures subsequently received do not refer to pictures received prior to receiving the IDR frame. Thus, all frames received prior to the IDR frame are no longer available for reference for the IDR frame and subsequently received frames.

In configurations where a buffer description refers to a picture that is not available for reference, a decoder does not allow the use of the picture that is not available for reference in predicting information used for decoding the current frame. In one configuration, this is done by not including the frame in the process of creating a set of reference frames. Thus, the output of the process of creating a set of reference frames may be the same if the buffer description refers to a picture that is not available for reference, if the buffer description does not refer to a picture that is not available for reference and if other pictures referred to by both buffer descriptions are the same. In another configuration, the picture that is not available for reference is included in the process of creating a set of reference frames. Thus, the output of the process of creating a set of reference frames is not the same if the buffer description refers to a picture that is not available for reference and if the buffer description does not refer to a picture that is not available for reference. In this configuration, a decoder does not allow selecting the picture that is not available for reference in predicting information used for decoding the current frame.

In some configurations, the i-th reference picture lists defined in the PPS: POCBD_pps[i], temporalIDBD_pps[i], POC_CYCLE_BD_pps[i] and the lists POCBD, temporalIDBD and POC_CYCLE_BD are partitioned based on if the reference picture is a past picture or a future picture, in display order, with respect to the current picture (being decoded). It should be noted that i may take on values from 0 to number_of_bds−1.

In some configurations, the temporal identifier may be replaced with a flag that signals or indicates whether the corresponding reference picture is used by the current picture (being decoded). As a result, the temporalID list temporalIDBBD and the i-th temporalID list in PPS temporalIDBD_pps[i] are replaced by lists usedByCurPicBD and usedByCurPicBD pps[i], respectively, containing the above flag. In some configurations, the values of the flag may be used to partition the i-th reference picture lists defined in PPS: POCBD_pps[i], usedByCurPicBD pps[i], POC_CYCLE_BD_pps[i] and the lists POCBD, usedByCurPicBD, POC_CYCLE_BD into one or more lists. In one configuration, entries with a zero value for the flag are assigned to one list and those with non-zero values (e.g., 1) are assigned to another list. It should be noted that i may take on values from 0 to number_of_bds−1.

Listing (9) illustrates another example of syntax modification for the PPS from AHG21. In particular, Listing (9) illustrates another example of a buffer description syntax used in slice headers as outlined in the AHG21 working draft. However, modifications to the syntax given in the AHG21 working draft in accordance with the systems and methods disclosed herein are denoted in bold text in Listing (9).

Listing (9)

```
/* Buffer description
*/
buffer_description( ) {
    bd_reference_flag
    if(bd_reference_flag = = 1) {
        bd_idx
        bd_poc_cycle_update_flag
        if (bd_poc_cycle_update_flag == 1)
            for( j = 0; j < number_of_longterm_pictures_pps[bd_idx]; j++ ) {
                poc_pps_override[j]
                poc_cycle_pps_override[j]
                if( bits_for_temporal_id_in_buffer_descriptions > 0 )
```

Listing (9)

```
            temporal_id_pps_override[j]
        }
    bd_poc_cycle_replace_count
    if (bd_poc_cycle_replace_count>0)
        for( j = 0; j < bd_poc_cycle_replace_count; j++ ) {
            bd_pps_replace_idx[j]
            poc_pps_replace[j]
            poc_cycle_pps_replace[j]
            if( bits_for_temporal_id_in_buffer_descriptions > 0 )
                temporal_id_pps_replace[j]
        }
    bd_poc_cycle_delete_count
    if (bd_poc_cycle_delete_count >0 )
        for( j = 0; j < bd_poc_cycle_delete_count; j++ ) {
            bd_pps_delete_idx[j]
        }
    bd_poc_cycle_append_count
    if (bd_poc_cycle_append_count >0 )
        for( j = 0; j < bd_poc_cycle_append_count; j++ ) {
            poc_pps_append[j]
            poc_cycle_pps_append[j]
            if( bits_for_temporal_id_in_buffer_descriptions > 0 )
                temporal_id_pps_append[j]
        }
    } else {
        number_of_negative_pictures
        for( i = 0; i < number_of_negative_pictures; i++ ) {
        ...
        }
        if( positive_pictures_in_buffer_descriptions_flag ){
        ...
        }
        number_of_longterm_pictures
        for( j = 0; j < number_of_longterm_pictures; j++ ) {
            poc[j]
            poc_cycle[j]
            if( bits_for_temporal_id_in_buffer_descriptions > 0 )
                temporal_id_poc[j]
        }
        if( number_of_negative_pictures + number_of_positive_pictures <
                max_num_ref_frames ) {
            combine_with_reference_flag
            if( combine_with_reference_flag )
                bd_combination_idx
        }
    }
}
```

Listing (9) contains many elements similar to that of Listing (4). Listing (9) also contains syntax modifications to the slice header to allow for selective replacement of reference pictures.

bd_poc_cycle_replace_count specifies the number of entries to be selectively replaced in the lists POCBD_pps[bd_idx], POC_CYCLE_BD_pps[bd_idx] and temporalID-BD_pps[bd_idx]. In some configurations, bd_poc_cycle_replace_count may be greater than or equal to 0. bd_pps_replace_idx[j] identifies the index of the entry to be replaced in the lists: POCBD_pps[bd_idx], POC_CYCLE_BD_pps[bd_idx] and temporalIDBD_pps[bd_idx].

POC_CYCLE_BD_pps[bd_idx][bd_pps_replace_idx[j]] of the referenced buffer description should be replaced for the current picture. In some configurations, future frames may also override poc_cycle information. poc_cycle_pps_replace[j] specifies the values to be used to replace the value within POC_CYCLE_BD_pps[bd_idx] [bd_pps_replace_idx[j]] for the current picture only.

poc_pps_replace[j] specifies the value to be used to replace the value within POCBD_pps[bd_idx][bd_pps_replace_idx[j]] for the current picture only. temporal_id_pps_replace[j] specifies the value to be used to replace the value within TemporalIDBD_pps[bd_idx][bd_pps_replace_idx[j]] for the current picture only.

In some configurations, if the i-th reference picture lists defined in PPS: POCBD_pps[i], usedByCurPicBD_pps[i], POC_CYCLE_BD_pps[i] are partitioned, then the selective replace, override, delete and append operations are first performed on a derived list generated using the partitioned list. After all or a subset of the operations are completed, the entries in the derived list may be partitioned back (e.g., restored) to the original lists from which the derived list was derived. It should be noted that i may take on values from 0 to number_of_bds-1.

In some configurations, the selective replace, override, delete and append operations are signaled separately for each list set belonging to a buffer description in the PPS (e.g., (negative deltaPOC list, negative deltaPOC usedByCurPicBD list) set, (positive deltaPOC list, positive deltaPOC usedByCurPicBD list) set and (poc list, poc_cycle list, poc and poc_cycle usedByCurPicBD list) set). In another configuration, a scaling parameter list may be present in each list set.

In some configurations, if a bitstream contains a first picture with a first resolution and a second picture with a second resolution, if the first resolution and the second resolution are not equal, and if the second picture is not an IDR picture or a Sequence Parameter Set (SPS) is not received after the first picture and prior to the second picture, then the decoded picture buffer may include pictures having different resolutions. An encoder may then signal to the decoder that the reference pictures in the decoded picture buffer (DPB) are modified such that the reference picture comprises one of the following options:

(a) The first resolution,
(b) The second resolution, or
(c) Both the first and second resolutions Some example use cases are given as follows. Option (a) is useful if a reference picture will only be used for motion prediction at the lower resolution. An example of option (a) is given as a first example 1653a illustrated in FIG. 16.

Option (b) is useful when the bitstream contains a third picture that is subsequent to the second picture, where the third picture is at the first resolution and where the long-term picture stored in the DPB may be used for motion prediction. An example of option (b) is given as a second example 1653b illustrated in FIG. 16.

Option (c) is useful when a lower resolution version of the reference picture is used in motion prediction for lower resolution pictures. Additionally, when a higher resolution version of the reference picture is used for motion prediction when decoding a third picture that is subsequent to the second picture, where the third picture is at the first resolution. An example of option (c) is given as a third example 1653c in FIG. 16.

The resolution switching may be signaled using the syntax modification as shown in Listing (10) below. The modifications in accordance with the systems and methods described herein are denoted in bold text below.

Listing (10)

```
ref_pic_set( idx ) {
        num_negative_pics
        num_positive_pics
        number_of_longterm_pictures
        for( i = 0; i < num_negative_pics; i++ ) {
                delta_poc_s0_minus1[i]
                used_by_curr_pic_s0_flag[i]
                if ((refPicS0Width[i] != curPicWidth] || refPicS0Height[i] !=
curPicHeight) && adaptive_res_coding_flag)
                        ref_pic_s0_resolution_idx[i]
        }
        for( i = 0; i < num_positive_pics; i++ ) {
                delta_poc_s1_minus1[i]
                used_by_curr_pic_s1_flag[i]
                if ((refPicS1Width[i] != curPicWidth || refPicS1Height[i] !=
curPicHeight) && adaptive_res_coding_flag)
                        ref_pic_s1_resolution_idx[i]
        }
}
        for( i = 0; i < number_of_longterm_pictures; i++ ) {
                poc [i]
                poc_cycle[i]
                used_by_curr_pic_longterm_flag[i]
                if ((refPicS1Width[i] != curPicWidth || refPicS1Height[i] !=
curPicHeight) && adaptive_res_coding_flag)
                        ref_pic_longterm_resolution_idx[i]
                }
```

If an 'adaptive_res_coding_flag' equals 0, then the sequence does not undergo resolution switching. If the 'adaptive_res_coding_flag' equals 1, then the sequence undergoes resolution switching.

refPicS0Height[i] and refPicS0Width[i] represent the original height and width of the i-th reference picture corresponding to a negative deltaPOC. refPicS1Height[i] and refPicS1Width[i] represent the original height and width of the i-th reference picture corresponding to a positive deltaPOC. curPicHeight and curPicWidth represent the height and width of the current picture being decoded.

'num_negative_pics' specifies the number of the following delta_poc_s0_minus1[i] and used_by_curr_pic_s0_flag [i] syntax elements. num_positive_pics specifies the number of the following delta_poc_s1_minus1[i] and used_by_curr_pic_s1_flag1[i] syntax elements.

'delta_poc_s0_minus1[i]' plus 1 specifies an absolute difference between two picture order count values. The value of delta_poc_s0_minus1[i] shall be in the range of 0 to 215-1, inclusive. delta_poc_s0_minus1[i] corresponds to negative deltaPOC values.

A 'used_by_curr_pic_s0_flag[i]' equal to 0 specifies that the i-th reference picture that has a picture order count less than that of the current picture is not used for reference by the current picture. 'delta_poc_s1_minus1[i]' plus 1 specifies an absolute difference between two picture order count values. The value of delta_poc_s1_minus1[i] shall be in the range of 0 to 215-1, inclusive. delta_poc_s1_minus1[i] corresponds to positive deltaPOC values.

A 'used_by_curr_pic_s1_flag[i]' equal to 0 specifies that the i-th reference picture that has a picture order count greater than that of the current picture is not used for reference by the current picture.

A 'used_by_curr_pic_longterm_flag[i]' equal to 0 specifies that the i-th long-term reference picture is not used for reference by the current picture.

A 'ref_pic_s0_resolution_idx[i]' equal to 0 specifies that the reference picture is scaled to make its resolution match the resolution of the current picture being decoded. A 'ref_pic_s0_resolution_idx[i]' equal to 1 specifies that the reference picture is kept at the original resolution of the reference picture. A 'ref_pic_s0_resolution_idx[i]' equal to 2 specifies that the reference picture resolution is maintained at both its original resolution and at the resolution of the current picture. 'ref_pic_s0_resolution_idx[i]' is inferred to be 0 when not present.

A 'ref_pic_s1_resolution_idx[i]' equal to 0 specifies that the reference picture is scaled to make its resolution match the resolution of the current picture being decoded. A 'ref_pic_s1_resolution_idx[i]' equal to 1 specifies that the reference picture is kept at the original resolution of the reference picture. A 'ref_pic_s1_resolution_idx[i]' equal to 2 specifies that the reference picture resolution is maintained at both its original resolution and at the resolution of the current picture. 'ref_pic_s1_resolution_idx[i]' is inferred to be 0 when not present.

In one configuration, if a bitstream contains a first picture with a first resolution and a second picture and fourth picture with a second resolution, where the first resolution and second resolution are not equal and where the second picture is not an IDR picture or a Sequence Parameter Set (SPS) is not received after the first picture and prior to the second picture, then the second picture may only reference one reference picture of the first resolution. In a second configuration, if a bitstream contains a first picture with a first resolution and a second picture with a second resolution, where the first resolution and second resolution are not equal and where the second picture is not an IDR picture or a Sequence Parameter Set (SPS) is not received after the first picture and prior to the second picture, then the fourth picture may only reference one reference picture of the first resolution that is not referenced by other pictures of the second resolution.

For example, if the fourth picture is preceded by other pictures of the same resolution, the fourth picture may reference one reference picture that is the first resolution in addition to the reference pictures used by the pictures preceding the fourth picture that are of the same resolution. In other words, when decoding a picture of the second resolution, only one reference picture with a first resolution may be used for reference when decoding a picture. Once a picture with a first resolution is used for reference when decoding a picture with a second resolution, the picture with a first resolution that is used for reference is considered to have a resolution of the second resolution for decoding of subsequent pictures.

Figure 12:
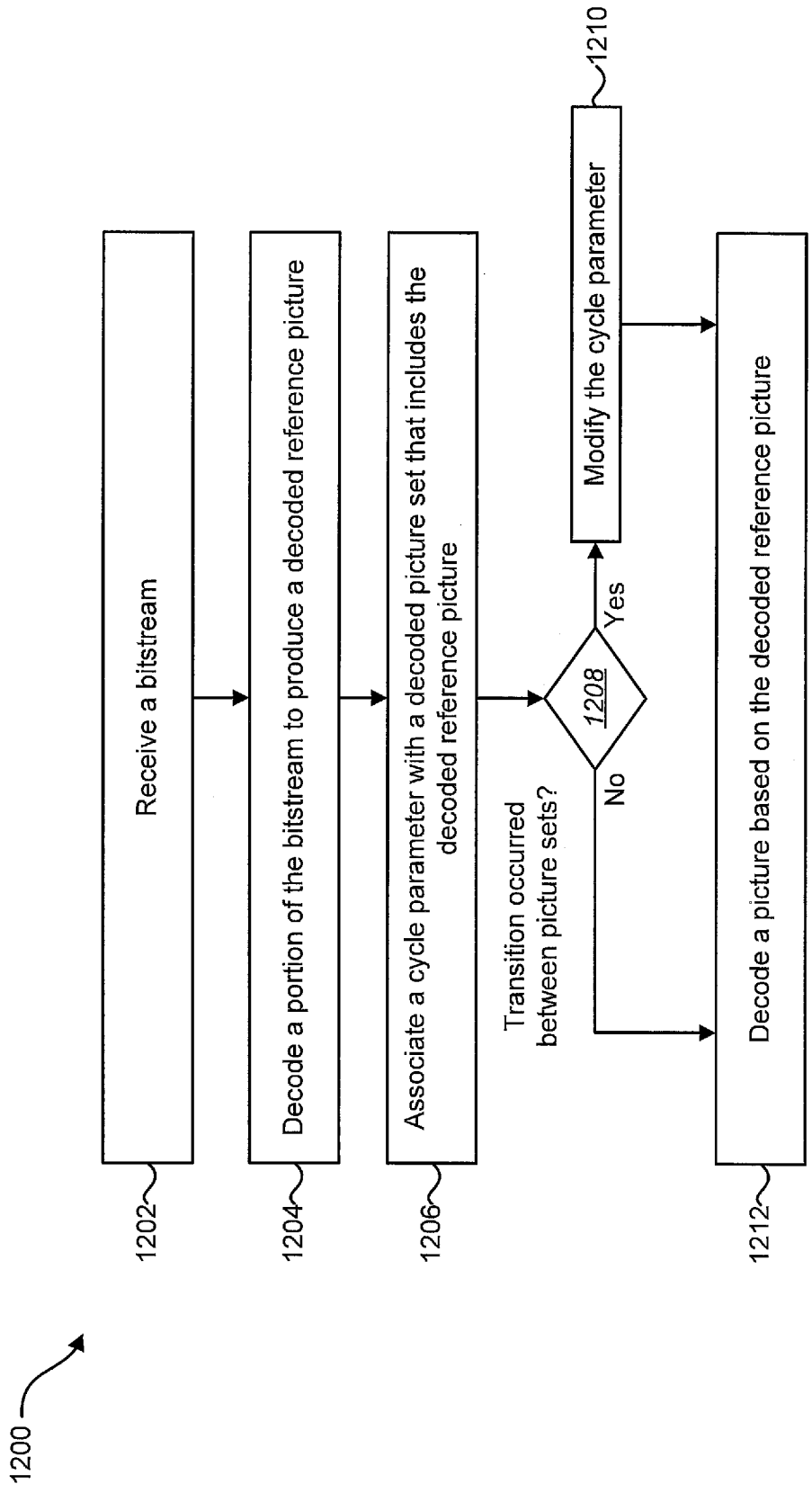
FIG. 12 is a flow diagram illustrating another more specific configuration of a method for tracking a reference picture with reduced overhead referencing based on a designated picture.

FIG. 12 is a flow diagram illustrating another more specific configuration of a method 1200 for tracking a reference picture with reduced overhead referencing based on a designated picture. This method 1200 may be another approach for tracking which picture is being referenced when POCs are reused. An electronic device 204 (e.g., decoder 202) may receive 1202 a bitstream. For example, the decoder 202 may receive 1202 a bitstream 214 that includes an encoded reference picture. In some configurations, the bitstream 214 may also include overhead information (e.g., PPS, buffer description information, parameters, reference picture designation or identifier, etc.).

The electronic device 204 may decode 1204 a portion of the bitstream to produce a decoded reference picture. For example, the decoder 202 may decode 1204 a portion of the bitstream 214 to produce a decoded reference picture that is stored in frame memory 264. It should be noted that one or more portions of the bitstream 214 may be decoded 404 to produce one or more decoded reference pictures.

The electronic device 204 may associate 1206 a cycle parameter with a decoded picture set that includes the decoded reference picture. For example, the electronic device 204 may associate 1206 a cycle parameter "poc_cycle" with a decoded picture set or each picture in a decoded picture set that includes the decoded reference picture. The cycle parameter "poc_cycle" is described in greater detail above.

The electronic device 204 may determine 1208 whether a transition has occurred between picture sets. For example, the transition may be determined 1208 by examining the POC of a current picture being decoded (e.g., $$CurPOC) \qquad [Math.45]$$

and comparing it to the POC of the last picture that was decoded (e.g., $$LastPOC). \qquad [Math.46]$$

For instance, if the POC of the current picture (e.g., $$CurPOC) \qquad [Math.47]$$

being decoded is less than the POC of the last decoded picture (e.g., $$LastPOC) \qquad [Math.48]$$

and $$LastPOC-CurPOC \qquad [Math.49]$$

is greater than a threshold $$TH\_FWD, \qquad [Math.50]$$

then a transition from an earlier picture set to a later picture set may be determined 1208. However, if the POC of the current picture being decoded (e.g., $$CurPOC) \qquad [Math.51]$$

is greater than the POC of the last picture that was decoded (e.g., $$LastPOC) \qquad [Math.52]$$

and $$CurPOC-LastPOC \qquad [Math.53]$$

is greater than a threshold $$TH\_BCKWD, \qquad [Math.54]$$

then a transition from a later picture set to an earlier picture set may be determined 1208. For all other cases, it may be determined 1208 that no transition has occurred. In some configurations, the thresholds may take on values $$TH\_FWD=TH\_BCKWD=MaxPOC/2. \qquad [Math.55]$$

If the electronic device 204 determines 1208 that a transition has occurred between two picture sets, the electronic device 204 may modify 1210 the cycle parameter. For example, the electronic device 204 may decrement cycle parameters for each picture or each set of pictures in the DPB when the transition is from an earlier picture set. In another example, the electronic device 204 may increment the cycle parameters for each picture or each set of pictures in the DPB when the transition is from a later picture set. Thus, an update of all reference picture cycle parameters may be carried out with respect to the picture being decoded. This update procedure (e.g., determining 1208 whether a transition has occurred between picture sets and possibly modifying 1210 the cycle parameter(s)) may be executed once for each picture being decoded.

One alternative definition of the cycle parameter "poc_cycle" may be that the poc_cycle for the picture (currently) being decoded is 0. Thus, the set of pictures that includes the picture currently being decoded may be 0.

The poc_cycle of any other picture, such as the reference picture, may be calculated as the $$MaxPOCSetIndex \qquad [Math.56]$$

of the reference picture minus the $$MaxPOCSetIndex \qquad [Math.57]$$

of the picture being decoded. For example, if the $$MaxPOCSetIndex \qquad [Math.58]$$

of the picture being decoded is 'n' and the reference picture has a $$MaxPOCSetIndex \qquad [Math.59]$$

that is 'n'−1, then the poc_cycle of the reference picture may be $$(n-1)-n=1. \qquad [Math.60]$$

It should be noted that the poc_cycle for a reference picture may depend on the $$MaxPOCSetIndex \qquad [Math.61]$$

distance between the reference picture and the picture being decoded. This can be determined implicitly by keeping track of transitions (e.g., determining 1208 whether a transition has occurred) between one picture set of $$[0, \ldots, MaxPOC-1] \qquad [Math.62]$$

and the other picture set $$[0, \ldots, MaxPOC-1] \qquad [Math.63]$$

at both the encoder 108 and decoder 102.

The electronic device 204 may decode 1212 a picture based on the decoded reference picture. For example, a portion of the bitstream 214 (other than the portion decoded 1204 to produce the decoded reference picture) may be decoded 1212 based on the decoded reference picture. For example, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 1212 the picture. In some configurations or instances, one or more decoded reference pictures may be used to decode 1212 the picture.

Figure 13:
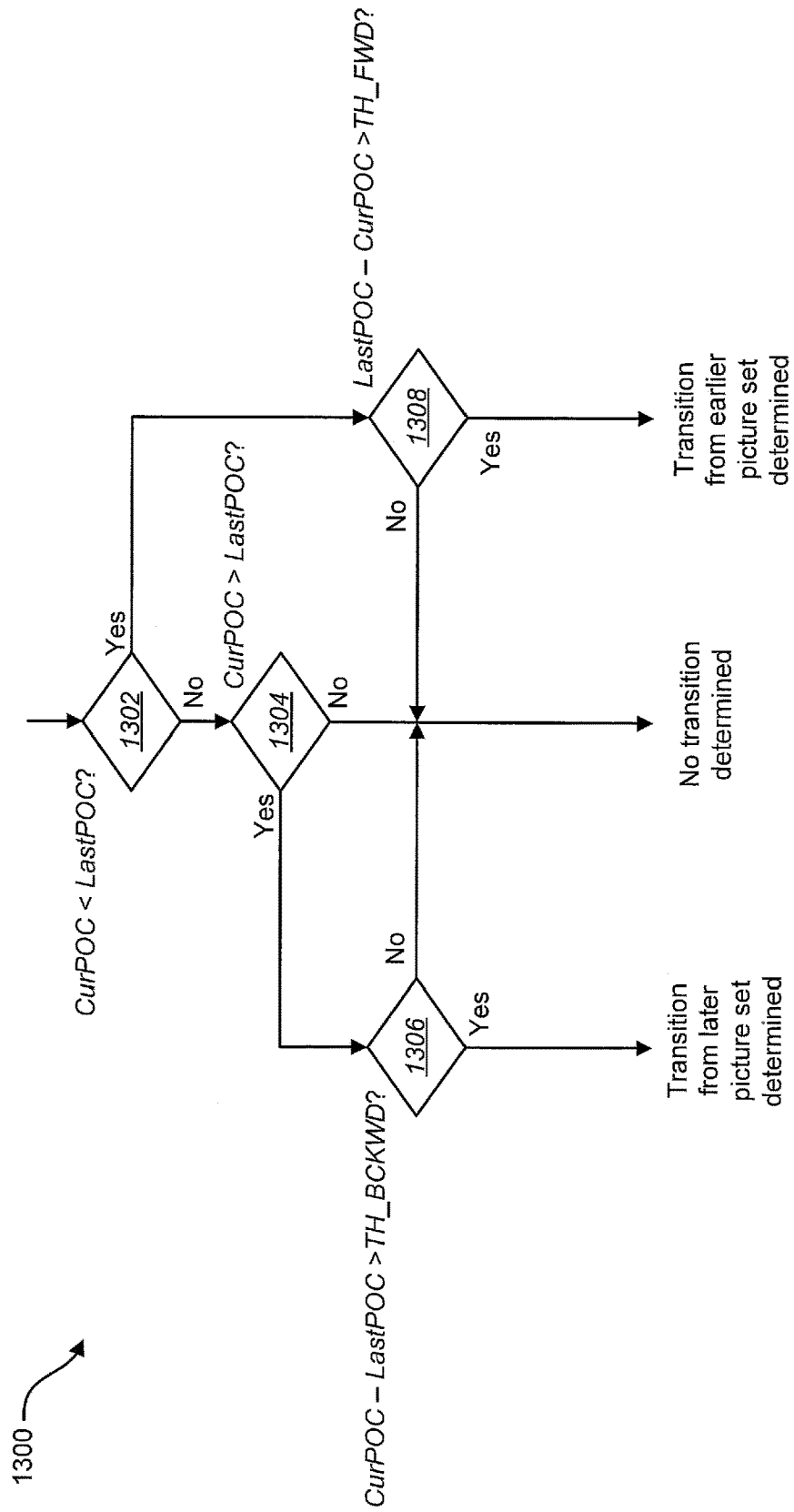
FIG. 13 is a flow diagram illustrating one configuration of a method for determining whether a transition has occurred between picture sets.

FIG. 13 is a flow diagram illustrating one configuration of a method 1300 for determining whether a transition has occurred between picture sets. For example, FIG. 13 provides one example of determining 1208 whether a transition has occurred between picture sets as illustrated in FIG. 12. The electronic device 204 may determine 1302 whether the POC of the current picture being decoded (denoted "

$$CurPOC," \qquad [Math.64]$$

for example) is less than the POC of the last decoded picture (denoted "

$$LastPOC," \qquad [Math.65]$$

for example). For instance, the electronic device 204 may compare a POC of a current picture being decoded (e.g., $$CurPOC) \qquad [Math.66]$$

to a POC of a picture that was decoded last (e.g., $$LastPOC) \qquad [Math.67]$$

to make this determination 1302.
If $$CurPOC<LastPOC, \qquad [Math.68]$$

the electronic device 204 may determine 1308 whether $$LastPOC-CurPOC \qquad [Math.69]$$

is greater than a threshold $$TH\_FWD. \qquad [Math.70]$$

If $$LastPOC-CurPOC \qquad [Math.71]$$

is greater than a threshold $$TH\_FWD, \qquad [Math.72]$$

the electronic device 204 may determine 1308 that a transition from an earlier picture set to a later picture set has occurred. However, if $$LastPOC-CurPOC \qquad [Math.73]$$

is not greater than $$TH\_FWD, \qquad [Math.74]$$

the electronic device 204 may determine 1308 that no transition has occurred.
If $$CurPOC \qquad [Math.75]$$

is not less than $$LastPOC, \qquad [Math.76]$$

then the electronic device 204 may determine 1304 whether $$CurPOC \qquad [Math.77]$$

is greater than $$LastPOC. \qquad [Math.78]$$

If the electronic device 204 determines 1304 that $$CurPOC \qquad [Math.79]$$

is greater than $$LastPOC, \qquad [Math.80]$$

then the electronic device 204 may determine 1306 whether $$CurPOC-LastPOC \qquad [Math.81]$$

is greater than a threshold $$TH\_BCKWD. \qquad [Math.82]$$

If the electronic device determines 1306 that $$CurPOC-LastPOC \qquad [Math.83]$$

is greater than a threshold $$TH\_BCKWD, \qquad [Math.84]$$

then the electronic device 204 may determine 1306 that a transition from a later picture set to an earlier picture set has occurred. If the electronic device determines 1306 that $$CurPOC-LastPOC \qquad [Math.85]$$

is not greater than a threshold $$TH\_BCKWD, \qquad [Math.86]$$

then the electronic device 204 may determine 1306 that no transition has occurred.
If the electronic device 204 determines 1304 that $$CurPOC \qquad [Math.87]$$

is not greater than $$LastPOC, \qquad [Math.88]$$

the electronic device may determine 1304 that no transition has occurred. In some configurations, the thresholds may take on values $$TH\_FWD=TH\_BCKWD=MaxPOC/2. \qquad [Math.89]$$

Figure 14:
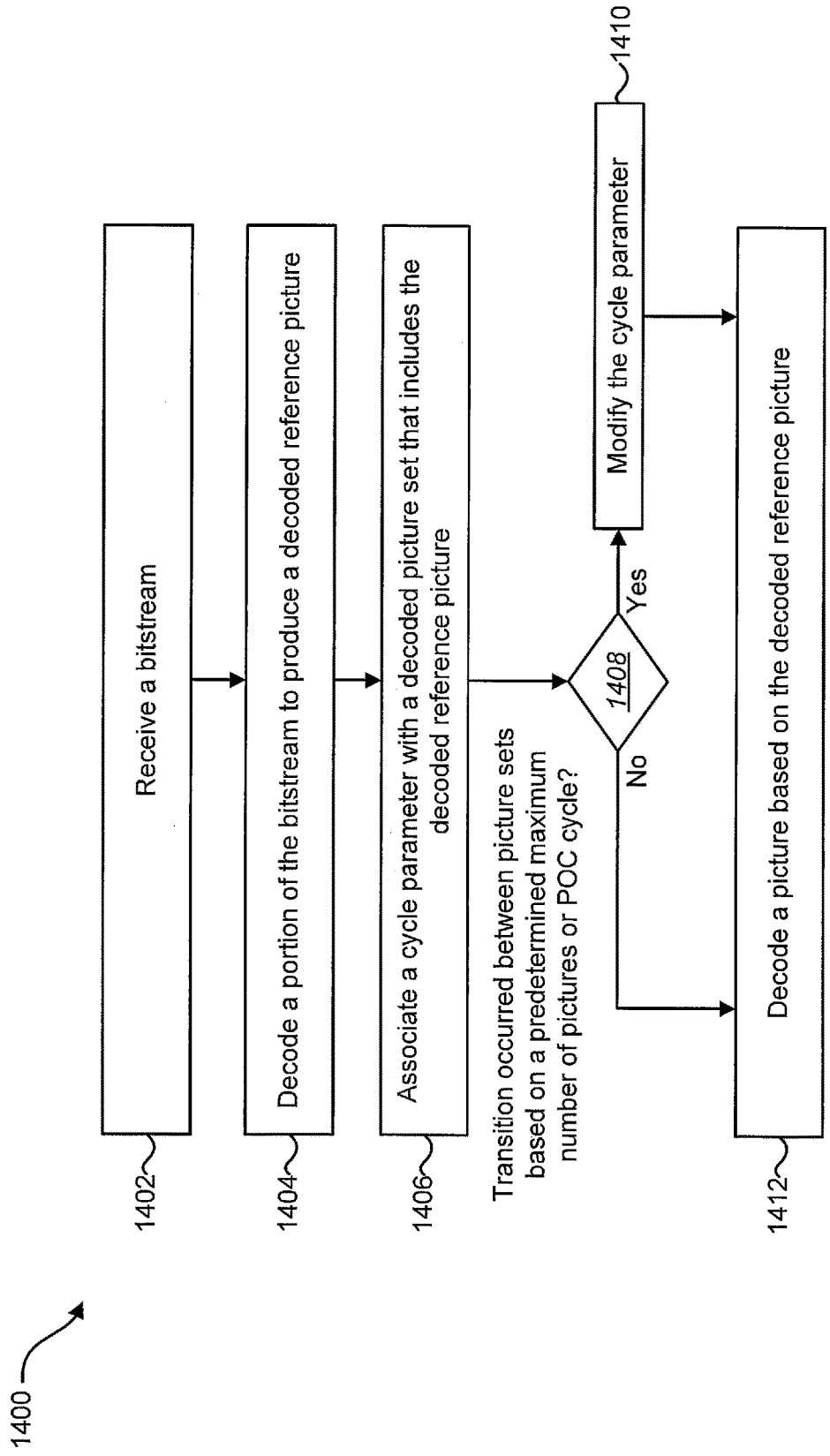
FIG. 14 is a flow diagram illustrating another more specific configuration of a method for tracking a reference picture with reduced overhead referencing based on a designated picture.

FIG. 14 is a flow diagram illustrating another more specific configuration of a method 1400 for tracking a reference picture with reduced overhead referencing based on a designated picture. This method 1400 may be one approach for tracking which picture is being referenced when POCs are reused. An electronic device 204 (e.g., decoder 202) may receive 1402 a bitstream 214. For example, the decoder 202 may receive 1402 a bitstream 214 that includes an encoded reference picture (and other encoded pictures, for instance). In some configurations, the bitstream 214 may include overhead information (e.g., PPS, buffer description information, parameters, reference picture designation or identifier, etc.).

The electronic device 204 may decode 1404 a portion of the bitstream 214 to produce a decoded reference picture. For example, the decoder 202 may decode 1404 a portion of the bitstream 214 to produce a decoded reference picture that is stored in frame memory 264. It should be noted that one or more portions of the bitstream 214 may be decoded 1404 to produce one or more decoded reference pictures.

The electronic device 204 may associate 1406 a cycle parameter with a decoded picture set that includes the decoded reference picture. For example, the electronic device 204 may associate 1406 a cycle parameter "poc_cycle" with a decoded picture set that includes the decoded reference picture.

The electronic device 204 may determine 1408 whether a transition has occurred between picture sets. For example, each time a decoder 102 decodes a predetermined number of pictures in a set of pictures, the decoder 102 or electronic device B 104*b* may determine 1408 that a transition has occurred between two picture sets. In another example, each time a decoder 102 detects a cycle in POC (e.g., restarting from a maximum value to a minimum value), the decoder 102 or electronic device B 104*b* may determine 1408 that a transition has occurred between two picture sets.

If the electronic device 204 determines 1408 that a transition has occurred between picture sets, the electronic device 204 may modify 1410 (e.g., decrement) the cycle parameter. For example, the electronic device 204 decrements cycle parameters for each picture or each set of pictures in the DPB. In another example, the electronic device 204 may increment the cycle parameter.

The electronic device 204 may decode 1412 a picture based on the decoded reference picture. For example, a portion of the bitstream 214 (other than the portion decoded 1404 to produce the decoded reference picture) may be decoded 1412 based on the reference picture. For instance, the decoded reference picture (that has been tracked in the DPB) may be provided to a motion compensation module 260 in order to generate an inter-frame prediction signal 268 based on an inter-frame prediction mechanism. The inter-frame prediction signal 268 may then be used to decode 1412 the picture. In some configurations or instances, one or more decoded reference pictures may be used to decode 1412 the picture.

Figure 15:
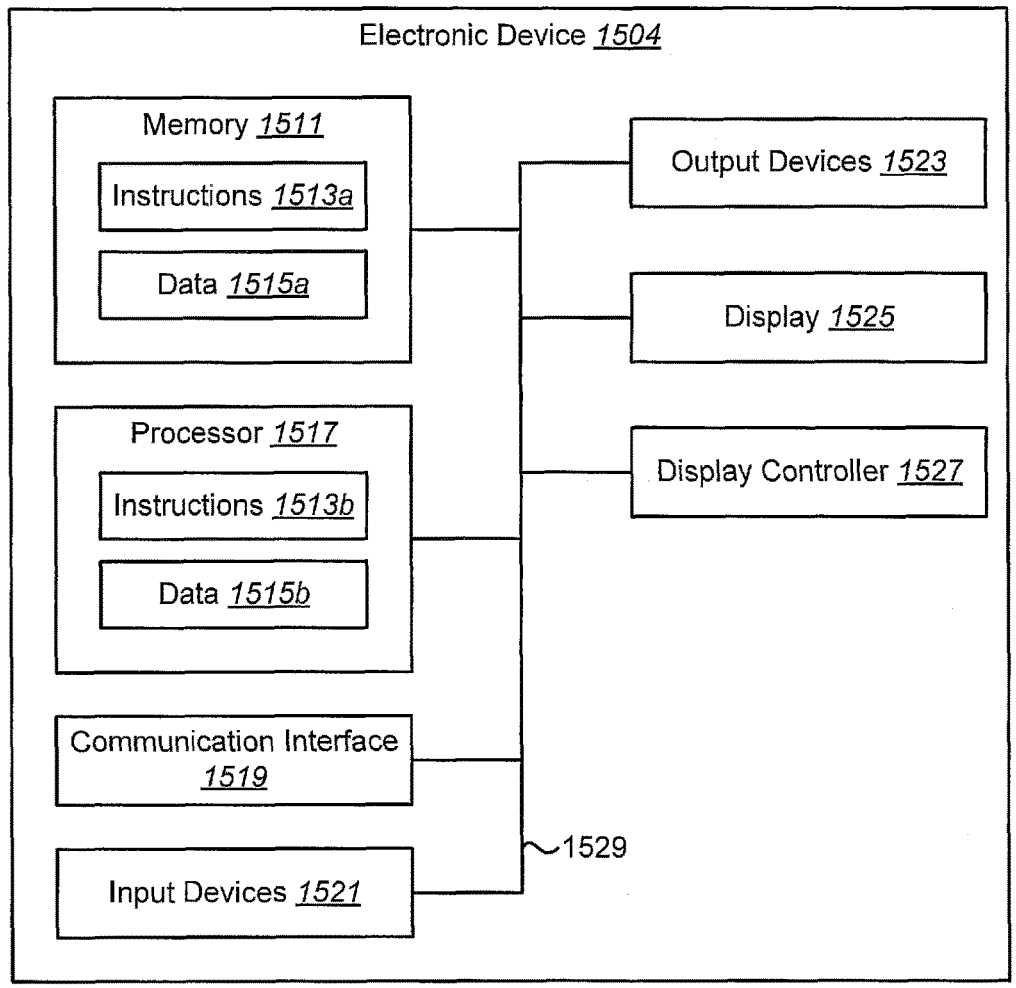
FIG. 15 illustrates various components that may be utilized in an electronic device.

FIG. 15 illustrates various components that may be utilized in an electronic device 1504. The electronic device 1504 may be implemented as one or more of the electronic devices (e.g., electronic devices 104, 204) described previously.

The electronic device 1504 includes a processor 1517 that controls operation of the electronic device 1504. The processor 1517 may also be referred to as a CPU. Memory 1511, which may include both read-only memory (ROM), random access memory (RAM) or any type of device that may store information, provides instructions 1513*a* (e.g., executable instructions) and data 1515*a* to the processor 1517. A portion of the memory 1511 may also include non-volatile random access memory (NVRAM). The memory 1511 may be in electronic communication with the processor 1517.

Instructions 1513*b* and data 1515*b* may also reside in the processor 1517. Instructions 1513*b* and/or data 1515*b* loaded into the processor 1517 may also include instructions 1513*a* and/or data 1515*a* from memory 1511 that were loaded for execution or processing by the processor 1517. The instructions 1513*b* may be executed by the processor 1517 to implement the systems and methods disclosed herein. For example, the electronic device 1504 may perform one or more of the methods 300, 400, 800, 900, 1000, 1200, 1300, 1400, 1700, 1800 described above and below.

The electronic device 1504 may include one or more communication interfaces 1519 for communicating with other electronic devices. The communication interfaces 1519 may be based on wired communication technology, wireless communication technology, or both. Examples of communication interfaces 1519 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, a wireless transceiver in accordance with 3$^{rd}$ Generation Partnership Project (3GPP) specifications and so forth.

The electronic device 1504 may include one or more output devices 1523 and one or more input devices 1521. Examples of output devices 1523 include a speaker, printer, etc. One type of output device that may be included in an electronic device 1504 is a display device 1525. Display devices 1525 used with configurations disclosed herein may utilize any suitable image projection technology, such as a cathode ray tube (CRT), liquid crystal display (LCD), light-emitting diode (LED), gas plasma, electroluminescence or the like. A display controller 1527 may be provided for converting data stored in the memory 1511 into text, graphics, and/or moving images (as appropriate) shown on the display 1525. Examples of input devices 1521 include a keyboard, mouse, microphone, remote control device, button, joystick, trackball, touchpad, touchscreen, lightpen, etc.

The various components of the electronic device 1504 are coupled together by a bus system 1529, which may include a power bus, a control signal bus and a status signal bus, in addition to a data bus. However, for the sake of clarity, the various buses are illustrated in FIG. 15 as the bus system 1529. The electronic device 1504 illustrated in FIG. 15 is a functional block diagram rather than a listing of specific components.

Figure 16:
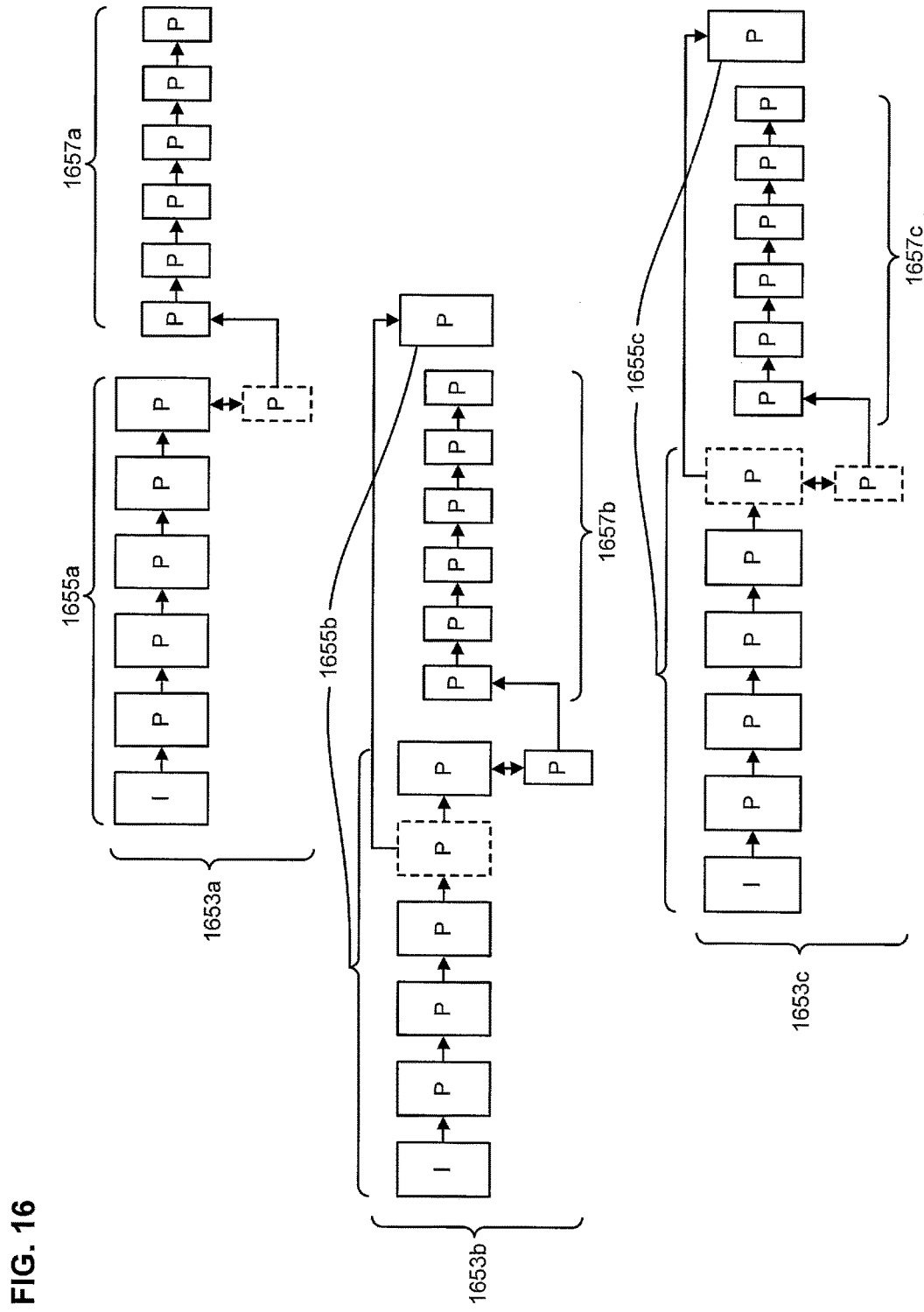
FIG. 16 is a diagram illustrating examples of use cases in accordance with the systems and methods disclosed herein.

FIG. 16 is a diagram illustrating examples of use cases in accordance with the systems and methods disclosed herein. In particular, three examples 1653*a-c* are illustrated as described above. These three examples may occur if a bitstream contains a first picture with a first resolution and a second picture with a second resolution, if the first resolution and the second resolution are not equal, and if the second picture is not an IDR picture or a Sequence Parameter Set (SPS) is not received after the first picture and prior to the second picture.

The first example 1653*a* illustrates pictures of a first resolution 1655*a* and pictures of a second resolution 1657*a* stored in a decoded picture buffer. In the first example 1653*a*, an encoder may signal to a decoder that the reference pictures in the decoded picture buffer (DPB) are modified such that a reference picture is at the first resolution. This may be useful if the reference picture will only be used for motion prediction at the lower resolution.

The second example 1653*b* illustrates pictures of a first resolution 1655*b* and pictures of a second resolution 1657*b* stored in a decoded picture buffer. In the second example 1653*b*, an encoder may signal to a decoder that the reference pictures in the decoded picture buffer (DPB) are modified such that a reference picture is at the second resolution. This may be useful when the bitstream contains a third picture that is subsequent to the second picture, where the third picture is at the first resolution and where the long-term picture stored in the DPB may be used for motion prediction.

The third example 1653*c* illustrates pictures of a first resolution 1655*c* and pictures of a second resolution 1657*c* stored in a decoded picture buffer. In the third example 1653*c*, an encoder may signal to a decoder that the reference pictures in the decoded picture buffer (DPB) are modified such that a reference picture is at both the first and second resolutions. This may be useful when a higher resolution version of the reference picture is used for motion prediction when decoding a third picture that is subsequent to the second picture, where the third picture is at the first resolution.

Figure 17:
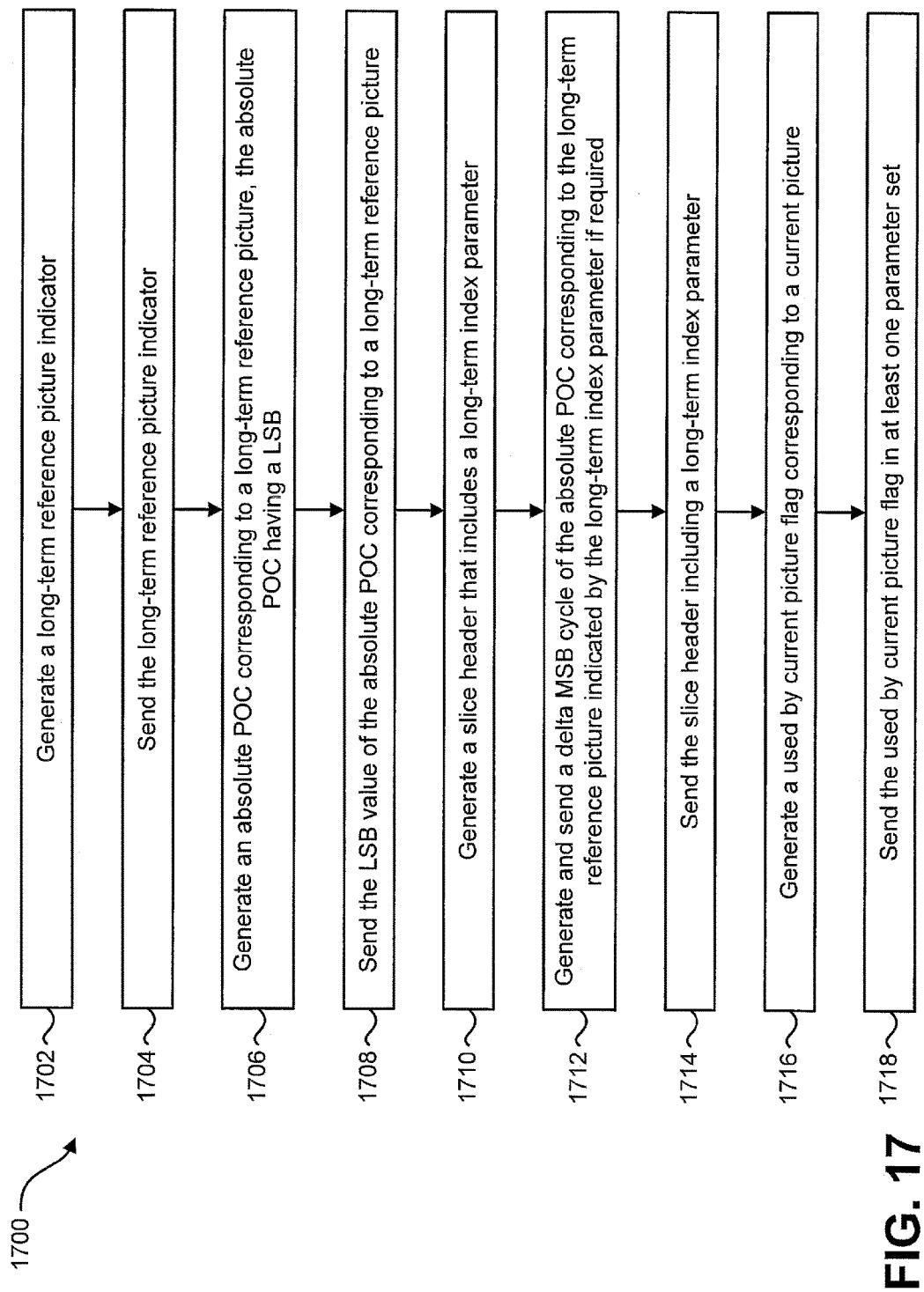
FIG. 17 is a flow diagram illustrating one configuration of a method for sending a long-term reference picture indicator.

FIG. 17 is a flow diagram illustrating one configuration of a method 1700 for sending a long-term reference picture indicator. An electronic device 104 may generate 1702 a long-term reference picture indicator. For example, the long-term reference picture indicator may be generated 1702 by an encoder 108 on an electronic device 104. The electronic device 104 may generate 1702 the long-term reference picture indicator in one or more of an SPS, PPS, APS and VPS. The long-term reference picture indicator may indicate one or more long-term reference pictures. For example, the long-term reference picture indicator may be a long-term reference picture present flag. Long-term reference pictures may be used for inter prediction of any coded picture in the coded video sequence.

The electronic device 104 may send 1704 the long-term reference picture indicator. In some configurations, the long-term reference picture indicator may be represented by long_term_ref_pics_present_flag. The long-term reference picture indicator may be sent 1704 in one or more of an SPS, PPS, an APS and a VPS. Additionally, the long-term reference picture indicator may be sent 1704 in a bitstream 114.

In some configurations, the electronic device 104 may generate 1706 an absolute Picture Order count (POC) corresponding to a long-term reference picture, the absolute POC having a least significant bit (LSB). It should be noted that in some configurations, the term picture order count (POC) may be used to indicate an absolute POC. Further, the term absolute POC may correspond to a relative POC with respect to certain fixed point in the POC space. For example, all absolute POC values may be transformed by some operation to generate a new picture order count (POC) values. In some cases, this transformation operation may be the subtraction of a constant value. In other words, in some approaches described herein, the new POC values thus generated after the transformation may still be considered as absolute POC values. In yet another configuration, the absolute POC values of the systems and methods described herein may be relative POC values with respect to a changing dynamic (e.g., not fixed) POC value. The electronic device 104 may send 1708 the LSB value of the absolute POC corresponding to the long-term reference picture. For example, the electronic device 104 may send 1708 the LSB value of the absolute POC corresponding to each of the long-term reference pictures that may be used for inter prediction of any coded picture in the coded video sequence. The LSB value of the absolute POC for one or more long-term reference picture may be sent 1708 in one or more parameter sets (e.g., SPS, PPS, APS and VPS). For example, the LSB value of the absolute POC corresponding to the long-term reference picture may not be sent or received in a slice header in some configurations. The parameter set(s) used to send an absolute POC may be the same as or different from the parameter set(s) used to send the long-term reference picture indicator. One benefit of absolute signaling of reference pictures may be that it may support robust error management of reference pictures using Buffer Descriptions. The LSB value of the absolute POC may be referred to as POC LSB value.

In some configurations, the electronic device 104 may generate 1710 a slice header. The slice header may include a long-term index parameter. For example, the long-term index parameter may be long_term_idx_sps[i]. The long-term index parameter may correspond to the absolute POC and the used by current picture flag in the at least one parameter set.

In some configurations, the electronic device 104 may generate and send 1712 a delta most significant bit (MSB) cycle of the absolute POC corresponding to the long-term reference picture indicated by the long-term index parameter if required. In this case, the delta MSB cycle value may be calculated by considering the current picture's POC value. When generated and sent 1712, the delta MSB cycle of the absolute POC may be included and sent in the slice header. Generating and sending 1712 the delta MSB cycle of the absolute POC may be required when one or more POC LSB values from the long-term reference pictures are the same. Otherwise, it may not be required or necessary to generate and send 1712 the delta MSB cycle of the absolute POC. When one or more POC LSB values from the long-term reference pictures are the same, delta_poc_msb_present_flag[i] may be set to 1. When POC LSB values from the long-term reference pictures are not the same, delta_poc_msb_present_flag[i] may be set to 0. For example, it may not be necessary to send the delta MSB cycle of the absolute POC in the latter case.

The electronic device 104 may send 1714 the slice header that includes the long-term index parameter. In some configurations, the slice header may be sent with and/or include the delta MSB cycle of POC corresponding to the long-term reference picture indicated by the long-term index parameter.

The electronic device 104 may generate 1716 a used by current picture flag corresponding to a current picture. For example, the used by current picture flag may be a used by current picture long-term SPS flag, such as used_by_current_pic_lt_sps_flag[i]. The used by current picture long-term SPS flag (e.g., used_by_current_pic_lt_sps_flag[i]) may specify whether to utilize an i-th long-term reference picture indicated with an absolute Picture Order Count (POC) in decoding the current picture. It should be noted that while a SPS flag is described, one or more of a SPS, PPS. APS and VPS flag may be used. In some cases, a used_by_current_pic_lt_sps_flag[i] with a value of 1 may be signaled for each i-th long-term reference picture in the SPS. In other cases, a used_by_current_pic_lt_sps_flag[i] with a value of 0 may be signaled for each i-th long-term reference picture in the SPS. Thus, there may be a two tuples of {long_term_ref_pic_poc_sps[i]=ABSPOCVALUE1, used_by_current_pic_lt_sps_flag[i]=1}, {long_term_ref_pic_poc_sps[i]=ABSPOCVALUE1, used_by_current_pic_lt_sps_flag[i]=0} that may be included in the SPS, PPS, APS and/or VPS for each long-term reference picture with an absolute POC value of ABSPOCVALUE1.

The electronic device 104 may send 1718 the used by current picture flag in at least one parameter set. For example, the used by current picture flag may be sent 1718 in a SPS, PPS, APS and/or VPS. In this manner, by sending the used by current picture flag in the SPS, PPS, APS and/or VPS, one benefit is that it may not be required to specify the used by current picture flag in the slice header. In other words, the used by current picture flag is not specified in the slice header in some configurations.

Listing (11) shows one example of signaling long-term reference pictures in a SPS using an absolute POC. Modifications in accordance with the systems and methods described herein may be denoted in bold text below.

---

Listing (11)

```
seq_parameter_set_rbsp( ) {
    ...
    num_short_term_ref_pic_sets
    for( i = 0; i < num_short_term_ref_pic_sets; i++)
        short_term_ref_pic_set( i )
```

Listing (11)

```
long_term_ref_pics_present_flag
if( long_term_ref_pics_present_flag ) {
    num_long_term_ref_pics_sps
    for( i = 0; i < num_long_term_ref_pics_sps; i++ )
        long_term_ref_pic_poc_lsb_sps[ i ]
        used_by_curr_pic_lt_sps_flag[ i ]
}
...
}
```

Examples of descriptions of the parameters in Listing (11) are given as follows.

'num_short_term_ref_pic_sets' specifies the number of short-term reference picture sets that are specified in the sequence parameter set. The value of num_short_term_ref_pic_sets ranges from 0 to 64, inclusive. A decoder 102 must allocate space for a total number of num_short_term_ref_pic_sets+1 short-term reference picture sets since a coded video sequence may include up to one short-term reference picture set explicitly signaled in the slice headers of a current picture. An explicitly signaled short-term reference picture set will always have an index equal to num_short_term_ref_pic_sets in the list of short-term reference picture sets.

'Short_term_ref_pic_set(i)' refers to the i-th short-term reference picture set information. A short-term reference picture set may be present in a sequence parameter set (SPS) or in a slice header. If a short-term reference picture set is present in the slice header, the content of the short-term reference picture set syntax structure will be the same in all slice headers of a picture and the value of idx will be equal to the syntax element num_ref_pic_sets from the active sequence parameter set (SPS).

'num_long_term_ref_pics_sps' specifies the number of long-term reference pictures that are specified in the sequence parameter set. The value of num_long_term_ref_pics_sps ranges from 0 to 64, inclusive.

'long_term_ref_pic_poc_lsb_sps[i]' specifies the least significant bits (LSB) of the POC of the i-th long-term reference picture specified in the sequence parameter set. The number of bits used to represent long_term_ref_pic_poc_sps[i] equals log 2_max_pic_order_cnt_lsb_minus4+4.

A 'used_by_curr_pic_lt_sps_flag[i]' equal to 0 specifies that the i-th long-term reference picture long_term_ref_pic_poc_lsb_sps[i] specified in the sequence parameter set is not used for reference by the current picture. A 'used_by_curr_pic_lt_sps_flag[i] ' equal to 1 specifies that the i-th long-term reference picture long_term_ref_pic_poc_lsb_sps[i] specified in the sequence parameter set is used for reference by the current picture.

In some configurations, used_by_curr_pic_lt_sps_flag[i] associated with long_term_ref_pic_poc_lsb_sps[i] may be included in the Picture Parameter Set (PPS), Active Parameters Set (APS) and/or Video Parameter Set (VPS) in addition to or instead of in the SPS.

Listing (12) below illustrates an example of modifications made to the slice header in connection with the modifications shown in Listing (11). However, it is noted that signaling 'used_by_curr_pic_lt_sps_flag[i]' in the SPS (and/or other parameter set) results in it not needing to be specified in slice header. Modifications in accordance with the systems and methods described herein may be denoted in bold text below.

Listing (12)

```
slice_header( ) {
    ...
    if( IdrPicFlag ) {
        idr_pic_id
        no_output_of_prior_pics_flag
    } else {
        pic_order_cnt_lsb
        short_term_ref_pic_set_sps_flag
        if( !short_term_ref_pic_set_sps_flag )
            short_term_ref_pic_set( num_short_term_ref_pic_sets )
        else
            short_term_ref_pic_set_idx
        if( long_term_ref_pics_present_flag ) {
            num_long_term_pics
            if( num_long_term_ref_pics_sps )
                num_long_term_sps
            for( i = 0; i < num_long_term_sps +
            num_long_term_pics; i++ ) {
                if(i<num_long_term_sps)
                    long_term_idx_sps[ i ]
                else
                    poc_lsb_lt[ i ]
                delta_poc_msb_present_flag[ i ]
                if( delta_poc_msb_present_flag[ i ])
                    delta_poc_msb_cycle_lt[ i ]
                if(i>=num_long_term_sps)
                    used_by_curr_pic_lt_flag[ i ]
            }
        }
    }
    ...
}
```

Examples of descriptions of the parameters in Listing (12) are given as follows. 'idr_pic_id' identifies an instantaneous decoding refresh (IDR) picture. The values of idr_pic_id in all the slices of an IDR picture remain unchanged. When two consecutive access units in decoding order are both IDR access units, the value of idr_pic_id in the slices of the first IDR access unit will differ from the idr_pic_id in the second IDR access unit. The value of idr_pic_id ranges from 0 to 65535, inclusive.

'no_output_of_prior_pies_flag' specifies how the previously-decoded pictures in the decoded picture buffer are treated after decoding of an IDR picture. When the IDR picture is the first IDR picture in the bitstream, the value of no_output_of_prior_pics_flag has no effect on the decoding process. When the IDR picture is not the first IDR picture in the bitstream and the value of pic_width_in_luma_samples, pic_height_in_luma_samples or max_dec_pic_buffering [max_temporal_layers_minus1] derived from the active SPS is different from the value of pic_width_in_luma_samples, pic_height_in_luma_samples or max_dec_pic_buffering [max_temporal_layers_minus1] derived from the active SPS for the preceding picture, no_output_of_prior_pics_flag equal to 1 may be inferred by the decoder 102, regardless of the actual value of no_output_of_prior_pics_flag. However, while the inference of no_output_of_prior_pics_flag equal to 1 may be made, generally, it should not be made.

'pic_order_cnt_lsb' specifies the picture order count modulo MaxPicOrderCntLsb for the current picture. The length of the pic_order_cnt_lsb syntax element is log 2max_pic_order_cnt_lsb_minus4+4 bits. The value of the pic_order_cnt_lsb ranges from 0 to MaxPicOrderCntLsb−1, inclusive. When pic_order_cnt_lsb is not present, pic_order_cnt_lsb is inferred to be equal to 0.

'short_term_ref_pic_set_sps_flag' equal to 1 specifies that the short-term reference picture set of the current picture shall be created using syntax elements in the active sequence parameter set. short_ term_ref_pic_set_sps_flag equal to 0 specifies that the short-term reference picture set of the current picture shall be created using syntax elements in the short_ term_ref_pic_set( ) syntax structure in the slice header.

'_' specifies the index to the list of the short-term reference picture sets specified in the active SPS that are used for creation of the reference picture set of the current picture. The syntax element short_term_ref_pic_set_idx is represented by Ceil(Log 2(num_short_term_ref_pic_sets)) bits. The value of short_ term_ref_pic_set_idx ranges from 0 to num_short_term_ref_pic_sets−1, inclusive, where num_short_term_ref_pic_sets is the syntax element from the active sequence parameter set.

The variable StRpsIdx is derived as shown below in Listing (13).

| Listing (13) |
|---|
| if( short_term_ref_pic_set_sps_flag )<br>    StRpsIdx = short_term_ref_pic_set_idx (7-40)<br>else<br>    StRpsIdx = num_short_term_ref_pic_sets |

'num_long_term_pics' specifies the number of the long-term reference pictures that are to be included in the long-term reference picture set of the current picture and that are directly signaled in the slice header. The value of num_long_term_pics ranges from 0 to max_dec_pic_buffering[max_temporal_layers_minus1]−NumNegativePics[StRpsIdx]−NumPositivePics[StRpsIdx], inclusive. When not present, the value of num_long_term_pics is inferred to be equal to 0.

'num_long_term_sps' specifies the number of long-term reference pictures that are specified in the active sequence parameter set and that are to be included in the long-term reference picture set of the current picture. If num_long_term_sps is not present, the value is inferred to be equal to 0. The value of num_long_term_sps ranges from 0 to Min(num_long_term_ref_pics_sps, max_dec_pic_buffering [max_temporal_layers_minus1]−NumNegativePics[StRpsIdx]−NumPositivePics[StRpsIdx]−num_long_term_pics), inclusive.

'long_term_idx_sps[i]' specifies the index, to the list of long-term reference pictures specified in the active sequence parameter set, of the i-th long-term reference picture inherited from the referred sequence parameter set to the long-term reference picture set of the current picture. The value of long_term_idx_sps '[i]' ranges from 0 to num_long_term_ref_pics_sps−1, inclusive. For any values of j and k in the range of 0 to num_long_term_sps−1, inclusive, if j is less than k, lt_ref_pic_poc_lsb_sps[long_term_idx_sps[j]] may not be less than lt_ref_pic_poc_lsb_sps[long_term_idx_sps[k]].

'poc_lsb_lt[i]' specifies the value of the least significant bits (LSB) of the picture order count value of the i-th long-term reference picture that is included in the long-term reference picture set of the current picture. The length of the poc_lsb_lt[i] syntax element is log 2_max_pic_order_cnt_lsb_minus4+4 bits. For any values of j and k in the range of num_long_term_pics to num_long_term_pics+num_long_term_sps−1, inclusive, if j is less than k, poc_lsb_lt[j] may not be less than poc_lsb_lt[k].

The variable PocLsbLt[i] is derived as shown below in Listing (14).

| Listing (14) |
|---|
| if( i < num_long_term_sps )<br>    PocLsbLt[ i ] = lt_ref_pic_poc_lsb_sps[ long_term_idx_sps[ i ] ]<br>else<br>    PocLsbLt[ i ] = poc_lsb_lt[ i ] |

'delta_poc_msb_present_flag[i]' equal to 1 specifies that delta_poc_msb_cycle_lt[i] is present. delta_poc_msb_present_flag[i] equal to 0 specifies that delta_poc_msb_cycle_lt [i] is not present. delta_poc_msb_present_flag[i] may be equal to 1 when there is more than one reference picture in the decoded picture buffer with the least significant bits of the picture order count value equal to poc_lsb_lt[i].

'delta_poc_msb_cycle_lt[i]' is used to determine the value of the most significant bits of the picture order count value of the i-th long-term reference picture that is included in the long-term reference picture set of the current picture.

The variable DeltaPocMSBCycleLt[i] is derived as shown below in Listing (15).

| Listing (15) |
|---|
| if( i == 0 \|\| i ==<br>num_long_term_sps \|\| PocLsbLt[ i − 1 ] != PocLsbLt[ i ] )<br>    DeltaPocMSBCycleLt[ i ] = delta_poc_msb_cycle_lt[ i ]<br>else<br>    DeltaPocMSBCycleLt[ i ] =<br>delta_poc_msb_cycle_lt[ i ] + DeltaPocMSBCycleLt[ i − 1 ] |

The value of DeltaPocMSBCycleLt[i]*MaxPicOrderCntLsb+pic_order_cnt_lsb−PocLsbLt[i] ranges from 1 to $2^{24}$−1, inclusive.

'used_by_curr_pic_lt_flag[i]' specifies if the i-th long-term reference picture indicated with the absolute POC is used or not used for reference by the current picture. For example, used_by_curr_pic_lt_flag[i] equal to 0 specifies that the i-th long-term reference picture included in the long-term reference picture set of the current picture is not used for reference by the current picture. For long-term reference pictures inherited from the referred sequence parameter set, used_by_curr_pic_lt_flag[i] value is derived as used_by_curr_pic_lt_flag[i]=used_by_curr_pic_lt_sps_flag [long_term_idx_sps[j]].

It should be appreciated that while Listing (11) and Listing (12) provide syntax and semantics for the used by current picture flag (e.g., used_by_current_pic_lt_sps_flag [i]) in a SPS, similar syntax and semantics may be employed for an APS (e.g., used_by_current_pic_lt_aps_flag[i]) and/or a PPS (e.g., used_by_current_pic_lt_pps_flag[i]).

FIG. 18 is a flow diagram illustrating one configuration of a method 1800 for receiving a long-term reference picture indicator. The method may be performed by a decoder 102 on an electronic device 104. In some configurations, the reference picture tracking module 116 may use the long-term reference picture indicator to track a reference picture, which may be used to decode a current picture.

A long-term reference picture indicator may be received 1802. The long-term reference picture indicator may be received 1802 from a bitstream 114. The long-term reference picture indicator may be received 1802 in a Sequence Parameter Set (SPS), an Adaptation Parameter Set (APS), a Picture Parameter Set (PPS) and/or a Video Parameter Set (VPS).

In some configurations, a least significant bit (LSB) of the absolute POC corresponding to the long-term reference picture may also be received 1804. The LSB of the absolute POC may be received in a SPS, PPS, APS and/or VPS.

In some configurations, a slice header may be received 1806. The slice header may include a long-term index parameter. For example, the received 1806 long-term index parameter may be long_term_idx_sps[i]. The received 1806 long-term index parameter may corresponds to the absolute POC and the used by current picture flag in the at least one parameter set.

A used by current picture flag may be received 1808 in at least one parameter set. In some configurations, the long-term reference picture indicator may be represented by long_term_ref_pics_present_flag. The used by current picture flag may be received 1808 in a SPS, PPS, APS and/or VPS. In other words, the parameter set(s) may be a SPS, PPS, APS and/or VPS. In this manner, the used by current picture flag may not be specified in the slice header. The parameter set(s) in which the used by current picture flag is received 1808 may be the same or different parameter set(s) that the long-term reference picture indicator is received in.

In some configurations, the used by current picture flag may be a used by current picture long-term SPS flag, such as used_by_current_pic_lt_sps_flag[i]. The used by current picture long-term SPS flag (e.g., used_by_current_pic_lt_sps_flag[i]) may specify whether to utilize an i-th long-term reference picture indicated with an absolute POC in decoding the current picture.

In some configurations, the electronic device 104 may optionally receive 1820 a delta most significant bit (MSB) cycle of the absolute POC corresponding to the long-term reference picture indicated by the long-term index parameter. The MSB cycle of the absolute POC may be received and/or obtained from the slice header. The electronic device 104 may receive 1820 the delta MSB cycle of the absolute POC when one or more POC LSB values from the long-term reference pictures are the same. For example, when one or more POC LSB values from the long-term reference pictures are the same, the electronic device 104 may receive delta_poc_msb_present_flag[i] equal to 1.

In the case where POC LSB values from the long-term reference pictures are not the same, the electronic device 104 may receive delta_poc_msb_present_flag[i] equal to 0. In this case, the electronic device 104 may not receive delta MSB cycle of the absolute POC. In other words, the electronic device 104 may optionally receive 1820 a delta most significant bit (MSB) cycle of POC corresponding to the long-term reference picture indicated by the long-term index parameter.

The electronic device 104 may determine 1812 whether to utilize a long-term reference picture based on the used by current picture flag. In other words, the used by current picture flag may be utilized to determine 1812 whether to utilize the long-term reference picture in decoding a current picture.

If it is determined to utilize the long-term reference picture, the electronic device 104 may decode 1814 a current picture based on the long-term reference picture. For example, the reference picture traction module 116 may use the long-term reference picture to decode the current picture. If it is determined not to utilize the long-term reference picture, the electronic device 104 may decode 1816 a current picture without the long-term reference picture.

In some known configurations, such as JCTVC-I1003, decoding of a reference picture set (RPS) may occur once per picture. Decoding a RPS may occur after decoding the slice header but prior to the decoding of any coding unit and prior to the decoding process for reference picture list construction of the slice. However, this process may result in marking one or more reference pictures as "unused for reference".

Further, short-term reference pictures may by identified by their PicOrderCntVal values. PicOrderCntVal may refer to the picture order count of the current picture Long-term reference pictures are identified by their pic_order_cnt_lsb values. Five lists of picture order count values may be constructed to derive the reference picture set. These five lists may be PocStCurrBefore, PocStCurrAfter, PocStFoll, PocLtCurr and PocLtFoll with NumPocStCurrBefore, NumPocStCurrAfter, NumPocStFoll, NumPocLtCurr and NumPocLtFoll number of elements, respectively.

In some cases, the syntax shown in Listing (16) may apply for derivation of the five lists of POC values and the numbers of entries.

Listing (16)

```
for( i = 0, j = 0, k = 0; i < NumNegativePics[ StRpsIdx ] ; i++ )
    if( UsedByCurrPicS0[ StRpsIdx ][ i ] )
        PocStCurrBefore[ j++ ] = PicOrderCntVal + DeltaPocS0[ StRpsIdx ][ i ]
    else
        PocStFoll[ k++ ] = PicOrderCntVal + DeltaPocS0[ StRpsIdx ][ i ]
NumPocStCurrBefore = j
for( i = 0, j = 0; i < NumPositivePics[ StRpsIdx ]; i++ )
    if( UsedByCurrPicS1[ StRpsIdx ][ i ])
        PocStCurrAfter[ j++ ] = PicOrderCntVal + DeltaPocS1[ StRpsIdx ][ i ]
    else
        PocStFoll[ k++ ] = PicOrderCntVal + DeltaPocS1[ StRpsIdx ][ i ]
NumPocStCurrAfter = j
NumPocStFoll = k
for( i = 0, j = 0, k = 0; i < num_long_term_sps + num_long_term_pics; i++ )
    if( delta_poc_msb_present_flag[ i ])
        if( used_by_curr_pic_lt_flag[ i ])
            PocLtCurr[ j++ ] = PicOrderCntVal −   DeltaPocMSBCycleLt[ i ] *
                MaxPicOrderCntLsb − pic_order_cnt_lsb + PocLsbLt[ i ]
        else
            PocLtFoll[ k++ ] = PicOrderCntVal − DeltaPocMSBCycleLt[ i ] *
                MaxPicOrderCntLsb − pic_order_cnt_lsb + PocLsbLt[ i ]
    else
        if( used_by_curr_pic_lt_flag[ i ])
            PocLtCurr[ j++ ] = PocLsbLt[ i ]
```

Listing (16)

```
    else
            PocLtFoll[ k++ ] = PocLsbLt[ i ]
NumPocLtCurr = j
NumPocLtFoll = k
```

Figure 19A:
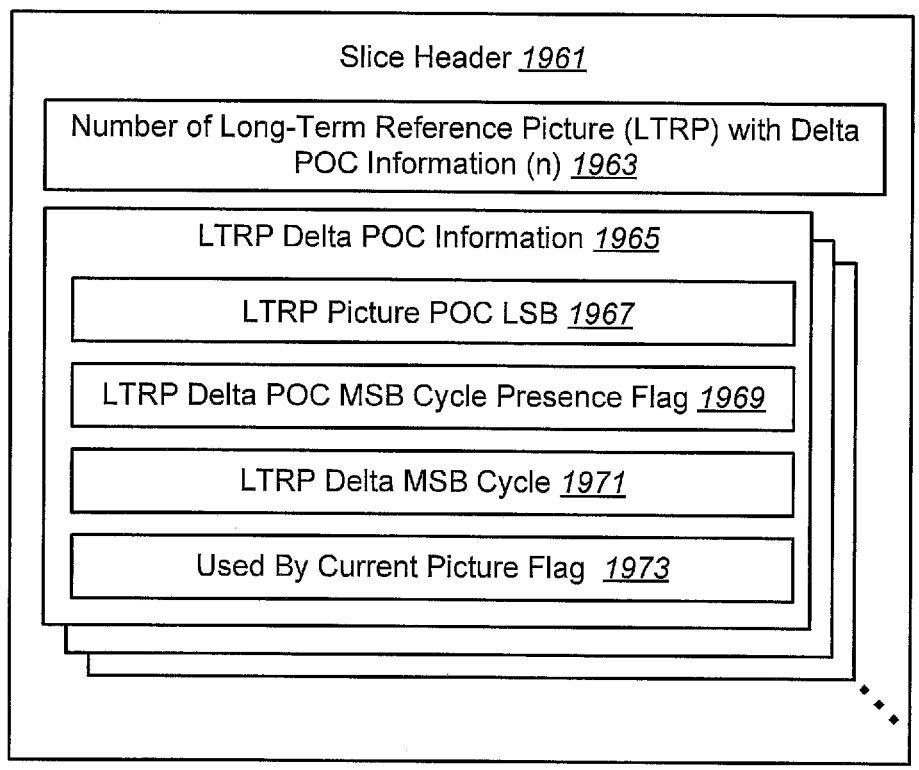
FIG. 19A is a block diagram illustrating one configuration of a slice header.

FIG. 19A is a block diagram illustrating one configuration of a slice header 1961. In one system, an electronic device 104 may send a slice header 1961. The slice header 1961 may include information about the number of long-term reference pictures. For example, the slice header 1961 may include num_long_term_pics syntax element in slice header).

The slice header 1961 may include an element representing the number of long-term reference pictures (LTRP) with delta POC information (n) 1963. n 1963 may correspond to the number of long-term reference picture delta POC information elements 1965. In addition, n 1963 may be represented as num_long_term_pics.

There may be 1-n long-term reference picture delta POC information elements 1965. In other words, each long-term reference picture may be identified by sending delta POC information about itself with respect to the POC value of the current picture. Each long-term reference picture delta POC information element 1965 may include a long-term reference picture POC least significant bit (LSB) 1967, a long-term reference picture delta POC most significant bit (MSB) cycle presence flag 1969, a long-term reference picture delta MSB cycle 1971 and a used by current picture flag 1973.

The long-term reference picture POC LSB 1967 may be represented as poc_lsb_lt[i]. The used by current picture flag 1973 may be represented by used_by_curr_pic_lt_flag[i].

The long-term reference picture delta POC MSB cycle presence flag 1969 may indicate the presence of the long-term reference picture delta MSB cycle 1971. For example, if the long-term reference picture delta POC MSB cycle presence flag 1969 is equal to 1, then the long-term reference picture delta MSB cycle 1971 may be present. The long-term reference picture delta POC MSB cycle presence flag 1969 may be represented by delta_poc_msb_present_flag[i]. The long-term reference picture delta MSB cycle 1971 may be represented by delta_poc_msb_cycle_lt[i].

Figure 19B:
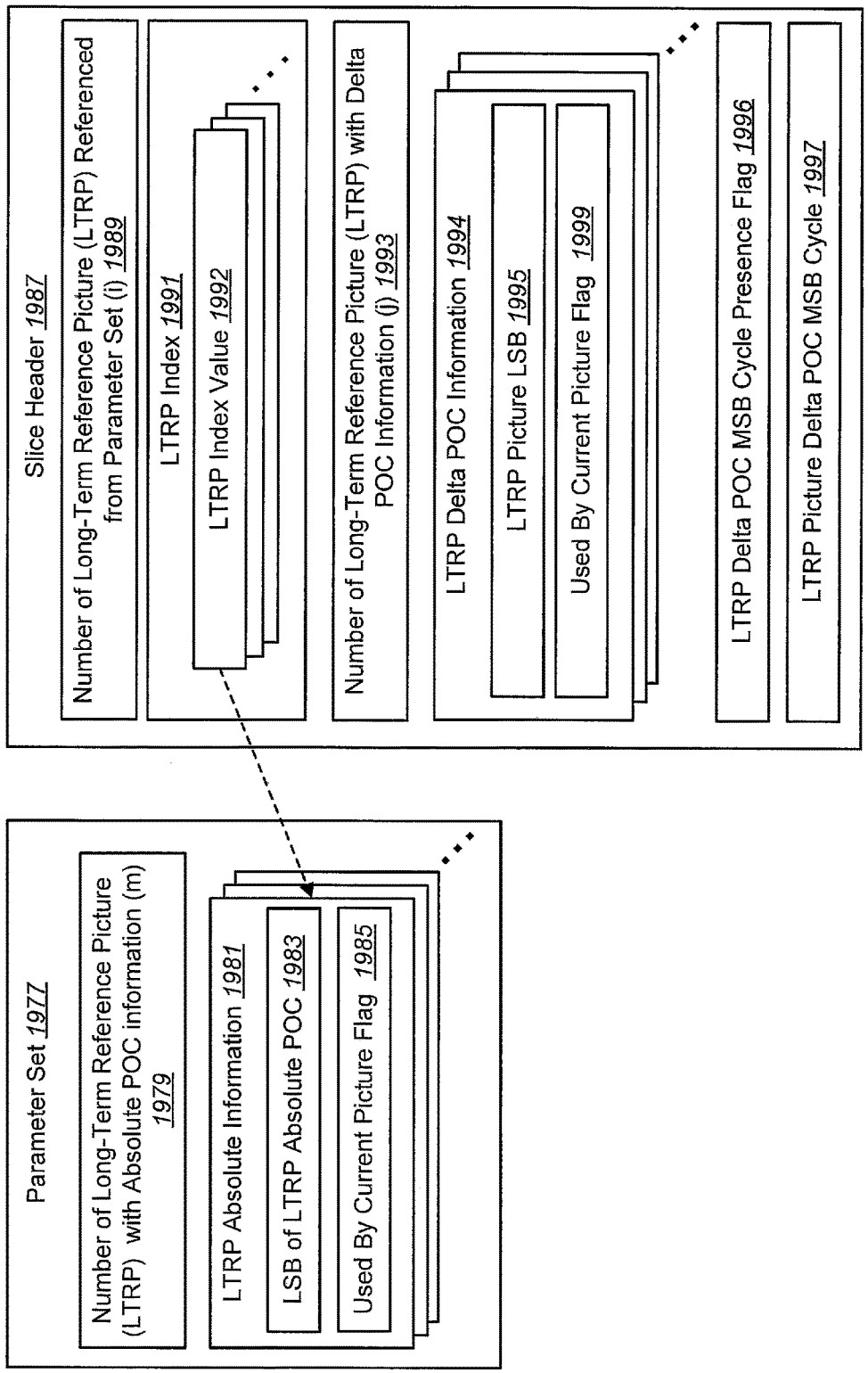
FIG. 19B is a block diagram illustrating one configuration of a parameter set and a slice header in accordance with the systems and methods disclosed herein.

FIG. 19B is a block diagram illustrating one configuration of a parameter set 1977 and a slice header 1987 in accordance with the systems and methods disclosed herein. FIG. 19B shows a parameter set 1977 and a slice header 1987 in accordance with the systems and methods described herein. Long-term reference pictures may be accomplished by signaling absolute information about the number of long-term reference pictures. The absolute information may be signaled in a parameter set 1977. The parameter set 1977 may be a sequence parameter set (SPS), adaptive parameter set (APS), a picture parameter set (PPS) information and/or a video parameter set (VPS). For clarify, FIG. 19B discussed the parameter set 1977 as a SPS. However, it should be appreciated that an APS, a VPS or a PPS may additionally or alternatively be used.

A parameter set 1977 may include information about a number of long-term reference pictures (LTRP) with absolute POC information element (m) 1979. m 1979 may be represented by num_long_term_ref_pics. m 1979 may indicate the number of long-term reference picture absolute information elements 1981.

There may be 1-m elements 1981. Each long-term reference picture absolute information element 1981 may include a least significant bit (LSB) of long-term reference picture absolute POC 1983 and a used by Current Picture Flag 1985. The LSB of long-term reference picture absolute POC 1983 may be represented by long_term_ref_pic_poc_sps[j] in the parameter set 1977 (e.g., SPS). The used by Current Picture Flag 1985 may be represented by used_by_curr_pic_lt_sps_flag[i] in the parameter set 1977 (e.g., SPS).

In some configurations, used_by_curr_pic_lt_sps_flag[i] associated with long_term_ref_pic_poc_lsb_sps[i] may be included in the Picture Parameter Set (PPS), Active Parameters Set (APS) and/or Video Parameter Set (VPS) in addition to or instead of in the SPS.

The slice header 1987 may include an element representing the number of long-term reference pictures referenced from the parameter set (i) 1989 and a long-term reference picture index 1991. In other words, i 1989 may indicate that a number of long-term reference pictures may be signaled by referencing the absolute long-term reference picture information sent in the parameter set 1977.

The long-term reference picture index 1991 may include 1-i values 1992. Each long-term reference picture index value 1992 may correspond to a long-term reference picture absolute information element 1981 in the parameter set 1977. In some cases, the number of long-term reference picture index values 1992 corresponds to the number of long-term reference picture absolute information elements 1981 in the parameter set 1977. Each long-term reference picture index value 1992 may correspond to a long-term reference picture absolute information elements 1981 in the parameter set 1977. Each long-term reference picture index value 1992 may be represented by long_term_idx_sps[j], where SPS represents a SPS parameter set 1977.

The slice header 1987 may also include an element representing the number of long-term reference pictures with delta POC information (j) 1993 and a long-term reference picture delta POC information 1994. n 1963, m 1979, j 1993 and i 1989 may be different from values in one or more of the above described syntax elements and Listings. For instance, j 1993 and i 1989 may be different from the i and j used in Listing (11) and Listing (12) or in the syntax given in connection with FIGS. 19A-19B.

The slice header 1987 may also include a long-term reference picture delta POC information element 1994. There may be 1-j elements. Each long-term reference picture delta POC information element 1994 may include a long-term reference picture delta POC least significant bit (LSB) 1995, a long-term reference picture delta POC most significant bit (MSB) cycle presence flag 1996, a long-term reference picture delta POC MSB cycle 1997 and a used by current picture flag 1999. It should be noted that the long-term reference picture delta POC most significant bit (MSB) cycle presence flag 1996 and the long-term reference picture delta POC MSB cycle 1997 may be sent for both i 1989 and j 1993 (e.g., for each LTRP referenced from the parameter set and for each LTRP with POC information).

The long-term reference picture POC LSB 1995 may be represented as poc_lsb_lt[i]. The used by current picture flag 1999 may be represented by used_by_curr_pic_lt_flag[i], which may be signaled in the SPS, APS, PPS and/or VPS. The used by current picture flag 1999 may be sent for each long-term reference picture delta POC information element 1994. However, the used by current picture flag 1999 may not be sent for the number of long-term reference pictures referenced from the parameter set (i) 1989.

The long-term reference picture delta POC MSB cycle presence flag 1996 may indicate the presence of the long-term reference picture delta POC MSB cycle 1997. For example, if the long-term reference picture delta POC MSB cycle presence flag 1996 is equal to 1, then the long-term reference picture delta POC MSB cycle 1997 may be present. The long-term reference picture delta POC MSB cycle presence flag 1996 may be represented by delta_poc_msb_present_flag[i]. The long-term reference picture delta POC MSB cycle 1997 may be represented by delta_poc_msb_cycle_lt[i].

The term "computer-readable medium" refers to any available medium that can be accessed by a computer or a processor. The term "computer-readable medium", as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. An electronic device for decoding an encoded image from a bitstream, comprising:
   circuitry configured to decode a sequence parameter set (SPS) and a slice header from the bitstream; and determine whether to utilize one of long-term reference pictures, wherein the SPS comprises:
   (a) a long-term reference picture present flag indicating whether one or more long-term reference pictures are present for inter prediction;
   (b) the number of the long-term reference pictures that are specified in the SPS;
   (c) a first least significant bit (LSB) of a Picture Order Count (POC) corresponding to one of the long-term reference pictures specified in the SPS;
   (d) and a used by current picture SPS flag indicating whether to utilize the long-term reference picture that are specified in the SPS;
   wherein the slice header comprises:
   (e) a first number specifying the number of long-term reference pictures that are to be included in a long-term reference pictures set of a current pictures and that are directly signaled in the slice header;
   (f) a second number specifying the number of long-term reference pictures that are specified in the SPS and that are to be included in the long-term reference picture set of the current picture;
   (g) one or more long-term index parameters specifying an index, to a list of the long-term reference picture, specified in the SPS, of a picture, in the long-term reference picture set of the current picture;
   (h) used by current picture flags, the number of which is equal to the first number and which indicate whether to utilize each of the first number of long-term reference pictures included in the long-term reference picture set of the current picture; and
   (i) a second LSB of a POC of the picture in the long-term reference picture set of the current picture,
   wherein the circuitry, for each i-th index within a third number of indexes, where the third number is a sum of the first number and the second number,
   determines a PocLsbLt equal to the first LSB of the POC corresponding to the long-term index parameters in case that a value of the i-th index is less than the second number,
   determines a PocLsbLt equal to the second LSB of the POC corresponding to the i-th index in case that a value of the i-th index is greater than or equal to the second number, and
   derives a PocLtCurr equal to the PocLsbLt based on the used by current picture flags.

2. A method for decoding an encoded image from a bitstream by an electronic device, comprising:
   decoding a sequence parameter set (SPS) and a slice header from the bitstream; and determining whether to utilize one of the long-term reference pictures, wherein the SPS comprises:
   (a) a long-term reference picture present flag indicating whether to utilize one or more long-term reference pictures are present for inter prediction;
   (b) a number of the long-term reference pictures that are specified in the SPS;
   (c) a first least significant bit (LSB) of a Picture Order Count (POC) corresponding to one of the long-term reference pictures specified in the SPS;
   (d) and a used by current picture SPS flag indicating whether to utilize the long-term reference pictures that are specified in the SPS,
   wherein the slice header comprises:
   (e) a first number specifying the number of long-term reference pictures that are to be included in a long-term reference picture set of a current picture and that are directly signaled in the slice header;

(f) a second number specifying the number of long-term reference pictures that are specified in the SPS and that are to be included in the long-term reference picture set of the current picture;
(g) one or more long-term index parameters specifying an index, to a list of the long-term reference picture specified in the SPS, of a picture in the long-term reference picture set of the current picture;
(h) used by current picture flags, the number of which is equal to the first number and which indicate whether to utilize each of the first number of long-term reference pictures included in the long-term reference picture set of the current picture; and
(i) a second LSB of a POC of the picture in the long-term reference picture set of the current picture,
the method further comprising: for each i-th index within a third number of indexes, where the third number is a sum of the first number and the second number;
determining a PocLsbLt equal to the first LSB of the POC corresponding to the long term index parameters in case that a value of the i-th index is less than the second number;
determining a PocLsbLt equal to the second LSB of the POC corresponding to the i-th index in case that a value of the i-th index is greater than or equal to the second number; and
deriving a PocLtCurr equal to the PocLsbLt based on the used by current picture flags.

* * * * *